(12) United States Patent
Wersborg et al.

(10) Patent No.: US 9,373,163 B2
(45) Date of Patent: Jun. 21, 2016

(54) METHOD FOR CONTROLLING A LASER PROCESSING OPERATION BY MEANS OF A REINFORCEMENT LEARNING AGENT AND LASER MATERIAL PROCESSING HEAD USING THE SAME

(75) Inventors: Ingo Stork Genannt Wersborg, Munich (DE); Adrian Garcea, Karlsruhe (DE)

(73) Assignees: PRECITEC KG, Gaggenau-Bad Rotenfels (DE); PRECITEC ITM GMBH, Eschborn (DE)

( * ) Notice: Subject to any disclaimer, the term of this patent is extended or adjusted under 35 U.S.C. 154(b) by 622 days.

(21) Appl. No.: 13/807,290

(22) PCT Filed: Jun. 28, 2011

(86) PCT No.: PCT/EP2011/003176
§ 371 (c)(1),
(2), (4) Date: Mar. 18, 2013

(87) PCT Pub. No.: WO2012/000649
PCT Pub. Date: Jan. 5, 2012

(65) Prior Publication Data
US 2013/0178953 A1    Jul. 11, 2013

(30) Foreign Application Priority Data

| Jun. 28, 2010 | (EP) | 10006692 |
| Sep. 30, 2010 | (EP) | 10012614 |
| Dec. 21, 2010 | (EP) | 10015914 |
| Feb. 8, 2011 | (EP) | 11000995 |
| Feb. 18, 2011 | (EP) | 11001371 |
| May 20, 2011 | (EP) | 11004209 |

(51) Int. Cl.
*G05B 13/02* (2006.01)
*G06T 7/00* (2006.01)
(Continued)

(52) U.S. Cl.
CPC ............. *G06T 7/0004* (2013.01); *B23K 1/0056* (2013.01); *B23K 26/032* (2013.01);
(Continued)

(58) Field of Classification Search
None
See application file for complete search history.

(56) References Cited

FOREIGN PATENT DOCUMENTS

CA        2743518 A1     5/2010

OTHER PUBLICATIONS

Schroth et al. "A cognitive system for autonomous robotic welding" 2009 IEEE/RSJ International conference on Intelligent Robots and Systems Oct. 11-15, 2009 pp. 3148-3153.*

(Continued)

*Primary Examiner* — Sean Shechtman
*Assistant Examiner* — Steven Garland
(74) *Attorney, Agent, or Firm* — Muncy, Geissler Olds & Lowe, P.C.

(57) ABSTRACT

The present invention relates to a method for controlling a processing operation of a workpiece by means of a Reinforcement Learning (RL) agent unit, comprising the steps of: (a) observing an interaction zone in the workpiece by means of at least one radiation sensor to generate at least one sensor signal $s_t$, wherein the workpiece is processed using an actuator having an initial actuator value $a_t$; (b) determining a basis function $\Phi(s_t)$ from the set of sensor signals $s_t$; (c) determining a reward function $r_t$ giving the probability of good results of the processing operation; (d) choosing a next actuator value $a_{t+1}$ on the basis of a policy $\pi$ depending on the reward function $r_t$ and the basis function $\Phi(s_t)$; and (e) repeating the steps (a) to (d) for further time points to perform a RL controlled processing operation.

14 Claims, 36 Drawing Sheets

(51) Int. Cl.

| | | |
|---|---|---|
| *B23K 26/03* | (2006.01) | |
| *B23K 1/005* | (2006.01) | |
| *B23K 26/14* | (2014.01) | |
| *B23K 26/20* | (2014.01) | |
| *B23K 26/34* | (2014.01) | |
| *B23K 28/02* | (2014.01) | |
| *G05B 19/408* | (2006.01) | |
| *G06K 9/62* | (2006.01) | |
| *B23K 26/32* | (2014.01) | |

(52) U.S. Cl.
CPC ............. *B23K26/1429* (2013.01); *B23K 26/20* (2013.01); *B23K 26/32* (2013.01); *B23K 26/322* (2013.01); *B23K 26/34* (2013.01); *B23K 28/02* (2013.01); *G05B 13/0265* (2013.01); *G05B 13/0285* (2013.01); *G05B 19/4083* (2013.01); *G06K 9/6247* (2013.01); *G06K 9/6248* (2013.01); *B23K 2201/34* (2013.01); *B23K 2203/02* (2013.01); *B23K 2203/50* (2015.10); *G05B 2219/35085* (2013.01)

(56) References Cited

OTHER PUBLICATIONS

Jager et al. "Principal component imagery for the quality monitoring of dynamic laser welding processes," IEEE Transactions on Industrial Electronics, Apr. 1, 2009, pp. 1307-1313, vol. 56, No. 4.

Wersborg et al., "Real-time cognitive technical systems, a leraning material processing system, social and future aspects," Advanced Robotics and Its Social Impacts (ARSO), 2009 IEEE Workshop on, Nov. 23, 2009, pp. 145-152.

\* cited by examiner

METHOD FOR CONTROLLING A LASER PROCESSING OPERATION BY MEANS OF A REINFORCEMENT LEARNING AGENT AND LASER MATERIAL PROCESSING HEAD USING THE SAME

The present invention relates to a method for controlling a laser processing operation by means of a Reinforcement Learning Agent and laser material processing head using the same.

In industrial nations with high labor and living costs, it is important to increase automation in manufacturing in order to retain a competitive edge. Furthermore, there is an ongoing trend from mass production toward increased flexibility in product variation while maintaining high output volumes. Cognitive capabilities for production machines may improve with flexibility and automation to contribute to a Cognitive Factory of the future. Artificial software agents; systems with cognitive capabilities, subsequently just agents, may help to tailor products individually and to deliver them on a large scale. Furthermore, due to a computer's superior skills in data analysis, agents may be able to manage complex production tasks that are challenging even for human experts. A possible test scenario for these agents could be an upcoming production method that is complex to handle and needs improvement in terms of flexibility. Therefore laser material processing may be a good choice for investigating the cognitive capabilities of artificial agents in performing production tasks.

Treating materials with laser beams has several advantages. The laser is one of the highest density energy sources available to industry. Once configured, a laser processing system works with extraordinary precision, enabling high cut quality in laser cutting or deep and thin weld seams in laser beam welding. Therefore laser material processing is already frequently applied in a great variety of production processes, mostly out of the public view. Automotive manufacturers apply laser processing in many steps of car body production, but laser processing is also used for consumer and medical products such as household devices or coronary stents. However, users must expend a great deal of cost and effort on trials before a laser processing system can run. For every desired change in the processing task, the user may have to repeat the configuration procedure. Even if all process parameters remain untouched, slight differences in workpiece, workload, alignment, room temperature, or optical properties may result in a loss of quality and, in the worst case, a suspension of the assembly line. Laser cutting and laser welding may thus benefit from the cognitive capabilities of artificial agents. If these agents can learn how to weld or cut, it would not only reduce the system configuration effort, but also increase its flexibility. Moreover, if an agent could improve itself over time, it could gain the capability to develop its everyday tasks, increase output, and assure quality. Many manufacturers wish to have a prompt cutting or welding technique, a system that does not need to be reconfigured when it takes over a new production task. This kind of system would significantly increase welding and cutting efficiency and assure quality. Quality assurance is especially important when processing parts are associated with safety, for instance within cars or airplanes.

Another advantage of process control, besides increased quality and flexibility, would be to save environmental resources. For instance laser cutters use higher laser power than necessary as a safety margin to maintain a minimum kerf width and to prevent a loss of cut. Artificial software agents might learn to apply just enough energy for optimal cutting efficiency, thus saving energy with every cut. For example, five 8 kW fiber lasers with a wall plug efficiency of 30% integrated in an assembly line in Germany operating 253 days a year, 18 hours a day, create operational electricity costs of over US$50,000 annually. With 32 g $CO_2$ emission per kWh, this adds up to approximately 20 metric tons annually. In addition, fiber lasers apparently have a better wall plug efficiency compared to other common industrial laser sources, which are sometimes less efficient by a factor of 15. Taking only a factor of six, this would add up to operational electricity costs of US$300,000 and over 100 metric tons of annual $CO_2$ emission. If an artificial agent manages to save just 10% in laser power, this may save up to US$30,000 and approximately 2 to 10 or more metric tons of annual $CO_2$ emission within just one sample assembly line. It however remains unclear whether it is possible to define a cognitive architecture that can create artificial agents that can learn tasks from laser cutting or welding and can then reliably monitor and control in real-time, improve processing, and save resources.

State-of-the-Art Scientific and Industrial Approaches

In general, laser material processes are established and configured through a series of trials. Reference tests are carried out until a human expert has found a possible parameter set. In welding, the weld is analyzed with microscopic pictures of a cross-section of the seam. Finally, once the user finds successful parameter sets, the parameters remain untouched and any process disturbance is excluded if possible. Because this process involves high effort and cost, manufacturers often declare the parameter sets to be classified. However, even if every attempt is made to keep all process parameters constant, slight changes and nonlinear behavior can result in poor cutting quality or welding defects. For quality assurance, many industrial users need to implement monitoring systems to observe their laser processes.

Monitoring in Laser Material Processing

There are two general monitoring standards in laser cutting: maintaining a minimum kerf width and a certain cutting edge quality. Problems in cutting edge quality include, for instance, dross, roughness, or parallelism of edges. The overall quality or variation in edge roughness is determined by many parameters such as room environment, gas and nozzle parameters, focus position, laser power, feed rate, angle or radius parameters, laser beam conditions and alignment, the metal alloy, surface coatings, among many others. A welding seam may have undesired surface irregularities, including breaks, holes, material ejections, the formation of spatters, cracks, pores, seam width variation, and many more. Sophisticated monitoring systems have thus been introduced for industrial laser welding to detect the problems listed; there are three types: pre-, in-, and post-process monitoring. A number of publications have emphasized that in-process or online process monitoring may detect welding defects. On top of these, there may also be welding errors, such as an undesired degree of welding depth or insufficient connection, which often cannot be observed without destroying the welding seam. The latter may expand and lead to a complete lack of fusion. A lack of fusion involves a gap between the partners that should have been joined. The gap is often visible neither from the top nor from the bottom of the welded workpiece and is therefore called a false friend.

A frequently used sensor for monitoring laser cutting as well as welding is a camera aligned coaxially to the laser beam axis. Such a camera can capture images of the heat affected zone and the treated workpiece. It may also be suitable for closed-loop process control. Related research indicates that a coaxially observing camera can allow monitoring of the appearance of dross and the existence of an insufficient cut or minimum kerf width. An illumination unit may significantly improve monitoring with cameras because the workpiece surface and more details of the heat affected zone are visible. The coaxially integrated camera is a very valuable sensor for monitoring cutting and welding processes and providing temporally and spatially resolved process information. As mentioned above, detecting false friends is a difficult monitoring task because the weld seam may appear defect-free from the outside at the location of a lack of fusion. The defect may, for example, be monitored with thermal imaging. When observing a thermal image of an integrated camera, the heat dissipation seems to be longer towards the cooling weld seam if a false friend is present. A temperature ratio between two positions of the cooling weld seam, one closer to the focal spot than the other, may detect the presence of a lack of fusion in some cases. On the contrary, this method seems to require costly equipment and the configuration of fixed measurement positions. This method has to be however manually adapted to the individual processes.

In an analysis of the optical spectrum of process emission in laser welding or cutting, differences in distribution and intensity coincide with process changes. The same seems to be true for air-borne or solid-borne acoustic emissions. Optical as well as acoustical emissions seem to deliver similar process information. Wavelength filtered photodiodes often capture information on specific spectral process emissions. Many users thus apply three photodiodes, respectively sensitive to laser back reflection, temperature, and plasma plume emissions.

However, it is hardly possible to cover all of the effects in laser material processing with just one kind of sensor technology. Thus, combining several sensor signals for improved monitoring of laser material processing has several advantages.

Closed-Loop Control in Laser Material Processing

The vast majority of industrial laser material processing applications are manually configured and supervised. It is economically worthwhile to decrease human labor costs and system downtime for laser processing systems. As a result, it has been a long-term research goal to achieve closed-loop control of at least one influential process parameter. Some parameters of laser material processing have a short response time and a great influence on the process outcome. Therefore, these parameters have been subdivided into two groups: distance control and laser power control.

As stated above, receiving a failure-free monitoring signal in laser material processes is challenging in both laser welding and laser cutting. Nevertheless, many theories have been developed and some specialized systems are now used in industrial environments, such as capacitive distance control in laser cutting. The capacitive distance control works reliably in many industrial applications to maintain a constant distance between the workpiece and the processing head.

Some attempts have been made to attain closed-loop laser power control; for example, a laser power is controlled by a threshold function for a process emission photodiode. This method made it possible to find a fixed relation between weld speed and laser power. Photodiode signals may vary significantly with slight process parameter changes. Therefore control methods with static functions of photodiode intensity to laser power suffer from process disturbances. A photodiode mounted at the bottom of the welded workpiece detects different intensities depending on the degree of workpiece penetration. These root side light emissions control the laser power within a closed loop. For many industrial applications, this method is not suitable because the root side of the workpiece is not accessible. Furthermore, this method only works for full penetration welds when the laser beam exits the workpiece at the root side. Closed-loop control of laser power and focal position has also been studied. In this case, a fixed threshold for keyhole opening at a fixed position that controls the laser power and the focal position is altered with changes in chromatic aberration. The keyhole opening seems to be a significant camera picture feature suitable for full penetration welding. However, many welding processes do not have a visible keyhole within the camera image. Often the keyhole is only visible in full penetration welding with high laser power, resulting in significant heat conduction within the workpiece and excessive penetration with weld seam root convexity.

Besides using a processing head that works relatively close to the workpiece, it is possible to use so-called scanners with beam guiding mirrors for remote welding applications. Monitoring systems for remote welding is a promising topic for future research. An approach for laser power control within remote welding has been demonstrated with sophisticated experimental results. An algorithm finds a keyhole within a camera equipped with a Cellular Neural Network environment. A control loop increases the laser power until a keyhole is detected within the camera picture and maintains it at a constant size. However, as stated above, a keyhole is only visible within the camera picture when there is very high laser power resulting in significant heat influence on the workpiece. Furthermore, only full penetration welding is possible with this technique, but is not desired in every case.

Closed-loop control seems to be a highly complex task for laser material processing. Most monitoring signals merely give relative feedback rather than absolute values. Small changes in the distance between the workpiece and the processing head may result in different absolute values for monitoring signals, but with the same process result. The proposed approaches for closed-loop control seem to be suitable only for defined process modes such as full penetration welding with a high level of laser power or fixed thresholds. A possible cure for a closed-loop control system would add increased adaptability, as will be discussed in the next section.

Adaptive Control and Monitoring Approaches in Laser Material Processing

With the many quality control and closed-loop control systems that have been explored in the literature, there must be some reason why only a few are applicable for industrial use. One reason may be that these systems only work for individual applications but are not suitable to cover a great variety of different processes. An enhanced adaptability may be a solution to this problem. If a system can learn how to adapt to a certain number of distinct applications, this may already be more valuable for manufacturing purposes. Moreover, it appears that an ideal sensor that always gives accurate and absolute information about the processing state has not been found for laser material processing. An evaluation of multiple sensor data input may help to improve the monitoring results and better to grasp the system's state. In this way, many sensor data inputs with individual weaknesses may be combined to become more reliable, in the same way that humans rely on several senses to make judgments. Thus cognitive capabilities may help to bridge the existing gap and apply laser material processing to more manufacturing processes, increase quality performance, and decrease wastage of resources.

Several sophisticated approaches using methods from machine learning or with cognitive capabilities have already been discussed in the literature. The general idea of an autonomous production cell for laser beam welding has been investigated. Other approaches may be subdivided into systems that combine one or more sensors intelligently to monitor the process, and approaches that aim to control the process.

Recent techniques in machine learning and the control of laser beam welding have been examined to create adaptive monitoring. Artificial Neural Networks (ANN), Support Vector Machines (SVM), and the Fuzzy K-Nearest Neighbor (KNN) classification have been investigated as they apply to special applications for laser material processing.

In order to control the welding speed, a method of defining thresholds with fuzzy logic rules has been provided. This is studied in combination with a fuzzy logic process control. Here, the process information is first analyzed statistically before it is used for closed-loop control to cope with the fact that the information gained about the process is weak for closed-loop controlling purposes. Related work using an expert system can be found. ANN for laser material processing purposes have been investigated. An ANN is investigated to create a predictive process model of optical process emission, welding speed, laser power, and focal position, which is then adapted to the process. This is a promising approach, but the necessity of first defining a process model creates additional effort. One aim of the present invention is to evaluate what machine learning can accomplish without a process model.

Although there has been significant scientific interest in finding an adaptive system that can manage different tasks in laser material processing, it seems as if this step still needs to be taken. Either the discussed approaches do not include experimental data or they seem to be suitable only for specific applications.

In summary, laser material processing systems require a major effort in installation and reconfiguration. Typically, the systems are set up to execute a specific task in the same way again and again. The current aim for these systems is to keep all of the influential parameters constant, which is often not the case in real industrial applications. Materials vary from piece to piece or from one workload to the next. The mounting may not be the same all the time because of variations resulting from either human labor or imprecise robots. However, there is a great desire for fault-free weld seams and stable cutting quality. This results not only from a need to optimize manufacturing economically or to conserve environmental resources, but also because this is a major safety issue, especially for car or airplane bodies. This means that quality control is essential, along with, ideally, closed-loop process control systems that are able to work reliably in the demanding environment of material processing with high-powered laser beams. It seems as if these goals have not been met by the current state of research, as is described above.

SUMMARY OF THE INVENTION

From the current state of the art there is a gap to be bridged in laser material processing research in creating monitoring systems that are able to detect some kinds of cutting errors or welding defects. One step forward would be to realize adaptive monitoring that is capable of learning the reliable detection of a lack of fusion based on several sensor signals.

Since laser material processing research is part of manufacturing, the resulting system should qualify and be of use for real industrial applications. This leads to certain premises: the system has to be robust enough to cope with a high degree of adaptivity for different laser material processes; it has to execute its capabilities in real-time for the processing task; it has to be user-friendly; and its sensors and components must be affordable for the purpose. The system should be autonomous, yet transparent to the human expert. Therefore, the design of the cognitive capabilities should enable demonstration of the system's actions and decisions to the human expert in order to secure the best possible quality control.

The present invention should demonstrate reliable detection of a lack of fusion. A successful closed-loop control method for the future should not only be able to adapt the laser power to speed alterations, it should also be applicable to at least two different processing tasks. In other words, the agent should adjust the laser power to speed changes in order to maintain a similar energy per unit length level within a set of experiments for similar welding or cutting results. In addition, in order to investigate the cognitive capabilities of the system, it should be able to learn from human experts, as well as show reasonable behavior and continued learning from feedback in an unsupervised mode within experiments.

Thus, it is a main object of the present invention to take advantage of cognitive capabilities in order to increase a production system in flexibility, quality, and efficiency. This can be further separated in four objects:

It is a first object of the present invention to provide a system being able to gain knowledge by learning from a human expert how to abstract relevant information within production tasks and how to weld or cut, wherein the system should show reasonable behavior in unknown situations and should be able to learn unsupervised.

It is a second object of the present invention to provide a system maintaining quality with reliable detection of hard-to-detect defects such as false friends or a lack of fusion within experiments.

It is a third object of the present invention to provide a system increasing the efficiency by closed-loop control of laser power adapting to changes in processing speed and maintaining penetration depth.

It is a fourth object of the present invention to provide a system having flexibility for individually different processing tasks by adapting to different materials or process tasks.

These objects are solved by a method according to claim 1 and by the laser material processing system according to claim 14. Further advantages, refinements and embodiments of the invention are described in the respective sub-claims.

The present invention seeks to examine ways of realizing cognitive capabilities and improving workstations in manufacturing using laser material processing systems. Cognitive capabilities could involve abstracting relevant information, learning how to laser weld or laser cut, and using the knowledge gained to deal with new but similar tasks successfully.

The accompanying drawings, which are included to provide a further understanding of the invention and are incorporated in and constitute a part of this application, illustrate embodiment(s) of the invention and together with the description serve to explain the principle of the invention. In the drawings:

BRIEF DESCRIPTION OF THE DRAWINGS

FIG. 26 shows a workpiece RIL004b: a reinforcement learning agent according to the present invention learns how to lap weld two stainless steel sheets with a 0.6 mm thick sheet on top and 1.0 mm thick sheet underneath at 1.2 m/min, continuing with policy parameters learned from workpiece RIL004a;

DESCRIPTION OF THE EMBODIMENTS OF THE PRESENT INVENTION

Figure 1A:
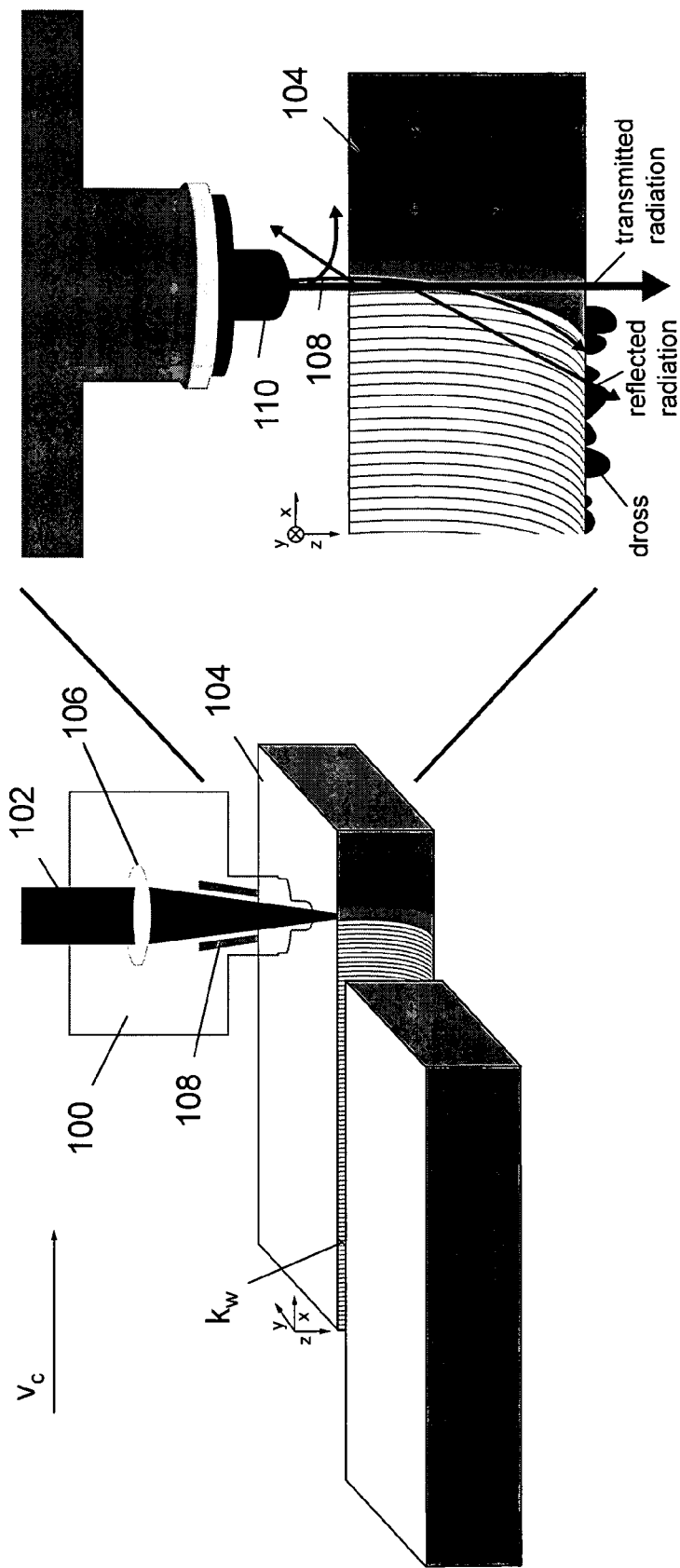
FIG. 1A illustrates a laser cutting process of melt and blow and a corresponding laser processing head of the present invention.

Aspects of Laser Processing Systems and Technical Cognition

In the following, a brief overview of the theories underlying the present invention is given. This includes laser designs, modeling of laser welding as well as cutting processes, and techniques for reducing sensor data with dimensionality reduction, such as Principal Component Analysis, Linear Discriminant Analysis, and Isometric Feature Mapping. It also includes an introduction of classification and supervised as well as unsupervised learning methods such as Fuzzy K-Nearest Neighbor, Artificial Neural Networks, Support Vector Machines, and reinforcement learning. For the number format, the thousand separator is a comma "," and the decimal separator is a point "."; thus, one-thousand is represented by the number 1,000.00.

A single italic letter a indicates a variable on $\mathbb{R}$ a bold letter $a=(a_1, \ldots, a_n)^T$ indicates a vector with n dimensions on $\mathbb{R}^n$, and a capital italic letter A indicates a matrix. The term $ab=a \cdot b = \sum_{i=1}^{n} a_i b_i$ is defined as the dot product. The Euclidean norm on $\mathbb{R}^n$ is defined as $\|a\|=\sqrt{a_1^2+\ldots+a_n^2}$.

A data set can be represented by a t×n matrix X with the data elements $x_i$ as a vector or as value $x_{ij}$. In all data analysis sections, we assume that the data is centered, which means that the mean of each coordinate over the entire data set is zero, $$\frac{1}{t}\sum_{i=1}^{t} x_{ij} = 0$$

for every j=1 ... n. The empirical covariance matrix cov(X) of a zero mean data set X is defined by $$cov(X) = \frac{1}{n} X^T X.$$

The trace of a square matrix A with size n is defined as $tr(A)=\sum_{i=1}^{n} a_{ii}$. The identity matrix of size n is defined as $I_n$.

The expression $p(\epsilon)$ indicates the probability of an event $\epsilon$. The function $$p(\varepsilon|\xi) = \frac{p(\varepsilon \cap \xi)}{p(\xi)}$$

is the conditional probability of event $\epsilon$, given the occurrence of some other event $\xi$. The expectation or the expected value becomes $E(X)=\sum_i x_i p_m(x_i)$, if X is a discrete random variable with probability measure $p_m$.

Laser Material Processing

Laser material processing (LMP) refers to many well-established industrial production techniques. Two important areas within these are laser cutting and welding. The treatment of materials with laser beams has several advantages over other production techniques in terms of precision, efficiency, and abrasion. Therefore LMP is applied within many areas of manufacturing, from taibored blanks in the automotive industry to small consumer products such as coffeemakers. However, LMP often requires long configuration times and is highly sensitive to changes in process parameters. In order to ensure quality, sophisticated approaches to observe cutting or welding processes are being implemented in industrial use. A common issue for LMP sensor systems is strong radiation including heat and spatter as well as nonlinear process behavior. Therefore the processes in LMP are hard to observe and difficult to control. One of the central components within LMP is of course the laser itself.

High-Powered Industrial Laser Designs

A laser can be differentiated by the active medium: solid, liquid, or gas. Manufacturing companies often favor three types of lasers for industrial processing: CO2, Nd:YAG, and fiber lasers. CO2 lasers operate at a wavelength of 10,600 nm.

We refer to Nd:YAG and fiber lasers as solid-state lasers. Solid-state lasers may create a pulsed output beam or a continuous wave (CW). Nd:YAG lasers operate at a wavelength of 1,064 nm. This investigation incorporates a fiber laser emitting a wavelength of 1,070 nm.

Laser Applications: Cutting and Welding in Manufacturing

Two of the common commercial applications of high-powered laser systems are laser cutting and laser welding. Laser beams can be used in many different ways to join or cut materials. The present invention focuses on common scenarios within industrial laser material processing: fusion cutting and deep penetration laser beam welding of metals with a fiber laser in continuous wave mode and a processing head mounted on a robotic moving device.

According to an embodiment of the present invention, for laser cutting, such as fusion cutting, a laser cutting head 100 (FIG. 1A) is provided, which directs a laser beam 102 to a workpiece 104 for cutting the same. The laser beam 102, which is focused by a lens system 106, heats the material at the desired spot at an energy density magnitude of several MW/cm² at which it starts melting. A processing gas 108 flowing out from a nozzle 110 blows the melted material out. For this reason, fusion cutting is also referred to as melt and blow. Many parameters influence the cutting results: the laser beam's focal spot size or position, as well as polarization and wavelength; the processing speed $v_c$, jet velocity, nozzle position, and its shape and alignment, as well as the kind of gas; the composition material, its thickness, and its reflectivity; and many other parameters. Manual trials are necessary to ascertain the proper parameters before a parameter set for successful processing can be derived. Even if in this case every attempt is made to keep all parameters constant for future processing, the cut quality may become instable due to preconditions. Cutting errors such as dross, rough cutting edges, undesired kerf width variation, or a loss of cut may occur when parameters such as the applied laser power or processing gas fail to meet the optimum level. To prevent this from happening, industrial users often keep a safety margin, using higher laser power and gas pressures than necessary. Monitoring the laser cutting quality has the potential to increase output and conserve energy resources by reducing the safety margin.

According to the present invention, in order to monitor or control laser cutting, different sensor systems are applied. The laser cutting head 100 applies an industrial process control system involving a capacitive measurement of the distance to be maintained between the workpiece 104 and the laser cutting head 100. The sensor system is further adapted to capture process emissions, and thus incorporates photodiodes, cameras, or acoustic sensors. Acoustic sensors are provided to detect gas pressure variation or eventually a loss of cut. Camera sensors have the potential to detect the kerf width $k_w$ and other cutting quality parameters. However, because there are a great number of different cutting processes, significant effort is often required before the user can manage the desired cutting task and additional engagement is then necessary to control its quality, if possible.

As a simple model for laser cutting, it is possible to find a heat capacity equation based on the heat balance of the material removed by melt and blow. Basically, the assumption is that the workpiece's absorbed energy per unit length is removed with the volume of melted material, assuming that further conducting into the workpiece is negligible. The following equation describes the laser power to cutting speed ratio $$\frac{P_L}{v_c m_z}$$

as shown $$\frac{P_L}{v_c m_z} \approx \frac{k_w \rho}{c_e}(C_p \Delta T + L_f + f_v L_v). \quad \text{(Formula 2.1)}$$

The parameter $P_L$ describes the incident laser power, the variable $v_c$ describes the cutting speed, and the material thickness is $m_z$. Further parameters are the average kerf width $k_w$, the material density $\rho$, the coupling coefficient $c_e$, the material's heat capacity $C_p$, temperature rise to cause melting $\Delta T$, latent heat of fusion $L_f$, fraction of melt vaporized $f_v$, and latent heat of vaporization $L_v$.

According to another embodiment of the present invention, in deep penetration laser beam welding, or simply laser welding, a laser material processing or laser welding head 200 (FIG. 1B) is provided, which directs a laser beam 202 to joint partners 204a and 204b for performing a laser welding process. The laser beam 202 joins the multiple parts with concentrated but carefully dosed heat to achieve maximal connection within the joint partners 204a, b. The heat affected zone 206 is also referred to as an interaction zone and shows certain properties. Often a robot moves the processing optics at a defined processing speed $v_w$ in such a way that a desired weld seam 208 with the best possible connection results after cooling. To this end, some processes incorporate a shielding gas 210. However, if the laser power is too low, the welding process may suffer from a lack of penetration, or from so-called dropouts when it is too high. This may occur quickly when one of the process parameters varies. Most of the above mentioned influencing parameters for laser cutting also apply to laser welding. Additionally, compared to laser cutting, in welding there is increased complexity stemming from highly influential process parameters such as gap tolerance or material composition. Furthermore, there is a multitude of different joint geometries in welding. A lap weld is a joint of two overlapping partners, while a butt joint describes two members aligned approximately in one plane. Others are corner, edge, or t-joints, to name just a few. Of course each geometry has to be treated differently in terms of welding system setup and the interpretation of monitoring signals.

In order to monitor deep penetration, also called keyhole laser welding, an operator normally measures the process emissions to draw conclusions from them. When observing the heat affected zone from above during processing, a melt pool 212 and a keyhole 214 as well as a plasma plume 216 or metal vapor radiation may be visible. The melt pool 212 is the area with melted material, within which is the keyhole 214, where the material is vaporized. The energy induction may create a radiating ionized gas of metal vapor or a plasma plume 216, depending on the laser beam wavelength and material combination. This creates process emissions such that there are also temperature radiation and laser back reflection that can be captured with photodiodes. A coaxially integrated camera may obtain the spatial resolution of the keyhole 214 and melt pool 212. The aforementioned sensors are part of a group considered as in-process sensors. Another group are pre-process sensors, which often track the desired weld spot position before the process takes place. Post-process sensors generally detect the weld seam geometry and surface. Monitoring systems incorporating pre-, in-, and post-process sensors have increased reliability to detect faults within the welding processes. However, even experienced welding experts sometimes cannot connect the welding results with the sensor signals, and some welding defects such as insufficient connection may remain undetected.

As in the cutting part, it is possible to derive a form of lumped heat-capacity model. The model describes the laser power and cutting speed ratio using $$\frac{P_L}{v_w m_z} \approx \frac{s_w \rho C_p T_m}{0.483(1-r_f)}. \qquad \text{(Formula 2.2)}$$

This may serve as a rough estimate or rule of thumb for laser welding. Some parameters have been described before; here the welding speed is $v_w$, the weld seam width is $s_w$, the melting point for this width is $T_m$, and the reflectivity is $r_f$. However, finding accurate and generally applicable models for laser cutting or welding is challenging because of the high number of hard-to-estimate but influential process parameters, as well as many nonlinear or individually different effects. Therefore the laser welding and cutting processes are treated as black box models. The present invention employs the mechanism of machine learning to manage the ins and outs of laser welding and cutting without necessarily modeling the inside.

Feature Extraction and Dimensionality Reduction

Figure 1B:
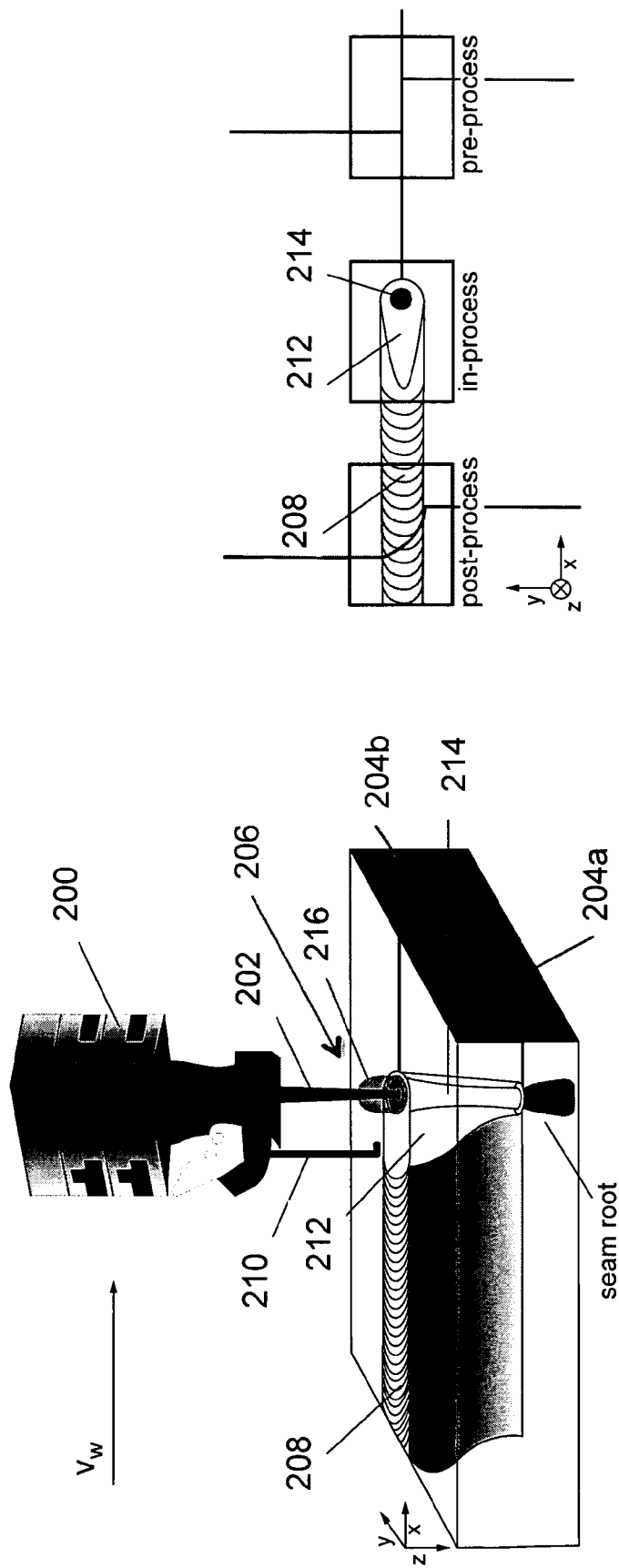
FIG. 1B shows a deep penetration laser beam welding process and a corresponding laser processing head of the present invention.
Figure 1C:
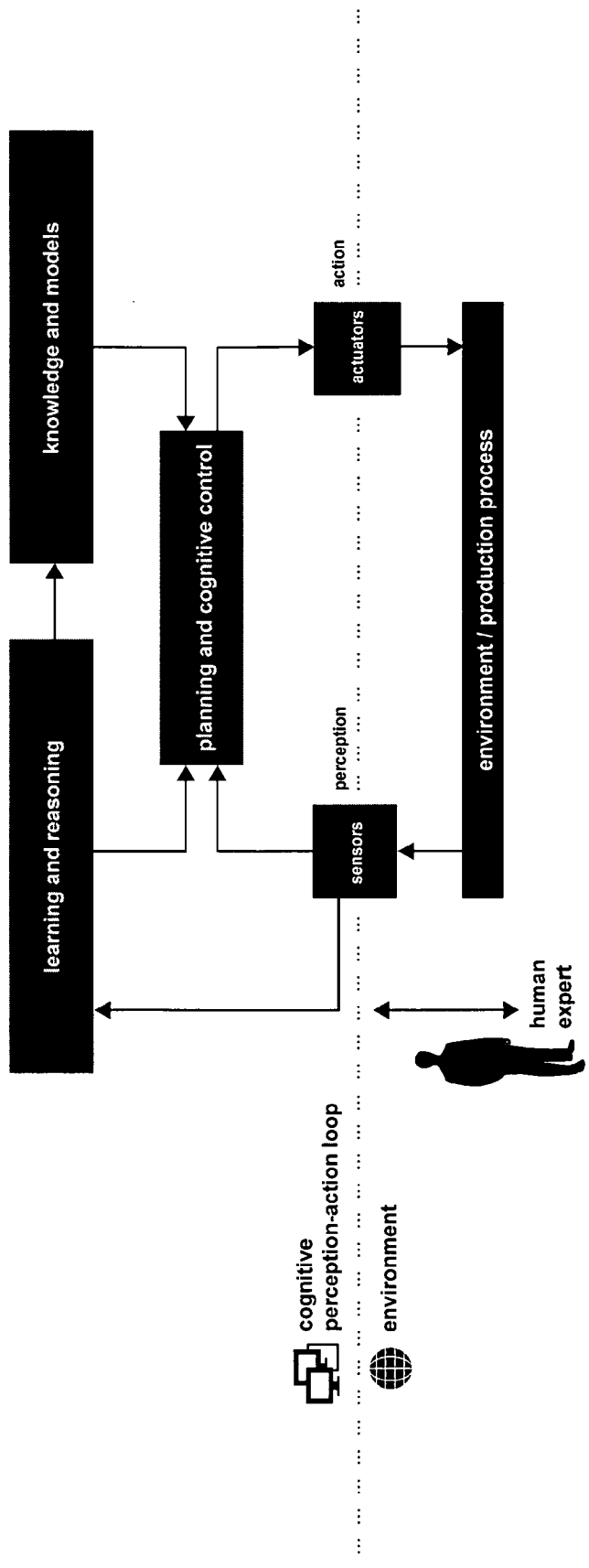
FIG. 1C shows a cognitive perception-action loop for production machines with sensors and actuators according to the present invention.

The present invention does not seek nor desire to achieve human-like behavior in machines. However, the investigation of something like cognitive capabilities within production machines of artificial agents capable of managing laser processing tasks may provide an application scenario for some of the most sophisticated approaches towards cognitive architectures. Approaches for production machines may be structured within a cognitive perception-action loop architecture, as shown in FIG. 1C, which also defines cognitive technical systems. Cognitive capabilities such as perception, learning, and gaining knowledge allow a machine to interact with an environment autonomously through sensors and actuators. Therefore, in the following, some methods known from machine learning that will be suitable for different parts of a cognitive perception-action loop working in a production system will be discussed.

If a cognitive technical system simply has a feature representation of its sensor data input, it may be able to handle a higher volume of data. Moreover, extracting features emphasizes or increases the signal-to-noise ratio by focusing on the more relevant information of a data set. However, there are many ways of extracting relevant features from a data set, the theoretical aspects of which are summarized in the following.

In order to select or learn features in a cognitive way, we want to have a method that can be applied completely autonomously, with no need for human supervision. One way of achieving this is to use dimensionality reduction (DR), where a data set X of size t×n is mapped onto a lower dimension data set Y of size t×p. In this context $\mathbb{R}^n$ is referred to as observation space and $\mathbb{R}^p$ as feature space. The idea is to identify or learn a higher dimensional manifold in a specific data set by creating a representation with a lower dimension.

Figure 1D:
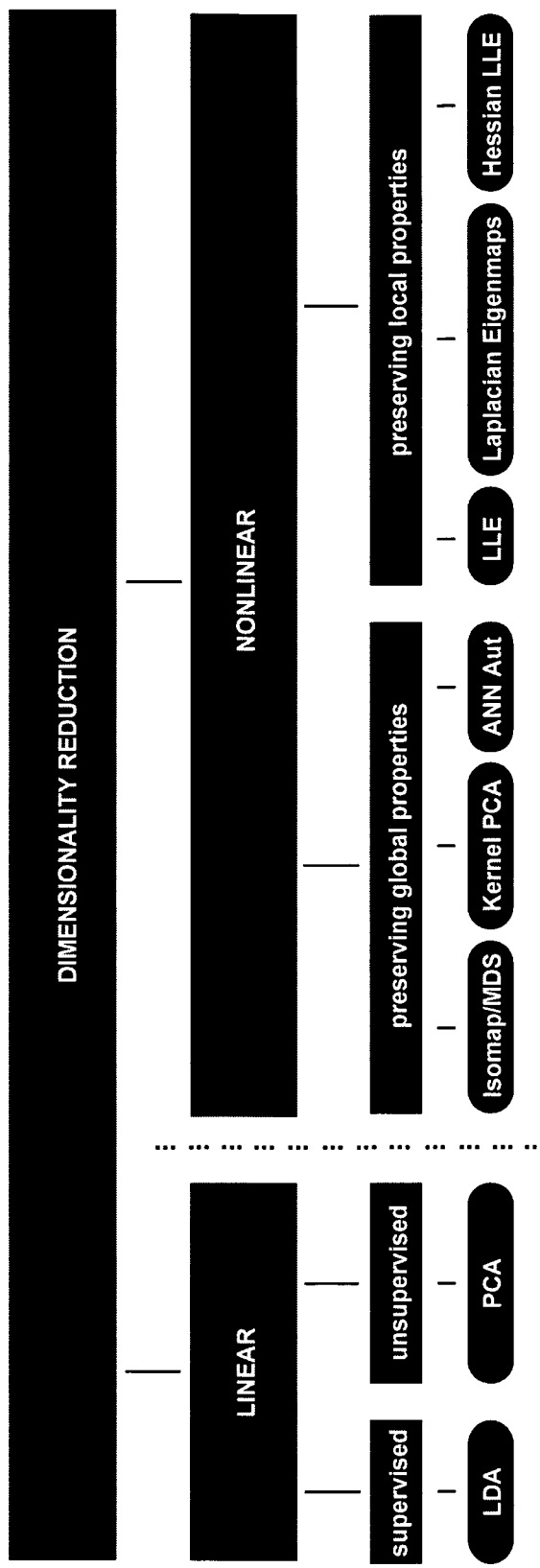
FIG. 1D shows categories of linear and nonlinear dimensionality reduction techniques.

Methods used to find features in a data set may be subdivided into two groups, linear and nonlinear, as shown in FIG. 1D. Linear dimensionality reduction techniques seem to be outperformed by nonlinear dimensionality reduction when the data set has a nonlinear structure. This comes with the cost that nonlinear techniques generally have longer execution times than linear techniques do. Furthermore, in contrast to nonlinear methods linear techniques allow a straightforward approach of mapping back and forth. The question is whether a linear dimensionality reduction technique is sufficient for laser material processing, or if nonlinear techniques bring more advantages than costs. The following nonlinear techniques are very advantageous for artificial data sets: Hessian LLE, Laplacian Eigenmaps, Locally Linear Embedding (LLE), Multilayer Autoencoders (ANN Aut), Kernel PCA, Multidimensional Scaling (MDS), Isometric Feature Mapping (Isomap), and others. As a result Isomap proves to be one the best tested algorithms for artificial data sets. We find that the Isomap algorithm seems to be the most applicable nonlinear dimensionality reduction technique for laser material processing. Therefore Isomap and two linear dimensionality reduction techniques are introduced below.

Principal Component Analysis

Principal Component Analysis (PCA) enables the discovery of features that separate a data set by variance. It identifies an independent set of features that represents as much variance as possible from a data set, but are lower in dimension. PCA is known in other disciplines as the Karhunen-Loeve transform and the part referred as Singular Value Decomposition (SVD) is also a well-known name. It is frequently used in statistical pattern or face recognition. In a nutshell, it computes the dominant eigenvectors and eigenvalues of the covariance of a data set.

We want to find a lower-dimensional representation Y with t×p elements of a high-dimensional data set t×n mean adjusted matrix X, maintaining as much variance as possible and with decorrelated columns in order to compute a low-dimensional data representation $y_i$ for the data set $x_i$. Therefore PCA seeks a linear mapping $M_{PCA}$ of size n×p that maximizes the term $\text{tr}(M_{PCA}^T \text{cov}(X) M_{PCA})$, with $M_{PCA}^T M_{PCA} = I_p$ and cov(X) as the covariance matrix of X. By solving the eigenproblem with $$\text{cov}(X) M_{PCA} = M_{PCA} \Lambda \qquad \text{(Formula 2.3)}$$

we obtain the p ordered principal eigenvalues with the diagonal matrix given by $\Lambda = \text{diag}(\lambda_1, \ldots, \lambda_p)$. The desired projection is given by $$Y = X M_{PCA}, \qquad \text{(Formula 2.4)}$$

gives us the desired projection onto the linear basis $M_{PCA}$. It can be shown that the eigenvectors or principal components (PCs) that represent the variance within the high-dimensional data representation are given by the p first columns of the matrix $M_{PCA}$ sorted by variance. The value of p is determined by analysis of the residual variance reflecting the loss of information due to dimensionality reduction.

By finding an orthogonal linear combination of the variables with the largest variance, PCA reduces the dimension of the data. PCA is a very powerful tool for analyzing data sets. However, it may not always find the best lower-dimensional representation, especially if the original data set has a nonlinear structure.

Linear Discriminant Analysis

Despite the usefulness of the PCA, the Linear Discriminant Analysis (LDA) may be seen as a supervised dimensionality reduction technique. It can be categorized as using a linear method, because it also gives a linear mapping $M_{LDA}$ for a data set X to a lower-dimension matrix Y, as stated for $M_{PCA}$ in equation 2.4. The necessary supervision is a disadvantage if the underlying desire is to create a completely autonomous system. However, LDA supports an understanding of the nature of the sensor data because it can create features that represent a desired test data set.

Because the details of LDA and Fisher's discriminant are known, the following is a brief simplified overview. Assume we have the zero mean data X. A supervision process provides the class information to divide X into C classes with zero mean data $X_c$ for class c. We can compute this with $$S_w = \sum_{c=1}^{C} cov(X_c), \quad \text{(Formula 2.5)}$$

the within-class scatter $S_w$, a measure for the variance of class c data to its own mean. The between-class scatter $S_b$ follows $$S_b = cov(X) - S_w. \quad \text{(Formula 2.6)}$$

Between-class scatter is a measure of the variance of each class relative to the means of the other classes. We obtain the linear mapping $M_{LDA}$ by optimizing the ratio of the between-class and within-class scatter in the low-dimensional representation using the Fisher criterion, $$J(M) = \frac{M^T S_b M}{M^T S_w M}. \quad \text{(Formula 2.7)}$$

Maximizing the Fisher criterion by solving the eigenproblem for $S_w^{-1} S_b$ provides C−1 eigenvalues that are non-zero. Therefore, this procedure seeks the optimal features to separate the given classes in a subspace with linear projections.

LDA thus separates a low-dimensional representation with a maximized ratio of the variance between the classes to the variance within the classes.

Isometric Feature Mapping

The PCA and LDA methods produce linear mapping from a high-dimensional data set to a low-dimensional representation. This may be expressed as learning a manifold in an observation space and finding a representation for this in a lower-dimensional feature space. For data sets with a nonlinear structure, such as the artificial Swiss-roll data set, linear projections will lose the nonlinear character of the original manifold. Linear projections are not able to reduce the dimension in a concise way: data points in the feature space may appear nearby although they were not in the observation space. In order to address this problem, nonlinear dimensionality reduction techniques have recently been proposed relative to the linear techniques. However, it is a priori unclear whether nonlinear techniques will in fact outperform established linear techniques such as PCA and LDA for data from real industrial laser processing sensor systems, which will be investigated in the remainder of this thesis.

Isometric Feature Mapping or the Isomap algorithm attempts to preserve the pairwise geodesic or curvilinear distances between the data points in the observation space. In contrast to a Euclidean distance, which is the ordinary or direct distance between two points that can be measured with a ruler or the Pythagorean theorem, the geodesic distance is the distance between two points measured over the manifold in an observation space. In other words, we do not take the shortest path, but have to use neighboring data points as hubs to hop in between the data points. The geodesic distance of the data points $x_i$ in observation space may be estimated by constructing a neighborhood graph N that connects the data point with its K nearest neighbors in the data set X. A pairwise geodesic distance matrix may be constructed with the Dijkstra's shortest path algorithm. In order to reduce the dimensions and obtain a data set Y, multidimensional scaling (MDS) may be applied to the pairwise geodesic distance matrix. MDS seeks to retain the pairwise distances between the data points as much as possible. The first step is applying a stress function, such as the raw stress function given by $$\Phi(Y) = \sum_{ij} (\|x_i - x_j\| - \|y_i - y_j\|)^2, \quad \text{(Formula 2.8)}$$

in order to gain a measure for the quality or the error between the pairwise distances in the feature and observation spaces. Here, $\|x_i - x_j\|$ is the Euclidean distance of the data points $x_i$ and $x_j$ in the observation space with $y_i$ and $y_j$ being the same for the feature space. The stress function can be minimized by solving the eigenproblem of the pairwise distance matrix.

The Isomap algorithm thus reduces the dimension by retaining the pairwise geodesic distance between the data points as much as possible.

Classification for Machine Learning

In machine learning, it is not only the extraction of features that is of great scientific interest, but also the necessity of taking decisions and judging situations. Classification techniques may help a machine to differentiate between complicated situations, such as those found in laser processing. Therefore classifiers use so-called classes that segment the existing data. These classes can be learned from a certain training data set. In the ongoing research into AI and cognitive machines, Artificial Neural Networks were developed relatively early in the process. In comparison, the concepts of Kernel Machines and reinforcement learning appeared only recently but showed increased cognitive capabilities.

Artificial Neural Networks

Artificial Neural Networks (ANN) have been discussed extensively for decades. ANN was one of the first successes in the history of Artificial Intelligence. Using natural brains as models, several artificial neurons are connected in a network topology in such a way that an ANN can learn to approximate functions such as pattern recognition. The model allows a neuron to activate its output if a certain threshold is reached or exceeded. This may be modeled using a threshold function. Natural neurons seem to "fire" with a binary threshold. However, it is also possible to use a sigmoid function, $$f(x) = \frac{1}{1 + e^{-vx}}, \quad \text{(Formula 2.9)}$$

with v as parameter of the transition. For every input connection, an adjustable weight factor $w_i$ is defined, which enables the ANN to realize the so-called learning paradigm. A threshold function o can be expressed using the weight factors W and the outputs from the preceding neurons P, $o = W^T P$, with a matrix-vector notation. The neurons can be layered in a feedforward structure, Multi-Layer Perceptron (MLP) or, for example, with infinite input response achieved using feedback loops with a delay element in so-called Recurrent Neural Networks. A MLP is a feedforward network with a layered structure; several hidden layers can be added if necessary to solve nonlinear problems. The MLP can be used with continuous threshold functions such as the sigmoid function in order to support the backpropagation algorithm stated below for supervised learning. This attempts to minimize the error E in $$E = \frac{1}{2}\sum_i (z_i - a_i)^2, \quad \text{(Formula 2.10)}$$

from the current output $a_i$ of the designated output $z_i$, where the particular weights are adjusted recursively. For an MLP with one hidden layer, if $h_j$ are hidden layer values, $e_i$ are input values, $\alpha \geq 0$ is the learn rate, and $\epsilon_i = z_i - a_i$, then the weights of the hidden layer $w_{ij}^1$ and the input layer $w_{ij}^2$ are adjusted according to, $$\Delta w_{ij}^1 = \alpha \epsilon_i h_j, \quad \text{(Formula 2.11)}$$

$$\Delta w_{ij}^2 = \alpha \sum_m e_m w_{mi}^1 e_j. \quad \text{(Formula 2.12)}$$

The layers are enumerated starting from the input to the output. For backpropagation, the weights are adjusted for the corresponding output vectors until the overall error cannot be further reduced. Finally, for a classification of C classes, the output layer can consist of either C output neurons, representing the probability of the respective class, or a single output neuron that has defined ranges for each class.

ANN can thus learn from or adapt to a training data set and can find a linear or a nonlinear function from N input neurons to C output neurons. This may be used for classification to differentiate a set of classes in a data set.

Kernel Machines

In general, a classification technique should serve the purpose of determining the probability of learned classes occurring based on the measured data. Classification can be mathematically formulated as a set of classes $c_i = c_1, \ldots, c_N$ in C, with a data set represented by $x_i \in \mathbb{R}^n$, and a probability of $p_i$, $$p_i = p(c_i | x_i) = f_c(x_i, \theta). \quad \text{(Formula 2.13)}$$

The parameter $\theta$ may then be chosen separately for every classification or can be learned from a training data set.

Figure 1E:
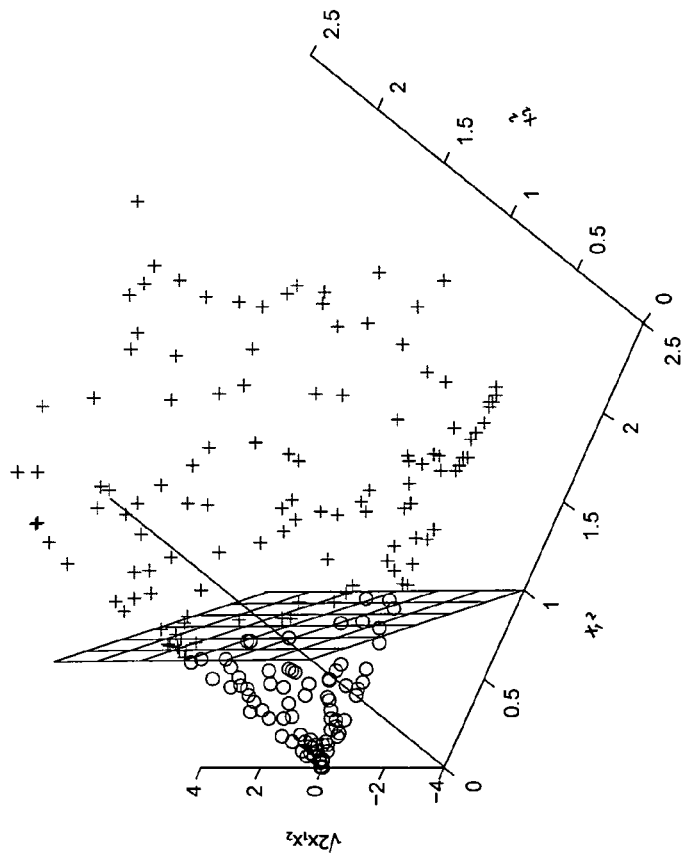
FIG. 1E shows a mapping of two-dimensional test data to a three-dimensional space with an optimal linear separator.
Figure 1E:
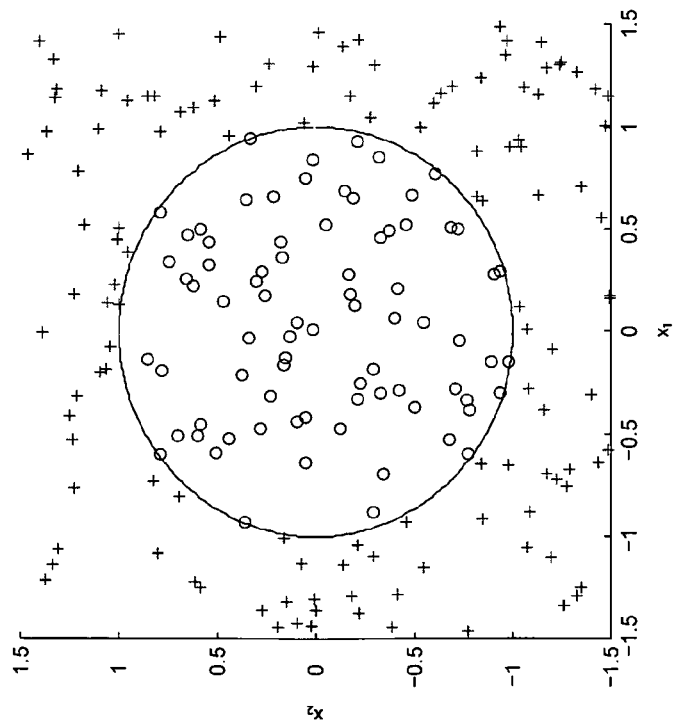

In order to achieve learning, it is desirable to facilitate efficient training algorithms and represent complicated nonlinear functions. Kernel machines or Support Vector Machines (SVM) can help with both goals. A simple explanation of SVM, or in this particular context Support Vector Classification (SVC), is as follows: in order to differentiate between two classes, good and bad, we need to draw a line and point out which is which; since an item cannot be both, a binary decision is necessary, $c_i \in \{-1, 1\}$. If we can only find a nonlinear separator for the two classes in low-dimensional space, we can find a linear representation for it in a higher-dimensional space, a hyperplane. In other words, if a linear separator is not possible in the actual space, an increase of dimension allows linear separation. For instance, we can map with function F a two-dimensional space $f_1 = x_1$, $f_2 = x_2$ with a circular separator to a three-dimensional space $f_I = x_1^2$, $f_{II} = x_2^2$, $f_{III} = \sqrt{2} x_1 x_2$ using a linear separator, as illustrated in FIG. 1E.

SVC seeks for this case an optimal linear separator, a hyperplane, $$H = \{x \in \mathbb{R}^3 | ox + b = 0\} \quad \text{(Formula 2.14)}$$

in the corresponding high-dimensional space for a set of classes $c_i$. In three-dimensional space, these can be separated with a hyperplane, H, where o is a normal vector of H, a perpendicular distance to the origin $|b|/\|o\|$, and o with an Euclidean norm of $\|o\|$. In order to find the hyperplane that serves as an optimal linear separator, SVC maximizes the margin given by, $$d(o, x_i; b) = \frac{|ox_i + b|}{\|o\|}, \quad \text{(Formula 2.15)}$$

between the hyperplane and the closest data points $x_i$. This may be achieved by minimizing the ratio $\|o\|^2/2$ and solving with the optimal Lagrange multiplier parameter $\alpha_i$. In order to do this, the expression, $$\sum_{i=1}^{l} \alpha_i + \frac{1}{2} \sum_{j=1}^{l} \sum_{k=1}^{l} \alpha_i \alpha_j c_i c_j (x_i \cdot x_j), \quad \text{(Formula 2.16)}$$

has to be maximized under the constraints $\alpha_i \geq 0$ and $\Sigma_i \alpha_i c_i = 0$. The optimal linear separator for an unbiased hyperplane is then given using, $$f(x) = \text{sign}\left(\sum_i \alpha_i c_i (x \cdot x_i)\right), \quad \text{(Formula 2.17)}$$

allowing a two-class classification.

SVM has two important properties: it is efficient in computational runtime and can be demonstrated with equations 2.16 and 2.17. First, the so-called support vectors or set of parameters $\alpha_i$ associated with each data point is zero, except for the points closest to the separator. The effective number of parameters defining the hyperplane is usually much less than 1, increasing computational performance. Second, the data enter expression 2.16 only in the form of dot products of pairs of points. This allows the opportunity of applying the so-called kernel trick with $$x_i \cdot x_j \mapsto F(x_i) \cdot F(x_j) = K(x_i, x_j), \quad \text{(Formula 2.18)}$$

which often allows us to compute $F(x_i) \cdot F(x_j)$ without the need of knowing explicitly F. The kernel function $K(x_i, x_j)$ allows calculation of the dot product to the pairs of input data in the corresponding feature space directly. However, the kernel function applied throughout the present invention is the Gaussian Radial Basis Function and has to fulfill certain conditions, as in $$K_G(x_i, x_j) = e^{-\gamma \|x_i - x_j\|^2}, \quad \text{(Formula 2.19)}$$

with $\gamma$ as the adjustable kernel parameter.

Because we have so far discussed only binary decisions between two classes, we note here that it is also possible to enable soft and multi-class decisions. The latter can be achieved in steps by a pairwise coupling of each class $c_i$ against the remaining n−1 classes.

SVC can thus be used to learn complicated data. It structures this data in a set of classes in a timely fashion. Mapping into a higher-dimensional space and finding the optimal linear separator enables SVM to use efficient computational techniques such as support vectors and the kernel trick.

Fuzzy K-Nearest Neighbor

Unlike the previously discussed Support Vector Machines, a less complicated but highly efficient algorithm called the Fuzzy K-Nearest Neighbor (KNN) classifier can also separate classes within data. The algorithm can categorize unknown data by calculating the distance to a set of nearest neighbors.

Assume we have a set of n labeled samples with membership in a known group of classes. If a new sample x arrives, it is possible to calculate membership probability $p_i(x)$ for a certain class with the vector's distance to the members of the existing classes. If the probability of membership in class A is 90% compared to class B with 6% and C with just 4%, the best results seem to be apparent. In contrast, if the probability for membership in class A is 45% and 43% for class B, it is no longer obvious. Therefore KNN provides the membership information as a function to the K nearest neighbors and their membership in the possible classes. This may be summarized with $$p_i(x) = \frac{\sum_j^K p_{ij}\left(\frac{1}{\|x-x_j\|^{\frac{2}{m-1}}}\right)}{\sum_j^K \frac{1}{\|x-x_j\|^{\frac{2}{m-1}}}},$$ (Formula 2.20)

where $p_{ij}$ is the membership probability in the ith class of the jth vector within the labeled sample set. The variable m is a weight for the distance and its influence in contributing to the calculated membership value.

When applied, we often set m=2 and the number of nearest neighbors K=20.

Reinforcement Learning

In contrast to previous learning methods, which learn functions or probability models from training data, reinforcement learning (RL) can facilitate learning using environmental feedback from an agent's own actions in the long-term, without the need for a teacher. This entails the difference between supervised and unsupervised learning. If a long-term goal is sought, positive environmental feedback, also known as reward or reinforcement, may support improvement. An agent may learn from rewards how to optimize its policy or strategy of interacting with the real world, the best policy being one that optimizes the expected total reward. RL does not require a complete prior model of the environment nor a full reward function. The artificial agents therefore indicate cognitive capability and act in a similar manner to animals, which may learn from negative results like pain and hunger and from positive rewards like pleasure and food. In this case we pick that the agent has to use a value function approach, in which it attempts to maximize its environmental return.

In RL, an agent takes actions, $a_t$, in an environment that it perceives to be its current state, $s_t$, in order to maximize long-term rewards, $r_t$, by learning a certain policy, $\pi$. However, before we can start learning with reinforcement we have to find answers regarding the appropriate agent design. The agent could try to maximize the expected return by estimating the return for a policy $\pi$. This agent behavior is also referred to as value function estimation. The agent may evaluate the action by estimating the state value using a state-value function $V_\pi(s)$, considering a certain policy $\pi_w$ that is continuously differentiable, as in $$V_\pi(s) = E\left(\sum_{t=0}^\infty \gamma^t r_t \,\middle|\, s_0 = s\right).$$ (Formula 2.21)

Using this function the agent may estimate the expected return for a given state and a following policy. It could also estimate the expected return for an action, following a given state and policy. Therefore, the agent chooses an action considering the given state from the state-action function or Q-function, as in $$Q_\pi(s,a) = E\left(\sum_{t=0}^\infty \gamma^t r_t \,\middle|\, s_0 = s, a_0 = a\right).$$ (Formula 2.22)

The next action therefore relies on a reward function $r_t$ and in order to allow the agent to grant a concession for expected future rewards over current rewards, the discount factor $0 \leq \gamma \leq 1$ may be selected. It is possible to set how much the agent should discount for future rewards, for instance future rewards are irrelevant for $\gamma=0$.

In RL, the methods may be subdivided into groups such as value function based methods or direct policy search. Many different actor-critic algorithms are value function based methods, estimating and optimizing the expected return for a policy. In order to realize a value function based method, the behavior for an artificial agent and the underlying control problem may be stated as a Markov decision process (MDP). The system perceives its environment over the continuous state set, where $s_t \in \mathbb{R}^k$ and $s_0$ as the initial state. It can choose from a possible set of actions $a_t \in \mathbb{R}^m$ in respect to a stochastic and parameterized policy defined as $\pi(a_t|s_t)=p(a_t|s_t)=p(a_t|s_t, w_t)$, with the policy parameters $w \in \mathbb{R}^k$. With a learned policy, it can be mapped from states to actions with respect to the expected rewards $r_t \in \mathbb{R}$. The reward after each action relies on $r_t(s_t, a_t)$. If no environmental model is available, the mentioned actor-critic methods can potentially develop policy-finding algorithms. The name is derived from the theater, where an actor adapts its actions in response to feedback from a critic. This can be obtained using a given evaluation function as a weighted function of a set of features or a so-called basis function $\phi(s)$, which then gives the approximation of the state-value function with value function parameters v, as in $$V_\pi(s) = \phi(s)^T v.$$ (Formula 2.23)

Improving the policy is an optimization issue that may be addressed with a policy gradient. The choice of the policy gradient method is critical for convergence and efficiency. Both seem to be met by the Natural Actor-Critic (NAC) algorithm, as described by J. Peters and S. Schaal, "Natural actor-critic", Neurocomputing, Vol. 71, no 7-9, pp. 1180-1190, 2008, where the actor improves using the critic's policy derivative g as in equation 2.24, $$g = \nabla_w \log \pi(a_t|s_t).$$ (Formula 2.24)

The steps for improvement of policy parameters of the NAC algorithm are then calculated using, $$w_{t+1} = w_t + \alpha \hat{g},$$ (Formula 2.25)

where $\alpha$ is the learning rate, and $\hat{g}$ is the natural gradient calculated using the Fisher metric or is derived from the policy as demonstrated within the mentioned NAC algorithm publication. The NAC algorithm with LSTD-Q is fully documented at table 1 on page 1183 of J. Peters and S. Schaal, "Natural actor-critic", Neurocomputing, vol. 71, no. 7-9, pp.

1180-1190, 2008. It is applied with a parameterized policy $\pi(a|s)=p(a|s, w)$ initial parameters $w=w_0$ comprising the following steps in pseudo code:

```
1: START: Draw initial state s_0 ~ p(s_t) and select parameters
   A_{t+1} = 0; b_{t+1} = z_{t+1} = 0
2: For t = 0,1,2,...do
3:    Execute: Draw action a_t ~ π(a_t|s_t), observe next state
      s_{t+1} ~ p(s_{t+1}|s_t, a_t), and reward r_t = r(s_t, a_t).
4:    Critic Evaluation (LSTD-Q(λ)): Update
4.1:     basis functions: φ̃_t =[φ(s_{t+1})^T,0^T]^T, φ̂_t = [φ(s_t)^T,∇_w log π(a_t|s_t)^T]^T,
4.2:     statistics: z_{t+1} =λz_t + φ̂_t ; A_{t+1} = A_t + z_{t+1} (φ̂_t − γ φ̃_t)^T ;
         b_{t+1} =b_t + z_{t+1} r_t,
4.3:     critic parameters: [v_{t+1}^T, ĝ_{t+1}^T]^T =A_{t+1}^{-1} b_{t+1},
5:    Actor: If gradient estimate is accurate, update policy parameters
5.1:     w_{t+1,} = w_t + α ĝ_{t+1}, and forget (reset) statistics. END.
```

The basis functions $\phi(s)$ may be represented by mapping the sensor data input into a feature space as we discussed it elsewhere in this document. In this case the basis functions are equal to the feature values. The basis functions may as well be chosen differently or the agent may use raw sensor data. The basis function may as well incorporate adaptive methods or an own learning step, that maximizes with the reward function results.

It is important to note that other RL agents are applicable as well. Many other policy learning agent concepts may be applied. It furthermore is inventive to use other sources as reward signal $r_t$ besides the classification output or quality indicator. For instance it is possible to apply a post-process or pre-process sensor as reward signal source. If a camera-based or laser triangulation post-process sensor monitors the processing results and a user desires a specific weld seam width, such as 5 mm, the reward signal could give positive rewards whenever the desired weld seam width is achieved and negative if it misses the desired weld seam width. The reward function could be the probability value between 0 and 1 or −1 to 1 of a measured data of a post-process sensor to be part of a good or bad class, which is determined by a classifier as described above. In case a pre-process sensor is used for giving a reward $r_t$, a measuring result like a crossing point of a triangulation line crossing the joint area of a workpiece or two workpieces, which usually results in a good processing result after processing, could be used as a classification boundary for classification and thus for a reward function. An RL agent could find a parameter set to achieve this goal. For industrial use cases this would serve as standalone system, without the necessity to teach a classification unit. The RL agent would learn parameters to adjust the incoming feature values in order to achieve a specific weld seam width. Such as system may be delivered without the necessity to find any parameters, the RL agent would choose them. The same would be possible with an RL agent learning to achieve a predefined meltpool size, kerf width, or cutting quality. The RL agent could learn from features generated from different sensor data sources such as photodiode data, camera sensors, acoustic sensor, processing gas values, etc. The RL agent could adapt laser power, x/y/z position/movement of the processing head relative to the workpiece, processing gas type and pressure, feed-rate of added materials in case of other cladding, cutting, welding, soldering, or material processing techniques. Especially noteworthy is that the discussed techniques are applicable to laser-hybrid welding, laser soldering, arc welding, plasma welding and cutting. Another exemplary welding setup would be to have in-process photodiode sensors and a post-process triangulation sensor giving a reward signal for an RL agent for a specific welding seam width. Another exemplary cutting setup would be to have in-process features from a camera or photodiodes for an RL agent learning how to control processing gas pressure. It is furthermore applicable to give the RL agents action boundaries, limiting their range of actions but also increasing process stability.

Thus reinforcement learning may be a step towards a long-term goal in that it entails learning a policy from given rewards using policy-finding algorithms such as the Natural Actor-Critic.

Cognitive Capabilities for Production Workstations

Cognitive Technical Architecture

An artificial agent is anything that perceives its environment through sensors and acts in consequence of this through actuators. An agent is defined as an architecture with a program. The inspirational role model for this is natural cognition, and we want to realize a similar acting cognition for technical systems. Therefore, the agent will be equipped with cognitive capabilities, such as abstracting information, learning, and decision making for a manufacturing workstation. As part of the process, this section introduces an architecture that creates and enables agents to manage production tasks. In order to do so, the agents follow a cognitive perception-action loop, by reading data from sensors and defining actions for actuators.

A natural cognitive capability is the capacity to abstract relevant information from a greater set of data and to differentiate between categories within this information. Transferring this concept from natural cognition to the world of mathematical data analysis, a combination of data reduction techniques and classification methods is used according to the present invention to achieve something that exhibits similar behavior. In industrial production, many manufacturing processes can be carried out using a black box model, focusing on the ins and outs of the box rather on than what actually happens inside. The connections to the black box that may be used in production systems are generally sensors and actuators. Sensors such as cameras, microphones, tactile sensors, and others monitor the production processes. These systems also need actuators, such as linear drives or robotic positioning, in order to interact with its environment. For every production process, these actuators have to be parameterized. In order to learn how an agent can adaptively control at least one parameter of these production systems, many combinations of self-learning algorithms, classification techniques, knowledge repositories, feature extraction methods, dimensionality reduction techniques, and manifold learning techniques could be used. The present invention provides also different controlling techniques, both open- and closed-loop, using multiple different sensors and actuators. After many simulations and experiments, a simple architecture that demonstrates how these techniques may be combined proved to be successful and reliable, at least for laser material processing. However, the laser processes may be interpreted as a form of black box, and may thus be applicable to other types of production processes.

Figure 2A:
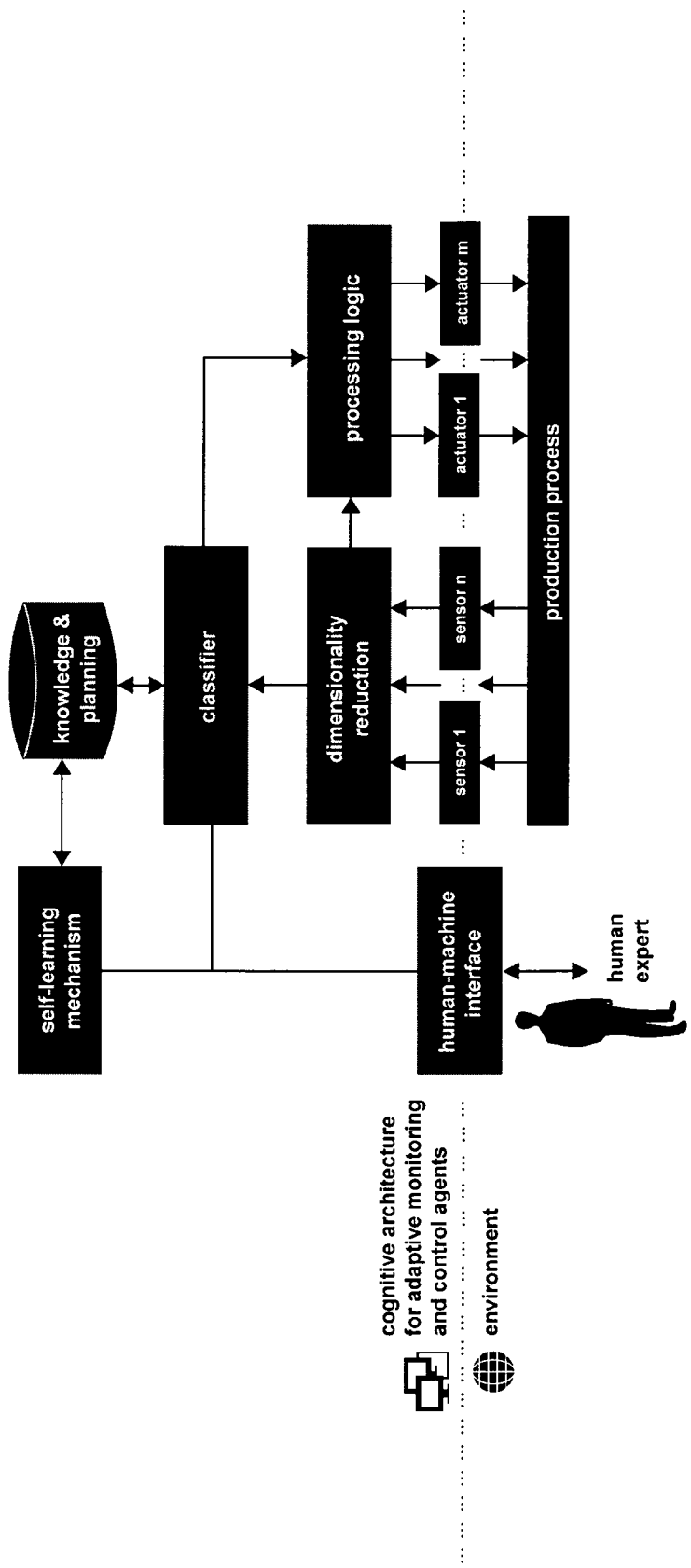
FIG. 2A shows an architecture according to the present invention and component groups to design agents for process monitoring or closed-loop control in production systems using a black-box model with sensors and actuators.

FIG. 2A illustrates a cognitive architecture that may be suitable for designing agents that can provide monitoring or adaptive process control for production tasks. The diagram describes the unit communication and information processing steps. Natural cognition seems to abstract information firstly by identifying representative symbolism, such as structured signals. A similar process can be accomplished using dimensionality reduction (DR), in which the agent uses a low-dimensional representation of the incoming sensor data. Natural cognition then recognizes whether or not knowledge about the incoming sensational events is already present. This step may be achieved by using classification techniques that categorize "sensorial" events or characteristics. A natural subject may decide to learn or to plan new actions. In order to replicate this, the architecture of the present invention offers self-learning techniques that feeds a processing logic. In seeking to achieve quick reactions without the need to start a complex decision-making process, we may also "hardwire" a sensor input that can directly initiate an actuator in using a closed-loop control design. Therefore, the architecture of the present invention may be designed in respect to four modes of usage, which will be discussed individually in the following: first, abstracting relevant information; second, receiving feedback from a human expert on how to monitor and control processes, or supervised learning; third, acting on learned knowledge; and fourth, autonomously controlling processes in previously unknown situations.

A typical procedure used in production systems is to begin by configuring an assembly line, and then monitoring this for quality assurance. This is also the case in laser material processing. When materials are processed using laser light, a high degree of precision is necessary. However, welding or cutting with laser beams is difficult to observe because of the strong radiation and process emissions. For these reasons, many different sensors are used to monitor activities. Even then, it remains difficult for human experts to ascertain whether a welding action was successful or not by evaluating the monitoring results. In industrial production, these processes are usually initially configured over manual trials, resulting in costs in labor and machinery. All of the process parameters are kept constant because any change would result in recalibration costs and may cause production to stop. A cognitive system of the present invention for laser material processing that is capable of reacting appropriately to changes is therefore of great help and is an economic benefit.

As with other cognitive architectures in different contexts than laser material processing, the aim here is similar, creating agents with some kind of artificial intelligence or cognitive capabilities related to humans. Here the goal is to monitor or control processes in manufacturing, where the adaptability of these techniques is an advantage in creating agents for individual processes. When applying these solutions to production processes, the following requirements have to be met. The components should be well-established and understood; they must only need limited configuration efforts, and should ideally work 'out-of-the-box', capable of working with raw sensor data for instance. In addition, they should be able to act quickly, in other words in real-time, with a repetition rate close to perfection or a low error rate. For example, the real-time requirement for laser material processing means that a control-cycle has finished a complete run-through before the processing spot has left the initial position. For common processing speeds, this involves a minimum frequency of 500 Hz.

Figure 2B:
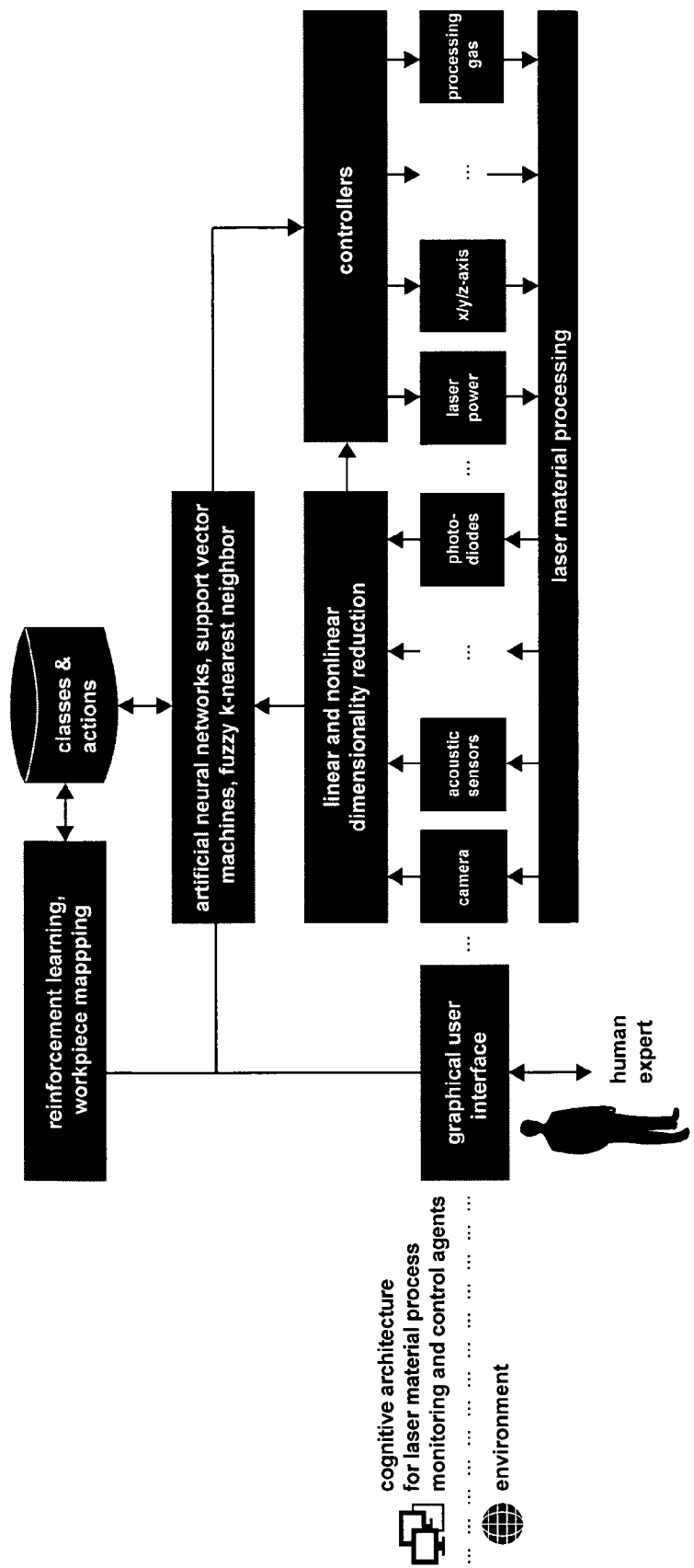
FIG. 2B shows a cognitive architecture according to the present invention providing modules to design monitoring or control agents for laser welding or cutting systems using a black-box model with sensors and actuators.

One approach for a cognitive system design or for creating laser processing agents following the architecture introduced is shown in FIG. 2B. Data processing is structured within this architecture, allowing comparison of different agents. The agents may be composed of several components from different dimensionality reduction and classification techniques, which allow us to compare the performance of composed agents and modules in terms of overall material processing quality. Many different dimensionality reduction and classification techniques may be applicable, and some of these have been evaluated in the research project. The cognitive architecture of the present invention offers the following modules for composing agents: Principal Component Analysis (PCA), Linear Discriminant Analysis (LDA), Isometric Feature Mapping (Isomap), Support Vector Machines (SVM), Fuzzy K-Nearest Neighbors (KNN), Artificial Neural Networks (ANN), and reinforcement learning (RL), along with some other methods. Three embodiments of the present invention of control agents within this architecture would be agent A connecting Isomap, SVM, ANN, and PID welding control of the laser power, or agent B connecting Isomap, SVM, and PID laser cutting control of the processing gas, or agent C connecting ANN and Fuzzy KNN, for control of the z-axis.

Figure 2C:
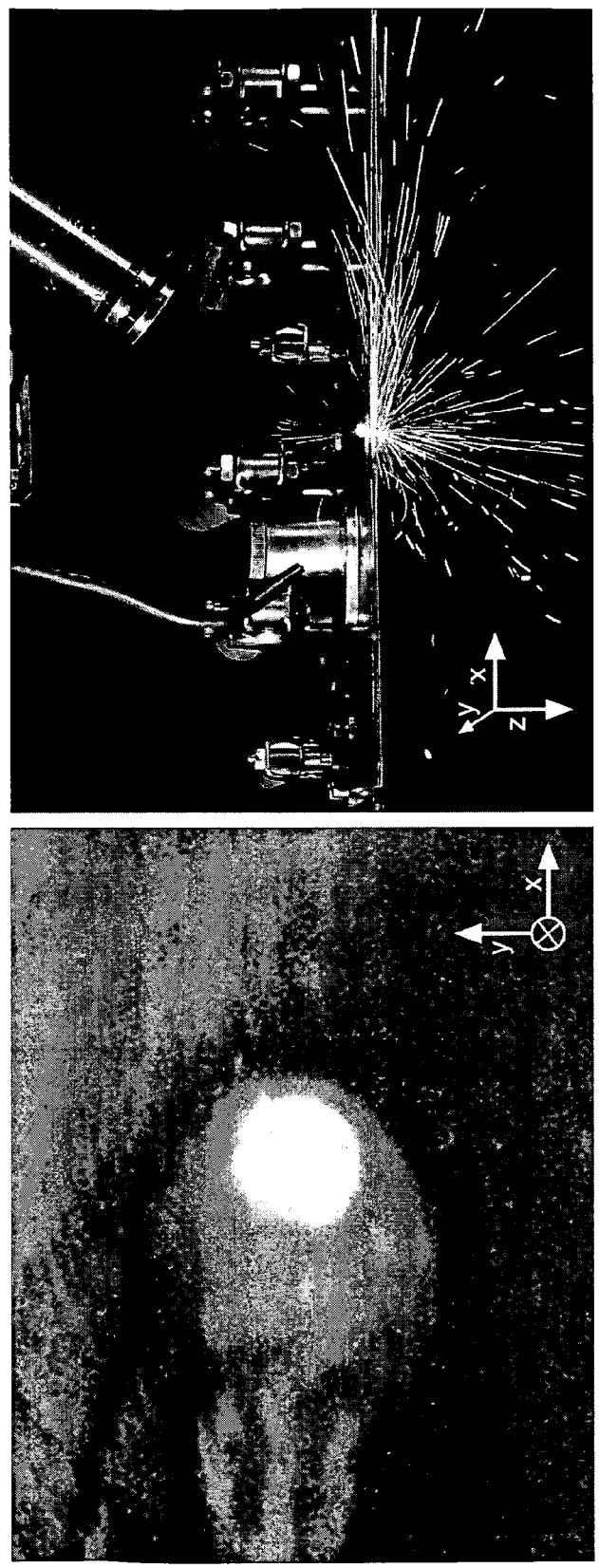
FIG. 2C shows an in-process image taken with a coaxial camera (left) and a laser welding process with acoustic sensors (right)
Figure 2D:
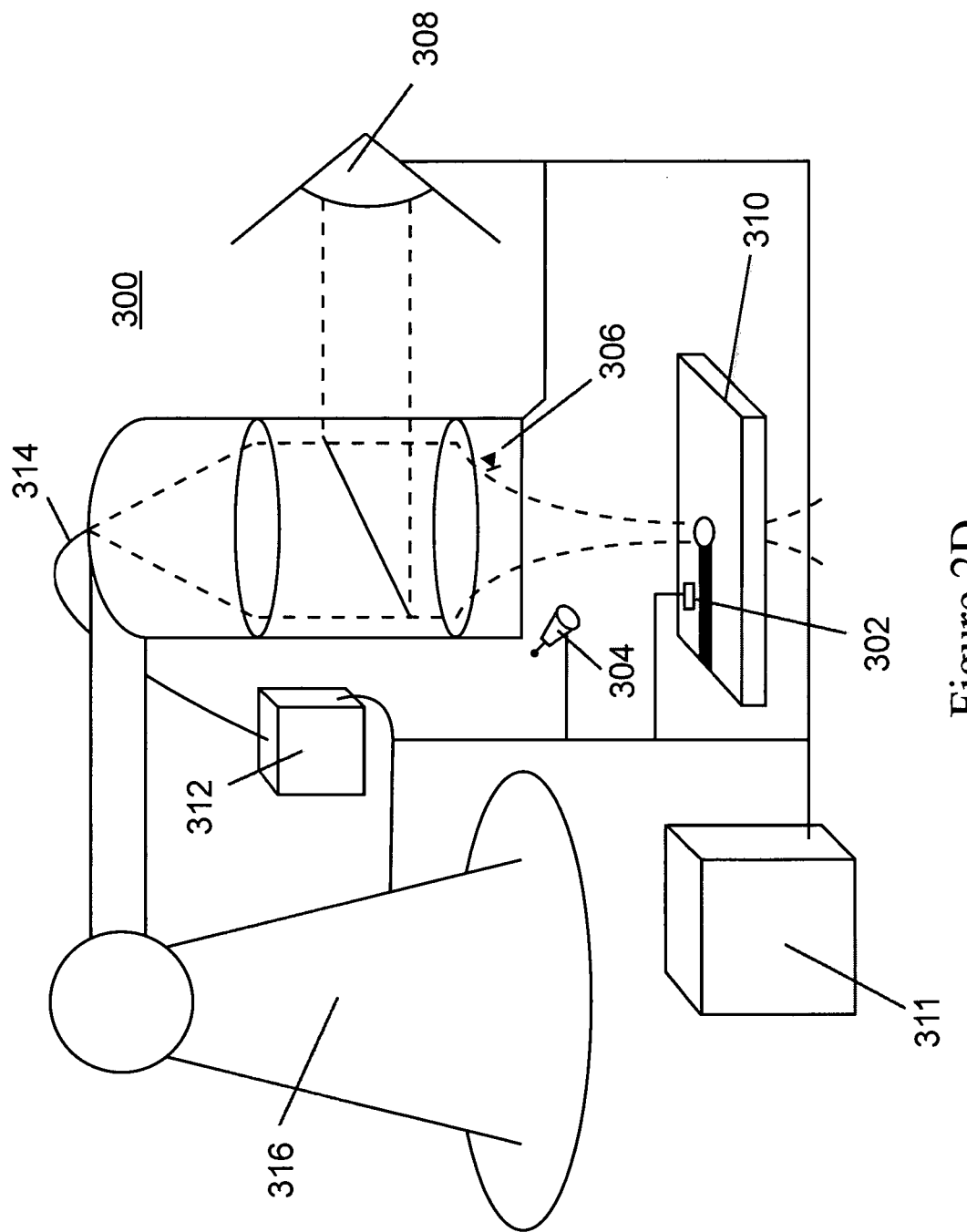
FIG. 2D shows an embodiment according to the present invention with sensors and actuators for laser material processing.

As shown in FIG. 2D, the following sensors are used in the laser material processing head 300 of the present invention: a high-speed camera, sensors for solid-borne 302 and air-borne acoustics 304, and three photodiodes 306 recording process emissions on different wavelengths. Different kinds of coaxially integrated cameras 308 with CMOS sensors could be used according to the present invention. Recordings are preferably taken in the range of 200 frames per second (fps) to 1,500 fps and exposure times in the order of 4 ms and less, with region of interest sizes of 128×256 and 248×410 pixels and similar. An additional low-powered laser or a set of LEDs served as the optional illumination unit for improved image quality. Three different wavelength filtered photodiodes that were integrated into the processing optics captured process emissions at 1,030-1,080 nm, at 1,150-1,800 nm, and at 350-625 nm. The first bandwidth relates to laser back reflection; the latter two correspond to temperature and metal-vapor or plasma radiation. The data from the photodiode sensors 306 was recorded at a sample rate of 20 kHz and 16 bit. As solid-borne acoustic sensors 302 served two identical piezoelectric transducers mounted at two different positions on a workpiece 310. The data from the solid-borne acoustic sensors 302 was recorded at a sample rate of 2 MHz or 192 kHz and 12 bit resolution. In some experiments, two microphones are used as air-borne acoustic sensors 304, one with an omnidirectional and the other with a selected directional characteristic. One microphone was pointed towards the interaction zone, while the other captured the ambient sound. The data from air-borne acoustic sensors 304 was recorded at a sample rate of 96 kHz and 24 bit. The sensor alignment during a laser weld and an illuminated in-process camera picture is presented in FIG. 2C. The data from the sensors 302 to 308 are processed in a cognitive data processing unit 311.

As actuators, we have used the laser power and the processing gas. The laser source 312 that is used is a fiber laser, wherein the laser beam is coupled into the laser processing head 300 via a fiber 314. The lasing wavelength is 1,070 nm in a continuous waveform, with a laser power range of 50 to 1,500 W. The processing gas is pure nitrogen $N_2$. As mounting and moving devices, we either used a six-axis robot 316 moving the laser processing head 300 over the static workpiece 310, or moved the workpiece under a static processing head using a transport unit. The applied optics are either YW50/52/30 processing heads for welding or a YRC processing head for cutting. It is emphasized that the laser material processing head 300 could be employed as a laser cutting head 100 or as a laser welding head 200, as shown in FIGS. 1A and 1B.

The sensor setup of the present invention allows to collect a lot of sensor data from laser cutting or welding processes and to influence this using critical process parameters through the selected actuators. According to the present invention, the high volume sensor data is then reduced to relevant process information.

Abstract Relevant Information

In natural human cognition, we abstract or absorb information from everything that we hear, feel, and see. Therefore, we only generally remember the most interesting things. Inspired by this, a technical cognitive system should similarly abstract relevant information from a production process.

Working with abstracted features rather than with raw sensor data has certain advantages. Many weak sensor signals may be reduced in dimension to fewer but better signals, resulting in a more reliable feature. Additionally, in order to realize real-time process control, it is necessary to reduce the volume of the incoming sensor data because a greater amount of data may have a significant influence in causing longer execution times for the entire system.

The architecture of the present invention requires a test run in order to abstract initial information. During this period of agent training, the parameter range of the actuator that will be controlled is altered. In order to determine which information is most relevant, the agent should explore its own range of actions. After the initial reference test, the system analyzes the recorded sensor data in order to discover representative features. The agent may solve feature calculations separately for different kinds of sensors, but the sensory units should ideally be trained to map the sensory input into the learned feature space. Finding a useful representation of the feature space is critical because the system will only be able to recognize or react to changes in the feature values. For the cognitive laser material processing system, we introduced cameras, photodiodes, and sensors for solid-borne and airborne sound, offering a wealth of valuable process information.

The purpose of the cognitive processing of the present invention is to provide as much information as possible for the subsequent processing steps. However, the raw sensor data contains repetitions, correlations, and interdependencies that may be neglected. Therefore, in order to abstract the relevant information, the most significant features, or those that contain the most information, should be identified. In order to do this "cognitively", an agent should perform this task without the necessary supervision of a human expert. Therefore, a method of feature extraction is chosen that can be applied to all of the different kinds of processing tasks and the corresponding sensor data without the need to change parameterization or re-configuration. Manifold learning or dimensionality reduction techniques satisfy this need. They can reduce a sensor data set X of dimension n in observation space to a data set Y of dimension p in feature space. Often, the new quantity p is much less than n. However, many linear and nonlinear dimensionality reduction techniques have been tried and tested for different purposes. The present invention provides a suitable feature extraction technique for production workstations, complying with the following requirements the feature extraction method works transparently and is able to display the processing steps to the user. The feature extraction method is able to run unsupervised. The feature extraction method is executable within a reasonable timeframe for configuration, especially during processing. The extracted features contain enough process information for reliable classification within several workpieces.

Figure 2E:
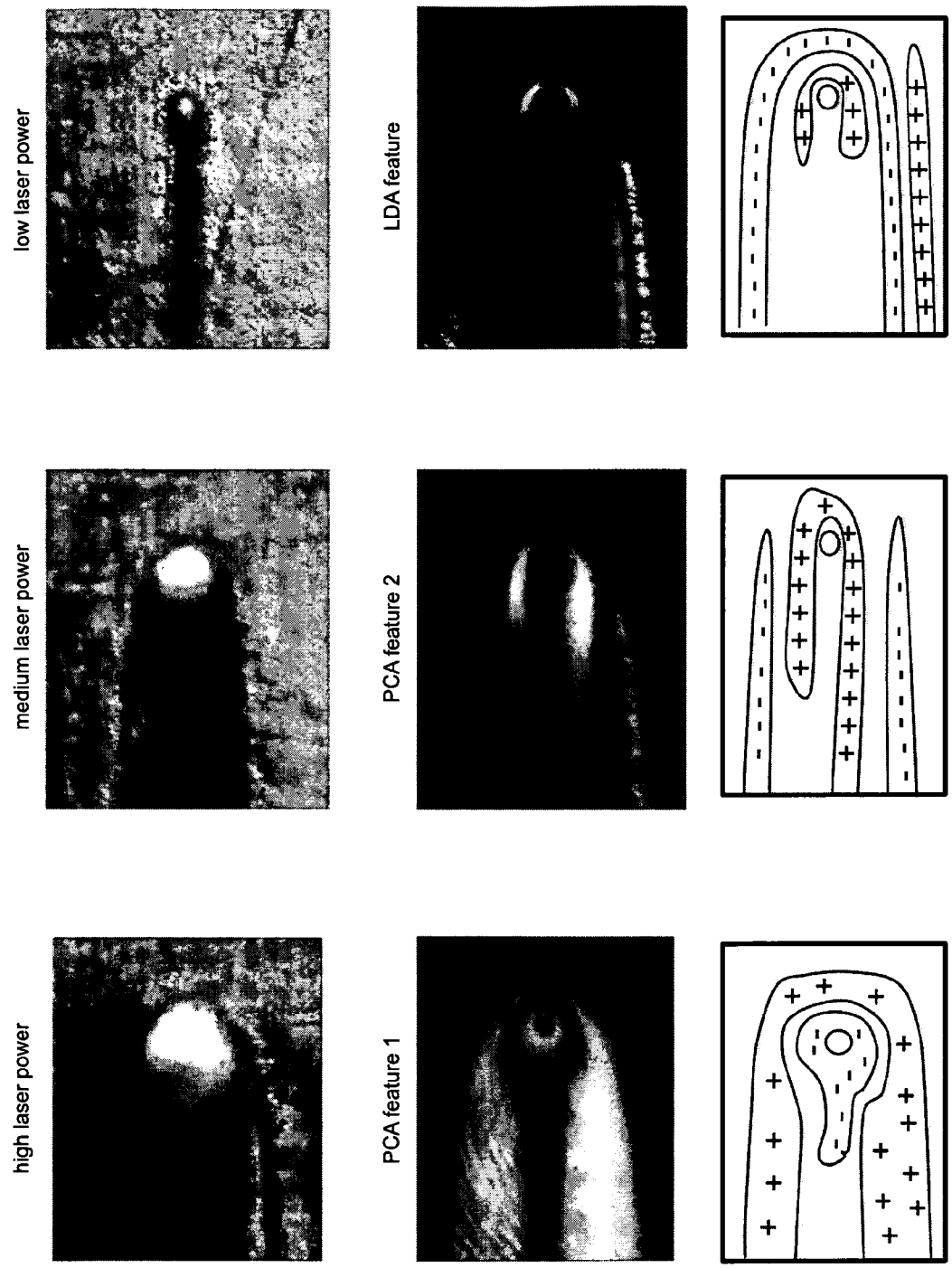
FIG. 2E illustrates a process of the present invention for reducing in-process pictures to camera features: upper row, in-process pictures for low, medium, and high laser power—middle row, PCA and LDA features with a mapping having bright areas with positive or negative variance values and black areas for variance values around zero—lower row, feature maps of middle row being illustrated schematically.

In essence, PCA seeks orthogonal linear combinations that represent a greater data set. These may be calculated for incoming sensor data vectors. Exemplary video data and its principal components are demonstrated in FIG. 2E. These eigenvectors may serve as features for classification up to a threshold d. Feature extraction combined with classification may be achieved using Linear Discriminant Analysis. Analyzing the same data set using LDA and three learned quality classes defined as "good", "medium", and "bad" provides another set of features, as is also demonstrated in FIG. 2E. Feature extraction may also be achieved using the Isomap algorithm. Unfortunately, the nonlinear feature cannot be displayed in the same way as the linear feature extraction of LDA and PCA. All features show the important characteristics from laser welding, such as keyhole, melt pool form and size, as well as weld seam width. If an agent perceives a welding process with these features, it may detect the named characteristics by processing just a few feature value signals, compared to thousands of noisy picture pixel signals.

The extracted features of the methods named above are compared in the following. The LDA feature seems to contain more details than any one of the PCA features. Using this method of calculating, the LDA features seem to contain more process information in fewer features than PCA because they are especially designed to separate the desired classes. Furthermore, it is possible to display the calculated features using PCA and LDA in a way that makes these two methods more transparent than Isomap. The user gets an idea of what a process looked like if a feature is identified in a process video simply by looking at it. PCA and Isomap have the advantage that they can run unsupervised, which is not possible with LDA. Therefore, LDA merely serves as a comparison to PCA, but is not considered as an alternative for the desired architecture. Furthermore, the LDA feature seems to be very individualized for a particular process. Isomap has considerably higher execution times for analysis and out-of-sample extension. Therefore, if classification with PCA achieves sufficient results, then it is more applicable to the system under research. Therefore, the method of choice would be PCA, unless Isomap shows a significantly better performance toward the first object of the present invention. We have to postpone the final choice of dimensionality reduction techniques because the most important quality measures are the experimental results, which are the basis of the present invention.

In essence, dimensionality reduction may allow agents to abstract relevant information in terms of detecting variances and similarities during a training trial. This helps the agent to process only a few feature values compared to the significantly higher volume of raw sensor data. Furthermore, dimensionality reduction may support the perception of similarities in unknown situations, for instance similar welding characteristics such as melt pool size and form, even if these have not been part of the training. This may improve the adaptability of the agents to unknown but similar situations.

Supervised Learning from Human Experts

In natural human cognition, for instance in childhood, we often learn from others how to manage complex tasks. Similarly, a machine should have the possibility of learning its task initially from a human expert. Supervised learning seems to be the most efficient way of setting up a cognitive agent for production. In industrial production, a qualified human supervisor is usually present when the production system is being installed or configured. The architecture that we are examining uses human-machine communication in order to receive feedback from an expert, for instance through an intuitive graphical user interface on a touch-screen tablet computer. As mentioned above, at least one test action per actuator or test run is needed in this architecture as an initial learning phase. During these tests, the agent executes one actuator from within the desired range of actions, and the sensor data input is stored. After this run, an expert provides feedback concerning whether the robot has executed the actuator correctly, or if the action was unsuccessful or undesirable. The feedback may come in many different categories so that different kinds of failures and exit strategies may be defined. A classification technique may then collect the features together with the corresponding supervisory feedback. Combined with lookup tables, the classifier module will serve as knowledge and as a planning repository for a classification of the current system state. How an agent may perform its own actions and give itself feedback will be of importance for the next section; this section mainly covers the cognitive capability of learning from a human expert, and the application of this knowledge for monitoring purposes.

Support Vector Machines, Fuzzy K-Nearest Neighbor, and Artificial Neural Networks as classification techniques will now be discussed. The more that the human expert teaches the machine, the likelier it is that the system will achieve the desired goal. In order to save costs, the necessary human supervisor time should be minimized to just one or two reference tests, if possible.

Laser material processing systems as well as their processes are usually set up and configured by human experts. The architecture discussed may simplify and accelerate this process. When the system performs a test action, such as a laser power ramp for welding, a human expert indicates how the processing result would be classified for the different workpiece areas using a graphical user interface that displays the workpiece. For instance, the expert may mark a poor or medium weld that did not use enough laser power, a good weld, and a poor or medium weld that had too much laser power applied. The system of the present invention stores this information together with the extracted characteristics or features described above using a classification technique. All of the above named classifiers achieved good results; the extracted characteristics seem to be separable from each other for many different process setups. In order to compare the performance of the different classification techniques, the following quality measures may be stated: The classification techniques should be executable within a reasonable timeframe, especially if applied for closed-loop control. The classification should not have false positives and should be robust in transitional areas. The classification techniques should be transparent to the user. The classification techniques should make reasonable decisions in unknown situations.

A reasonable timeframe, or real-time for closed-loop control purposes, should not exceed 2 ms per cycle. The SVM, ANN, and Fuzzy KNN are classification techniques which may all be used for classification within a reasonable timeframe; however, KNN seems to be the fastest of these. It may be shown that the classification techniques have a very good repetition rate in classifying data or features from laser processing, especially not having false positives in a high number of experiments. However, reliability within cognitive architecture also depends heavily on feature quality and the initial human expert feedback. The detailed experimental evaluation in the following shows the robustness and classification quality regarding the monitoring of a lack of fusion when welding zinc-coated steel. However, inspection has already shown that ANN may not be as transparent as SVM and KNN. With SVM, for instance, data clouds stored within the classifier may be visualized, as is shown in FIG. 1E. Data stored in the many nodes of an ANN does not seem to be as comprehensible for the user. However, ANN showed very reasonable behavior in unknown situations in monitoring experiments compared to the other techniques.

An ANN could be trained to classify N classes. This means that the output layer can consist of either C output neurons, representing the probability of the respective class, or a single output neuron that has defined ranges for each class. The latter is used in this case for the monitoring experiments; the output neuron has a value of 0.0 for class 1, 0.50 for class 2, 1.0 for class 3, and 0.25 or 0.75 where no classification is possible. A single output neuron may not only serve for monitoring, it may also be a stable input signal for controller equation 3.2. In this case, an MLP with 35 input neurons and two hidden layers proved to be suitable. The selected ANN configuration, "35-20-3-1" has been found in experiments as the best tradeoff between accuracy and the ability to generalize nonlinear welding processes. The incoming sensor data stream was reduced in dimension using linear dimensionality reduction, as described above; the number of dimensions was selected using residual variance analysis, resulting in 10 features from the diode sensors, 10 features from the solid-borne acoustic sensors, 10 from the camera sensor, and 5 from the microphones. The acoustic and photodiode sensor data has been processed for this case using fast Fourier transform and PCA.

Figure 2F:
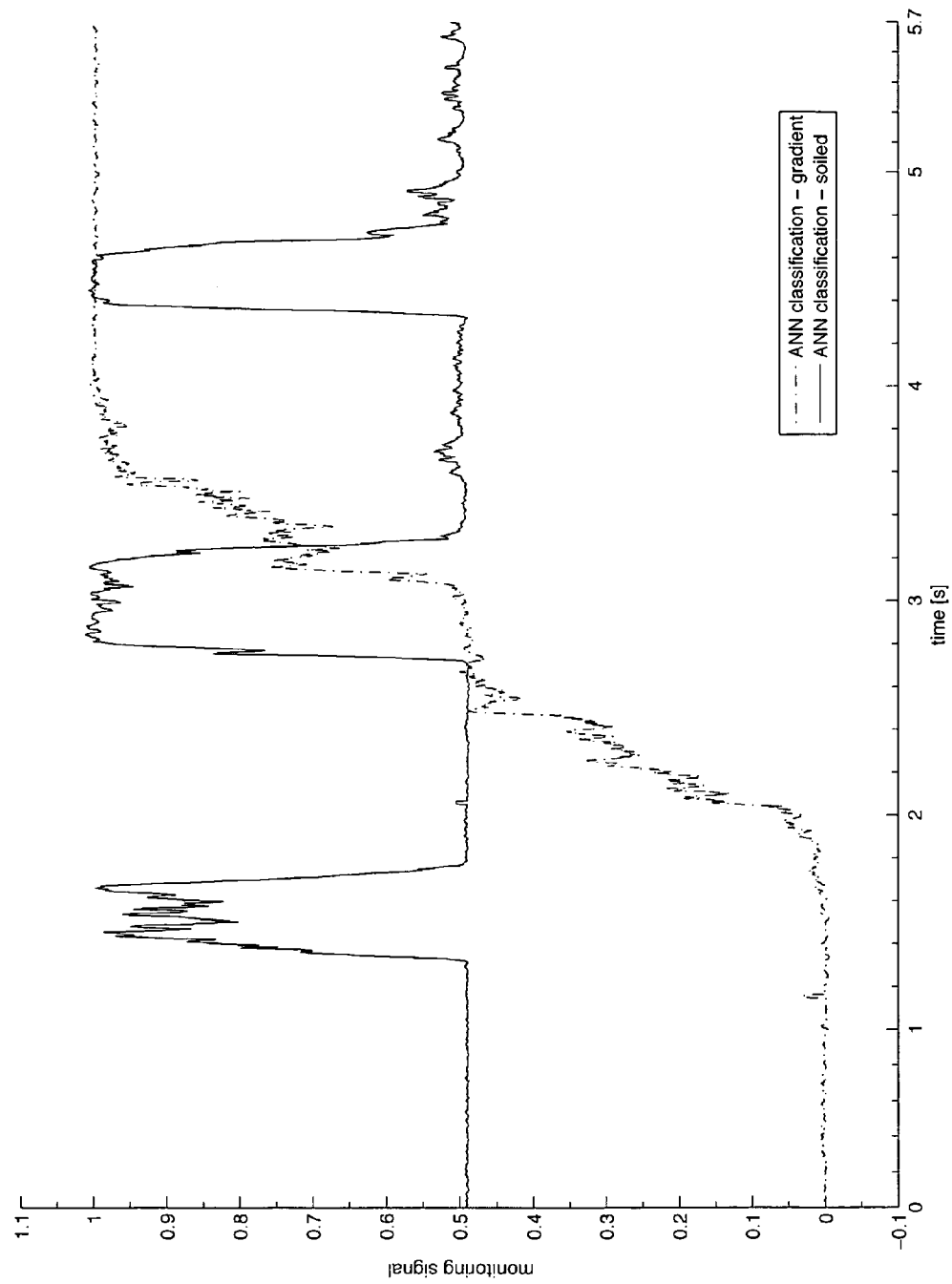
FIG. 2F shows monitoring signal values for a welding agent according to the present invention detecting laser power gradient and soiled workpieces using Artificial Neural Networks; monitoring signal values around 0.5 indicate optimal laser power, smaller than that indicate too low and greater values too high laser power.

The monitoring results are summarized in FIG. 2F. Once the ANN has been trained with a laser power ramp from 50 W to 1,500 W, it is able to categorize this kind of gradient when processing another workpiece with the same laser power ramp. As a human expert taught the monitoring agent that full workpiece penetration results in high connectivity, the agent now provides a robust monitoring signal for this purpose. The agent of the present invention decides when the laser power is too low that there is not enough connection, monitoring a signal value of 0.0, thus class 1. The agent identifies when the correct laser power is applied with 0.50 for class 2, and provides the monitoring signal value 1.0 for too high laser power. Common issues in industrial welding are workpieces that are soiled with oil or grease that influence the welding result. In this case, the laser light can supposedly couple better into the workpiece at the soiled areas than at a clean surface. The laser power is therefore too high, resulting in a poor weld seam. Although the agent has not been trained in this scenario, in this experiment the monitoring agent has been able to identify the soiled areas, with an appropriate suggestion that the laser power is too high.

The classification method is an important module within the cognitive architecture which designs agents that are capable of providing reliable monitoring signals. While KNN can be executed in the least time while still being transparent to the user, ANN and SVM have the ability to differentiate complex data as it is the case for laser material processing. Therefore, if KNN proves to be suitable in the experiments, it would be the method of first choice.

Semi-Supervised: Acting on Previously Learned Knowledge

The previous discussion shows how agents in the investigated cognitive architecture perceive their surroundings and learn from a human expert, as well as displaying their knowledge in terms of monitoring. The provided monitoring signal based on selected features is obtained from different sensors that are interpreted using a trained classifier. This monitoring signal seems to have improved quality and may be applicable to the control of process parameters. The agent would then change its position from observing the processing to actually acting upon the gained knowledge. However, if an agent is also applicable to process control in industrial processing, it has to fulfill many requirements with a performance close to perfection. The following are some of the requirements for the underlying cognitive architecture: The process control module should be capable of completing at least one control-cycle from sensor input to actuator output before the interaction zone has moved on. The controlled parameter should have an effect on the process outcome when altered, while simultaneously responding in a timely fashion. The process control module should be optimized in terms of providing a balance of reliable stability and necessary dynamics.

Figure 3:
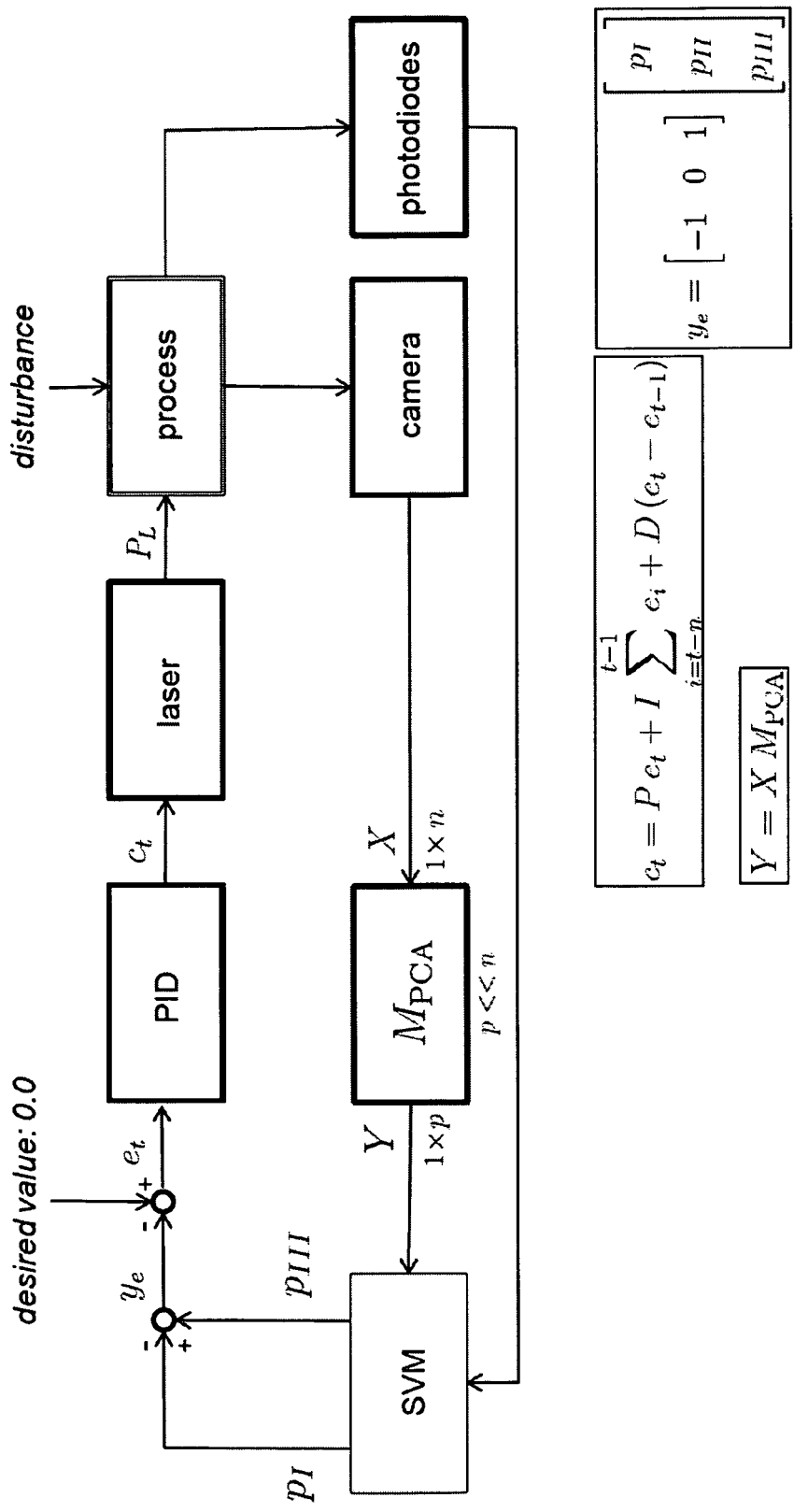
FIG. 3 shows an embodiment of real time closed loop architecture of the present invention.

In order to realize a robust process control that is suitable for industrial production processes, a fast or real-time closed-loop control is often required. An embodiment of real-time closed-loop control architecture of the present invention is illustrated in FIG. 3. The advantage of the architecture under investigation is that the use of features rather than raw sensor data permits faster completion of control-loops with a minimal loss of information. In this architecture, any kind of controller design may be implemented that fits with the classification output. A simple version would have three possible classification output values: too much, class I; correct, class II; and too little laser power, class III. This may be expressed using $$y_e = [-1 \ 0 \ 1] \begin{bmatrix} p_I \\ p_{II} \\ p_{III} \end{bmatrix}, \quad \text{(Formula 3.1)}$$

where p are the class probabilities and $y_e$ the quality indicator.

A PID controller could adjust a parameter of the system's actuators according to the monitoring signal discussed above concerning supervised learning from human experts. Combining PID-control with the classification results enables the agents to perform laser power controlled processing. This can be realized as shown in $$c_t = Pe_t + I \sum_{i=t-n}^{t-1} e_i + D(e_t - e_{t-1}), \quad \text{(Formula 3.2)}$$

with P for proportional, I for integral, and D for derivative behavior. The goal is to minimize the error $e_t$ between the quality indicator $y_e$, the output of the classification module, and the desired value of 0.0. In this context, the inventive applicability of the desired value in dependency of a probability class related quality indicator gives the opportunity to vary this value to optimize the desired process results. For instance, the laser processing system may learn how to weld with a penetration depth of 1 mm at a desired value of 0.0. Lowering the desired value towards a value of −1.0 would result in less penetration depth. Increasing the same would result in higher penetration depth up to full or root penetration of a joint. Assuming the system would learn laser power or processing gas parameters for a desired cutting quality or kerf width, adjusting the desired value would result in wider or thinner kerf widths. Therefore, within this approach the system can estimate process models for individually different processes. Having such a model represented by feature space mapping and classification gives the user additional options to influence the process outcome. The user can for instance either fine tune single process outcomes work piece by work piece or apply different desired values online while processing the same work piece.

One approach describes a PID control with an ANN and corresponding experiments. Another investigates the usage of an SVM classification module to control laser welding. Other work uses processing gas as the actuator for a control agent in laser cutting in order to minimize dross. There is a description of the control of the z-axis by an ANN classification module fed only by camera features. A comparison of several control methods discusses SVM and ANN classification modules, as well as bypassing classification and the linearized control of individual features. The latter method is also indicated to be a short path from dimensionality reduction to control in FIG. 2B. However, the controller module and its setup should be as simple as possible, with a standard configuration in order to maintain usability. If the processing task requires it, more research into adaptive and nonlinear controller designs as modules within the investigated architecture would presumably be promising.

Unsupervised: Learn and Gain Knowledge from Agent Feedback

While a production system operates with a process control agent created within the architecture discussed, it may be that the system experiences something new that it had not previously learned. Although every attempt was made to keep all of the processing parameters constant for a configured process, influences may occur in varying workpieces, such as changes in the mounting or workload properties. This may be the case in assembly lines if workloads change, or if any other process parameter that is not recognized by the system is altered. The precision demanded in processes that treat metals with laser beams means that they are sensitive to the slightest, generally unintended change. A novelty check based on the trained data may detect such differences. In this cognitive architecture, this would result in a change of system mode, either to supervised learning if a human expert were present, or to unsupervised machine learning. Thus, the cognitive agent may try to solve the problem by itself using a self-learning mechanism. In the remainder of this section, a mapping of the characteristics is described as one proposed solution to this problem.

Because it is inspired by natural cognition, the architecture of the present invention abstracts information, which reduces the volume of data. The term activation patterns may also be understood as features representing sensory events. For instance, using the proposed dimensionality reduction module, a lower dimensional feature calculated from the training events would indicate if the system has experienced a certain event. Presumably, it is more likely to identify similarities in unknown situations and trained data within the lower dimensional feature space. Again, a classification method may be able to categorize and distinguish all events. Because the proposed procedure of using the cognitive architecture involves training workpieces with an intended actuator alteration, this may be utilized to map from one training workpiece in a known process scenario to another in a different but similar surrounding, for instance when manufacturers change workloads.

As suggested, a self-learning mechanism is integrated into the system of the present invention. A novelty check on the basis of the trained features can detect new or previously unknown situations. In these cases, the system performs another test action and classifies the new workpiece using the previously trained features. This time, it does not need to consult a human expert; it can map the gained knowledge onto the new workpiece autonomously and can adjust the process control appropriately. If this step is successful, the agent gains "fresh" features from the new process that may improve the ongoing production task. In simple words, the agent learns new features by mapping old ones. With this step, a workload change or sensor data offset, such as a rise in temperature, could be overcome.

Figure 4:
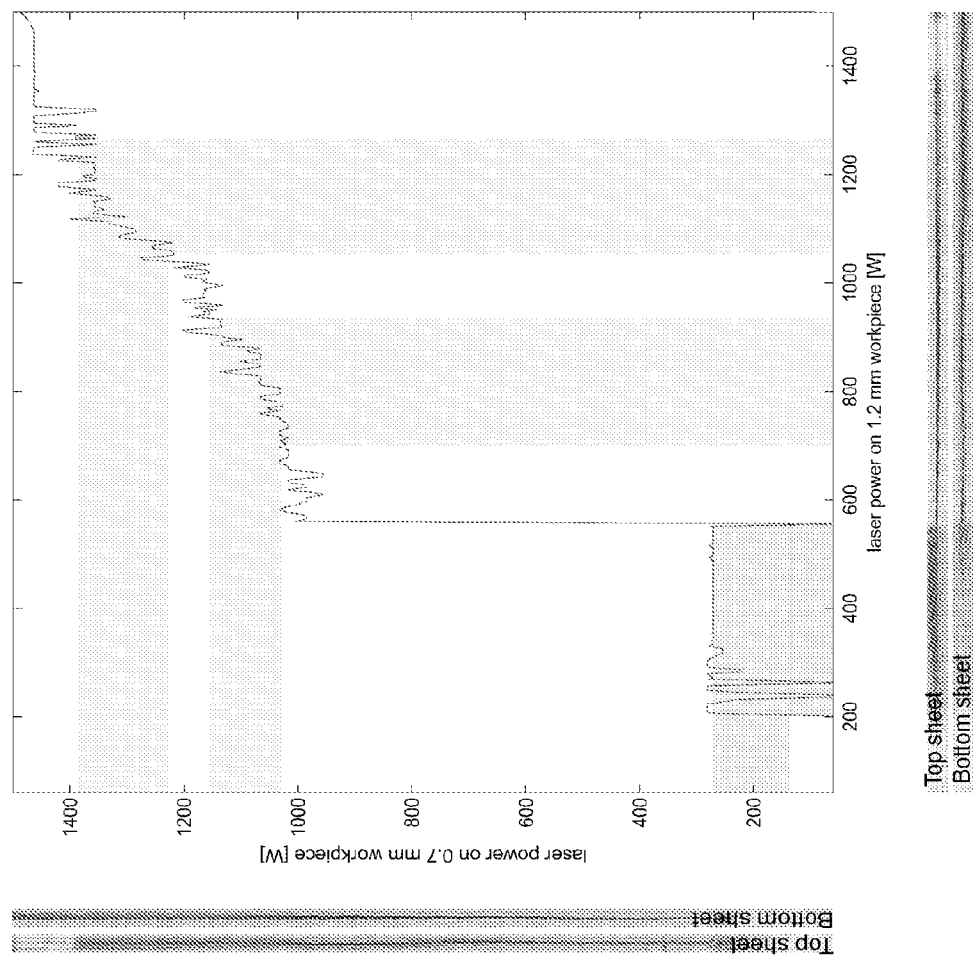
FIG. 4 shows a mapping of laser cutting features according to the present invention from a reference workpiece onto workpieces with a change in thicknesses from 1.2 mm to 0.7 mm stainless steel; colored zone indicates trained classes and the new areas for additional feature learning.

The following embodiment of the present invention describes the scenario of changing material thickness in a cutting process, for instance because of a workload change. The new material is almost half as thick, with 0.7 mm stainless steel compared to 1.2 mm. The agent detects that the feature values are unknown during processing through a novelty check within the classification unit. Because no human expert is present, the agent performs the same action as for the training workpieces. In this case, it alters its actuator, the laser power, from 1,500 W to 50 W during the training, just as it did in the last training. The agent then maps the features from the old workpiece by calculating the probabilities from the old classes within the new workpiece, as is shown in FIG. 4. All of the previously trained areas have been identified in reasonable regions of the new workpiece; the agent excludes those areas on the new workpiece that correspond to a kerf width to which the agent does not aspire. Because the agent knows the laser power that it has applied in this training, it can calculate the new features in the detected class regions of the current workpiece. This expands the reaction probabilities of the agent to the new sensation capability, utilizing many different features that were both known before and recently learned.

The cognitive architecture proposed for production systems and laser material processing enables agents to gain several cognitive capabilities, such as obtaining relevant information, learning from a human expert, and reacting to new situations based on previously learned knowledge. This architecture may be used for different kinds of systems controlling one or several actuators based on the input of a high amount of sensor data. Compared with some other high-level learning approaches, the learning and reacting capabilities seem to be limited or not human-like; however, the architecture underlying this investigation has the potential to be very robust in terms of data acquisition. It is easy to use and can realize fast computing, up to real-time closed-loop control of complex systems such as the industrial applications analyzed in the following.

Thus, cognitive capabilities: different agent designs enable two learning modes: supervised and unsupervised. Demonstrations show that the agents can learn from a human expert and transfer knowledge for instance how to cut a new workpiece almost just half as thick.

Experimental Validation for Laser Material Processing

Introduction and Definitions

If the offered cognitive architecture of the present invention is applied to industrial laser material processing, there is improvement in industrial laser welding, laser cutting, or other processes with similar demands. Firstly it is investigated whether welding defects such as a lack of fusion may be learned and monitored. Then the possibility of relating knowledge, decision-taking utilizing classification techniques, and laser power control is examined. For unknown situations, a reinforcement learning agent explores the possibilities and learns parameter sets for laser welding.

The embodiments of the present invention have similar but different configurations and parameters to those previously mentioned. However, all of the experimental setups are established in such a way that they reflect common configurations that exist in industrial laser material processing. Some notations and configurations are introduced in advance regarding the optical setup, the materials used, common system configurations, and the presentation of data. The important configurations for the optical system are as follows: all embodiments of the present invention are carried out with fiber lasers at a maximum power of either 1,500 W or 1,000 W, operating at a wavelength of 1,070 nm. The processing optics are a YRC head for cutting and a YW52 head for welding, with three photodiode sensors. Both processing heads are equipped with a coaxially integrated CMOS camera. The interaction zone is illuminated using a de-focused, low cost laser. The focal spot position during the welding processes was set on top the workpiece surface. For welding, the fiber diameter is 100 μm, the focal spot diameter is 200 μm, the Rayleigh-length is 2.6 mm, the focal length is 250 mm, and collimation length is 125 mm. During the cutting process, the focal spot position was set at 1.5 mm beneath the workpiece surface. For cutting, the fiber diameter is 100 μm, the focal spot diameter is 136 μm, the Rayleigh-length is 1.3 mm, the focal length is 100 mm, and collimation length is 73 mm. The relative distance of the processing head to the workpiece surface was maintained at 0.7 mm by a capacitive distance controller. As mentioned previously, laser cutting refers to fusion cutting only. For cutting, the processing gas nitrogen was set at 17 bar. During welding, nitrogen was also used as shielding gas. The processing heads were mounted on a six-axis robot. The imprecision of this during actions is responsible for the occasional signal disturbances in the graphs presented later. Different materials are used for the experiments, and these are defined using the DIN EN 10020 European norm material number. For the remainder of this chapter, stainless steel refers to material no. 1.4301, mild steel refers to material no. 1.0037, and zinc-coated steel refers to material no. 1.0350. A few different standard sets of PID control parameters have been applied; for the remainder of this chapter, these values are $P=10$, $I=0.5$, $D=0$ for cutting, and $P=0.5$, $I=0.1$, $D=0$ for welding, unless otherwise stated. In order to improve readability of the displayed graphs, the data is smoothed over up to 0.04 s; while for improved visualization, the displayed camera features may slightly differ from those used to obtain the feature values curves. The standard system clock rate of the data processing system, used sensors, and laser power control is set at 1,000 Hz. The length of the processed workpieces is 30 cm, with different thicknesses and processing speeds.

In the following, the first embodiment of the present invention regarding monitoring gaps with a lack of fusion in laser welding should be described.

Current industrial solutions may successfully monitor many defects that occur during joining processes. However, detecting insufficient connection or a lack of fusion because of gaps between two sheets is challenging. This defect often occurs if the gap between the two sheets is too large. Even if the laser beam penetrates through the top and bottom layers of the two sheets, the gap may still be too large for a successful joint, and a complete lack of fusion or false friend can occur. Because the beam has penetrated the top and bottom sheets, the defect is often not visible when inspecting the workpiece after processing.

Car manufacturers increasingly integrate zinc-coated alloys. When welding zinc-coated workpieces, it is advantageous to leave a specific gap between the two work-pieces which will be joined. This gap allows any zinc vapor to dissipate during processing. If the gap is too small or does not exist, the welding process may suffer from spilings; if the gap is too large, the process may suffer from insufficient connection or a lack of fusion. The latter is hard to detect in post-monitoring because the weld seam may appear to be sufficient from the outside, even if there is no connection at all. In-process monitoring has also difficulties to detect false friends. Photodiode sensors may not detect a lack of fusion, while coaxially-taken camera pictures are noisy because of the comparatively high reactivity of zinc alloys. Even human experts find it hard to discern whether insufficient connection is present at the observed welding process from coaxially-taken camera pictures. Therefore, a quality aspect of a cognitive technical laser material processing system would be that the monitoring agent can learn how to detect complex welding faults such as lack of fusion in laser welding. Therefore the cognitive architecture creates a monitoring agent capable to learn. The agent's skills will be tested and dimensionality reduction and classification results with a lap weld will be compared.

Agent Learning Mode

Figure 5:
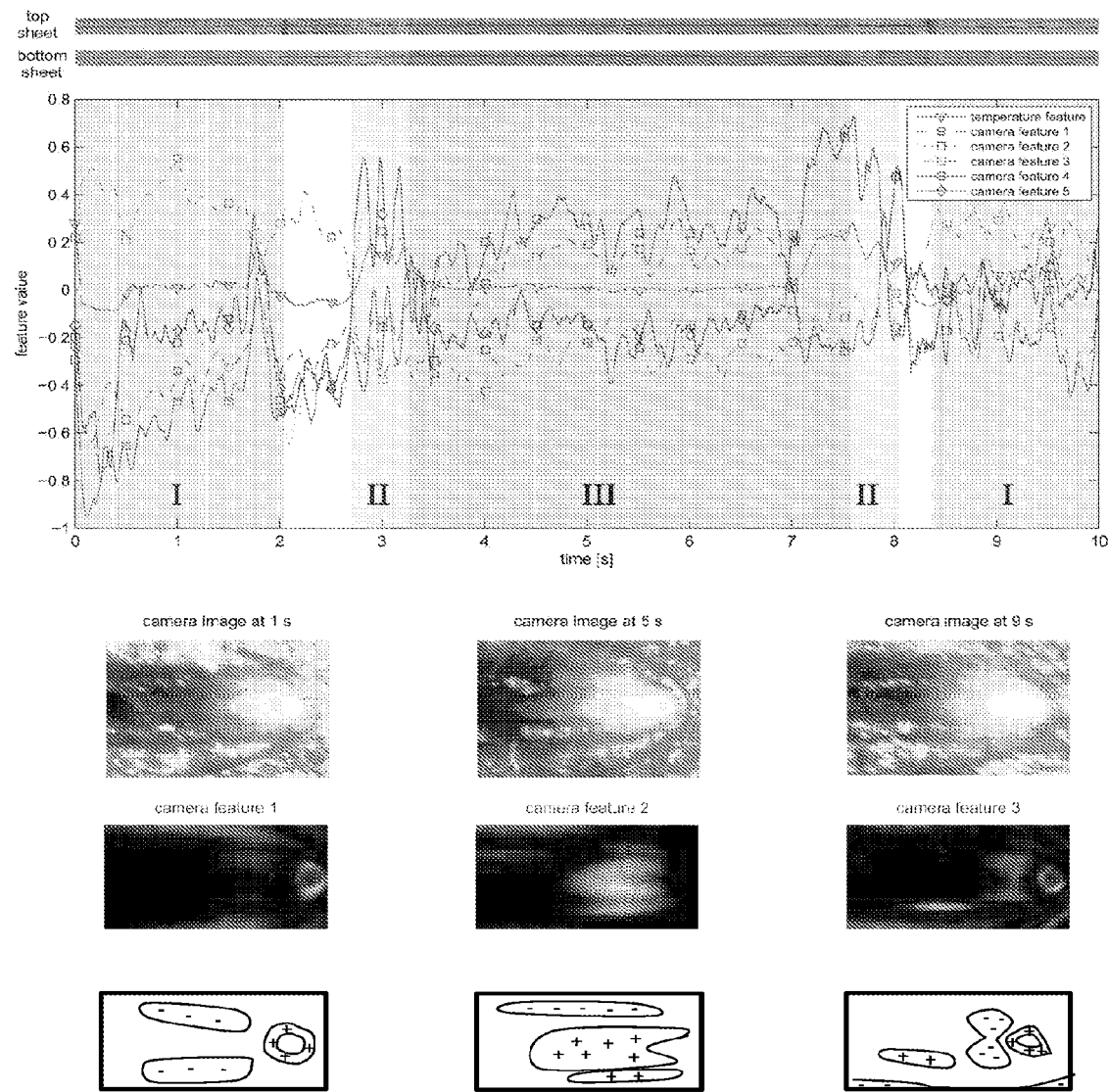
FIG. 5 shows a training workpiece for a monitoring agent according to the present invention with feature values: zinc-coated steel, gap variation from 0 mm to 1.0 mm to 0 mm for a lack of fusion detection with temperature, PCA (camera feature 1 and 2), LDA (camera feature 3), and Isomap (camera feature 4 and 5) feature values vs. processing time—regions I and III indicate the training areas for a lack of fusion (III) and existing connection (I)—a region II indicates the window of an occasional lack of fusions—upper picture row shows coaxially taken in-process camera pictures, with connection left and right and without connection in the middle—middle picture row displays the eigenvectors with a map with bright areas for positive and negative values and black areas for values around zero—lower row, feature maps of middle row being illustrated schematically.

The monitoring agent of the present invention welds two workpieces of zinc-coated steel in order to train itself. The learned feature value graphs, scans, and additional information of one of these workpieces is shown in FIG. 5. Afterwards, in the monitoring mode, the agent observes a set of workpieces and has to decide whether false friends are present or not. The learning task is to extract features from the training workpieces and to connect these with given human expert feedback. This feedback marks the regions of insufficient connection within the training workpieces. Following this, the monitoring agent should be able to detect faulty workpieces. In this embodiment, the agent uses three photodiodes, a solid-borne acoustic sensor, and an in-process camera with an illuminated interaction zone. In helping to detect false friends, the temperature photodiode and the in-process camera pictures provided the best feedback. The sensor data from the video is reduced in dimension using different dimensionality reduction techniques.

Exemplary camera pictures are demonstrated in the upper picture row of FIG. 5. If a camera picture has a resolution of 100×80 pixels, the agent converts this to a vector with 1×8,000 and combines it with the t incoming frames (i.e. t is the number of frames recorded in a certain time window with a predetermined picture rate of the camera) to a data matrix X of size t×n. This matrix then is reduced in dimension to matrix Y of size t×p with p<n. For laser material processing, the sensor data can generally be significantly reduced, with p<<n. The incoming sensor data contains approximately 30 MByte per second, which is reduced in dimension. After this, the incoming feature set contains approximately 10 kByte per second. In order to achieve the reduction, several methods are applicable. The most promising methods, such as PCA, LDA, and Isomap, have been already described in detail. It is possible to display the eigenvectors of LDA and PCA features, as is shown in the middle picture row and as a schematic illustration of the middle row in the lower picture row of FIG. 5. It has been surprisingly found that it is sufficient to use the 10 most significant eigenvectors or features for further evaluation instead of calculating the residual variance. For the training regarding zinc-coated steel workpieces, the agent uses the two best features from Isomap, the two best from PCA, and the best from LDA. The corresponding feature values vs. processing time are shown in FIG. 5. The agent learns from human expert feedback that, in the indicated area class I, the connection is sufficient, and that there is a lack of fusion in the indicated area class III. The area class II in FIG. 5 has not been given to the agent, although a lack of fusion is still present. The knowledge gained from the expert feedback is represented by a set of classifiers, which will be compared later. The indicated areas are used to train the classifiers and LDA. The feature values in FIG. 5 show different amplitudes in the regions with and without connection. In the region with a lack of fusion (area class III), camera features 3 and 4 have a high feature value amplitude. This means that the agent may use these two features to differentiate whether or not a false friend is present or not.

Thus there is an advantage regarding cognitive capabilities: the system of the present invention is adapted to abstract relevant information by reducing the incoming raw sensor data to a thousandth, still capable of monitoring.

This is a good point to compare the employed dimensionality reduction techniques. Judging by the amplitudes of feature values or the signal-to-noise ratio, the features extraction method may be ordered from better to worse by Isometric Feature Mapping (Isomap), Linear Discriminant Analysis (LDA), and finally Principal Component Analysis (PCA) for a training workpiece. The eigenvectors from LDA and PCA may be reshaped to the original picture size, and this provides a better understanding of what the features may indicate. In FIG. 5, these features are color mapped, with the area next to the area class II indicating low variance, and the area class I and the area class III indicating contrary variance. Camera feature 3 from LDA shows a strong correlation with the presence of a lack of fusion. This means that the variation within the in-process video between a lack of fusion and sufficient connection is described within this eigenvector. In this context, camera feature 3 tells us that the false friend in this process can be detected when there is a higher intensity in the camera feature areas class I and a lower intensity in the areas class III. This indicates that the presence of false friends is shown as a variation in the weld pool form. This contributes as a comparison of dimensionality reduction techniques: Isomap seems to be the best in terms of unsupervised feature learning, while LDA is best for additional analysis through the inspection of eigenvectors.

It is remarkable that the weld seams shown in the scanned top and bottom sheets of the training workpiece in FIG. 5 show hardly any visible indications from the outside of a lack of fusion between the joined sheets. This again shows why it is so difficult to detect this defect, earning it the name false friend. However, the feature values of the eigenvectors from PCA, LDA and Isomap indicate a robust correlation to the presence of a lack of fusion; the monitoring agent of the present invention has now been trained in this, and can apply this to detect the same kind of defects in the next subsection.

Agent Monitoring Mode

Figure 6:
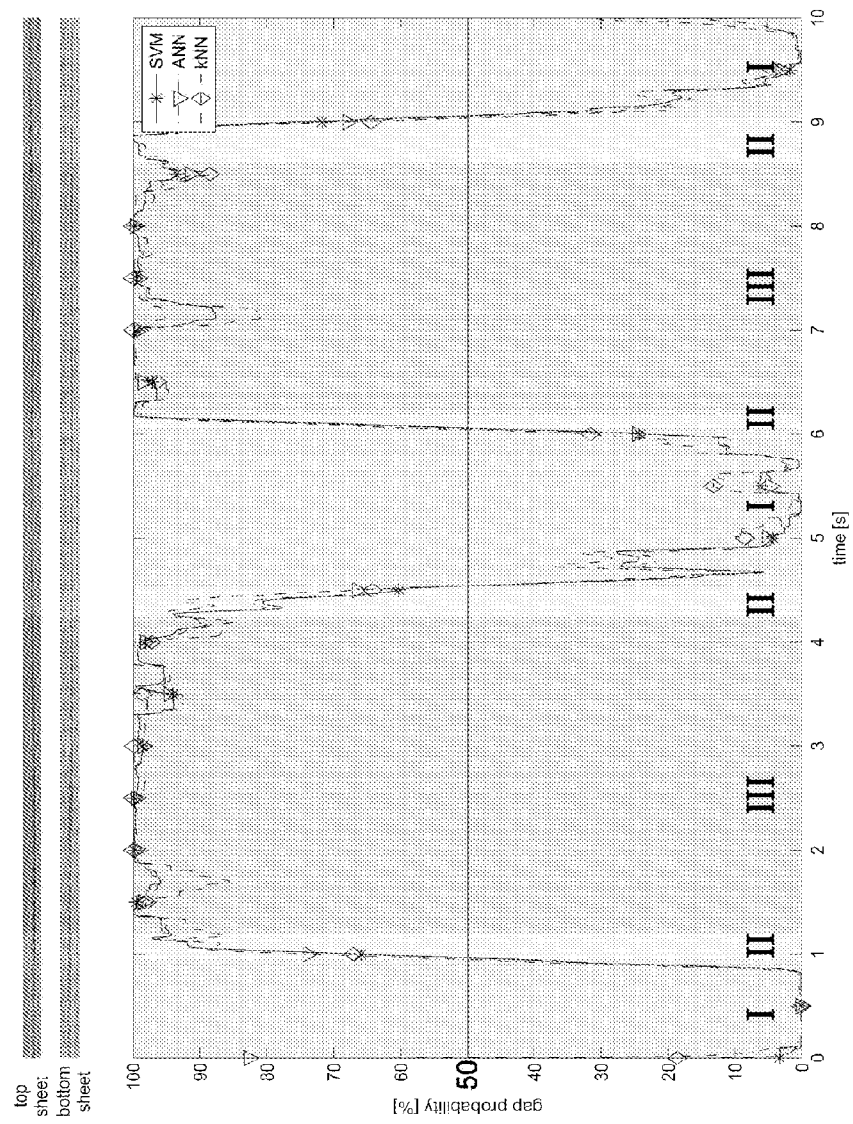
FIG. 6 shows Z001 zinc-coated steel workpiece agent according to the present invention monitored with SVM, Fuzzy KNN, and ANN classification results: two inserted gaps of 1.0 mm at the middle on the left side (left area III) and 0.6 mm at the middle of the right side (right area III) of the workpiece—workpiece has existing connection at the area I and a lack of fusion at areas III from 1.2 s to 4.2 s and 6.2 s to 8.6 s of processing time—the area II shows a lack of fusion at some positions.
Figure 7:
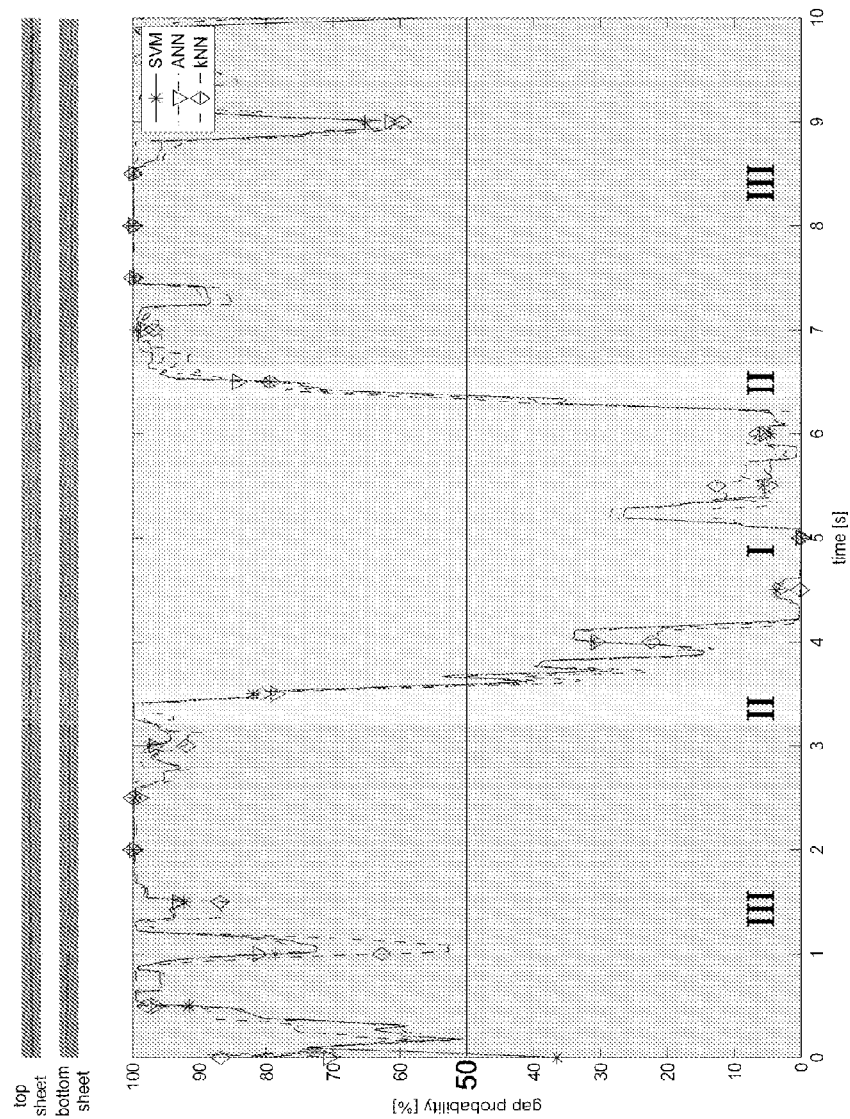
FIG. 7 shows a Z002 zinc-coated steel workpiece agent according to the present invention monitored with SVM, Fuzzy KNN, and ANN classification results: zinc-coated steel, two inserted gaps of 0.6 µm at the far left side (left area III) and 1.0 mm at the far right side (right area III) of the workpiece—workpiece has existing connection at the area I and a lack of fusion at area III from 0 s to 3.2 s and 6.6 s to 10.0 s of processing time—the area II shows a lack of fusion at some positions.

The monitoring agent of the first embodiment of the present invention has to decide for the following workpieces whether a false friend is present or not based on its perception using features and learned knowledge within its classifiers. The knowledge was generated when the human expert provided feedback during the learning mode. The classifiers in this agent use two categories: a "good" class I, with existing connection; and a "bad" class III, with a lack of fusion. The classifier output or monitoring signal provides a calculated probability of whether a false friend is present. Two workpieces are monitored by this agent: workpiece Z001, as shown in FIG. 6; and workpiece Z002, as shown in FIG. 7, with two inserted gaps of 1.0 mm and 0.6 mm at different positions. The figures also contain the false friend probability vs. the processing time.

In order to calculate the false friend probability, the agent uses the classification techniques Fuzzy K-Nearest Neighbor (KNN), Artificial Neural Networks (ANN), and Support Vector Classification (SVC), which have been already described before in detail. The classifier configuration is set to the nearest neighbors for Fuzzy KNN, an ANN configuration of "6-20-3-1", while SVM uses an RBF Kernel described in equation 2.19. All three of these used the same training data in order to provide a comparison of their classification quality. The classifiers are taught the areas of the training workpieces and the corresponding feature values. The task of each classification technique is to identify similarities between the high-dimensional observation space of incoming process features and the learned feature values. The classification technique then calculates a probability for the presence of a lack of fusion.

Workpieces Z001 and Z002 show little indication on the top or bottom sheets of a lack of fusion, as is shown in the scans in FIGS. 6 and 7. However, all of the tested classifiers agree that there are two large areas of a lack of fusion per workpiece. The areas class I and III show human expert feedback for the tested workpieces. Generally speaking, if the classification threshold is 50%, then the monitoring agent agrees with the human expert, except for the beginning of workpiece Z002. The ANN classifier falsely calculates the lack of fusion probability at below 50% in the first milliseconds of the processing time. However, despite this misjudgment by ANN, the other classifiers provide conservative estimates of a lack of fusion, even in the transitional area II indicated regions of the workpieces. Therefore, for the tested workpieces Z001 and Z002, a monitoring agent with SVM or Fuzzy KNN classification would have successfully detected the lack of fusion areas.

Comparing the three classification techniques, ANN did not detect a lack of fusion in a time frame smaller than 1% of the total processing time. SVM and Fuzzy KNN proved to be more robust in this trial. Furthermore, Fuzzy KNN showed more fluctuations than ANN and SVM, but also had the fastest processing times. However, all of the classification techniques displayed comprehensible behavior for this classification task. It may be that the differences between the classification methods are greater when feature acquisition is worse.

Thus, a second advantage regarding monitoring will be apparent: The system has achieved a successful detection of false friends that occurred because of inserted gaps of 1.0 and 0.6 mm within zinc-coated steel lap welds. A reliable detection may increase quality in car body production.

The monitoring agent has learned features on how to monitor the connection from a human expert on two training workpieces. It has then detected robustly the welding defect of a lack of fusion in the tested samples. All of the classification methods discussed seem to be applicable for use as the monitoring agent. However, the classification probability seems to provide a one-dimensional monitoring signal for detecting classes of the learned features. Will it also be possible to apply this to controlling tasks?

Cognitive Closed-Loop Control of Laser Power in Cutting and Welding

In laser cutting and welding, as well as being of commercial interest, research has sought to create an adaptive system for controlling processes. Once reliable process control is achieved, the quality of workpieces may be improved, and efficiency and savings in the significant labor costs and environmental resources may be achieved. Having reliable process control would also strengthen the benefits of using lasers compared to other welding and cutting techniques, since it would target the high configuration and manual trial efforts that are necessary to maintain the required precision standards in laser material processing. According to the present invention, cognitive capabilities such as learning and decision making help to approach this goal. Often many previous attempts suffered from the noisy sensor data input. The absence of global models or absolute sensor data values that are applicable to a wide range of different welding or cutting processes seems to push the vision of online process control far into the future. However, a cognitive agent that can learn these different processes helps to bypass this issue through being able to learn and adapt to individually different processing tasks.

In order to achieve process feedback control, the monitoring signal $y_e$ is used as the control variable. As actuating variable, which could possibly be any alterable process parameter with interrelationship to $y_e$, the laser power seems suitable for its low inertia and its strong relation to $y_e$. Its magnitude is calculated by the PID algorithm as shown in equation 3.2. In order to achieve process control, the agent closes the loop by connecting the monitoring signal to a PID controller, as is shown in equation 3.2. The feedback controller is designed as a single-input-single-output (SISO) control system, which receives the monitoring signal $y_e$ from the classification unit, with $0 < y_e \leq 1$ for too low and $-1 \leq y_e < 0$ for too high laser power, and uses this as reference value to minimize controller error. Variations of laser power have a significant influence on the results in welding and in cutting processes and have a short response time, often less than 1 ms. Another possibility would be to vary the processing speed, but the response time and precision of current robotic or carrier devices is worse when compared to laser power variation. Of course, variation in both speed and laser power should be interdependent. If the welding or cutting results stay the same, the energy per unit length should remain approximately the same, as stated in equations 2.1 and 2.2. Therefore, if the velocity rises, the laser power should be increased with approximately linear correlation. However, because laser material processing has many nonlinear effects, it is unfortunately not that simple. Referring to the equal energy per unit length level is a good method for approximating, if a controller works comprehensibly. Therefore, velocity alteration is a convenient way of proving successful laser power control, which will now be described in the remainder of this section for common industrial welding and cutting setups.

In the following, the second embodiment of the present invention regarding agent control of laser cutting should be described.

Figure 8:
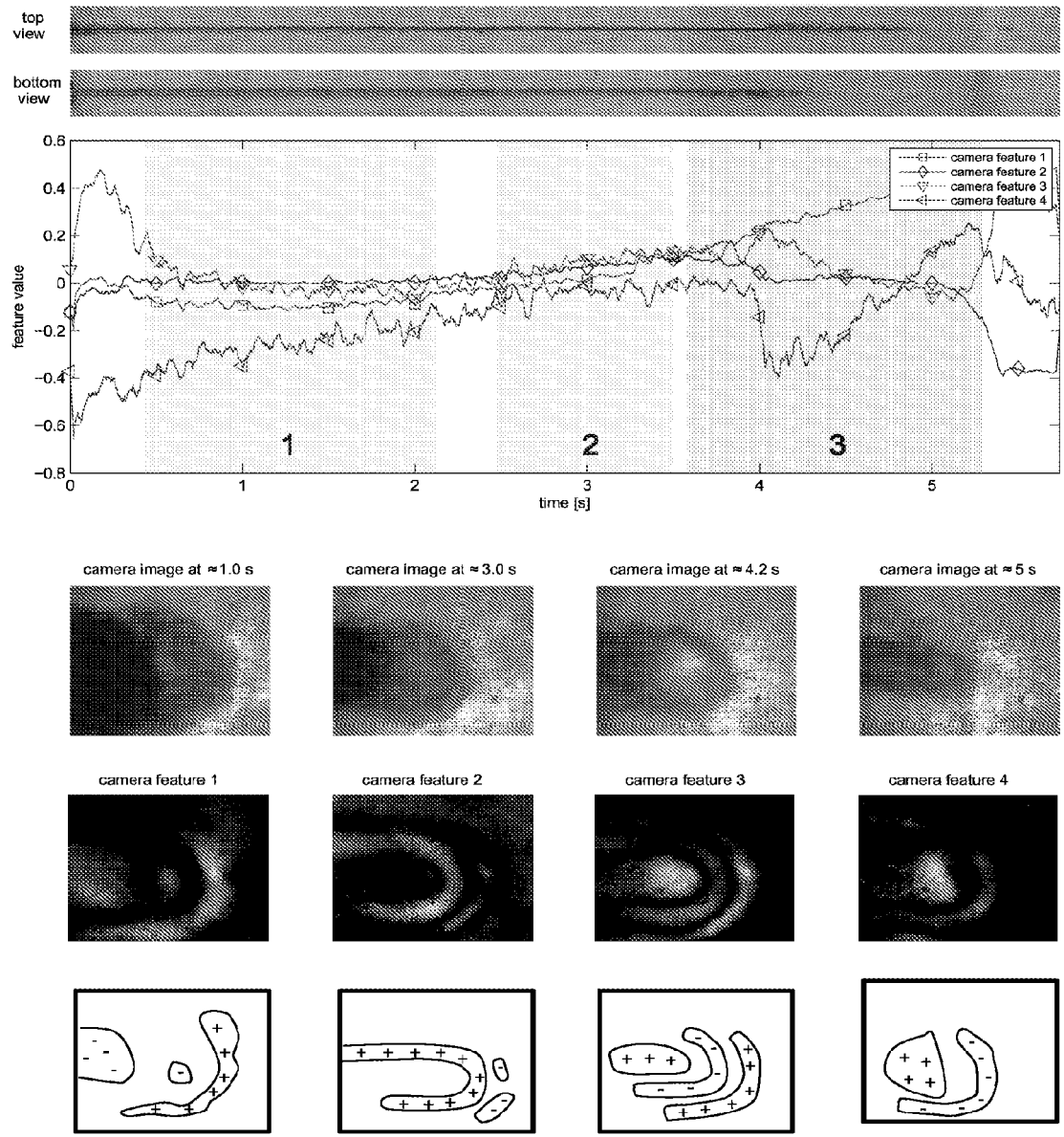
FIG. 8 shows a training workpiece for a cutting control agent according to the present invention: stainless steel, 1.0 mm material thickness, laser power ramp from 1,500 W to 50 W, robot velocity at 3 m/min vs. processing time—upper picture row shows coaxially taken in-process camera pictures—middle picture row displays the eigenvectors with a map with bright areas for positive or negative values, and black areas for values around zero—lower row, feature maps of middle row being illustrated schematically.

The agent of a second embodiment of the present invention requires at least one training workpiece with some laser power variation, in this case from 1,500 W to 50 W. The training workpiece is processed at 3.0 m/min, as shown in FIG. 8. A human expert teaches the cutting control agent to keep the cutting kerf stable at 0.4 mm by indicating the corresponding region on the training workpiece. The kerf width varies during cutting with alterations in laser power or processing velocity. Once the agent has trained itself, it will test its cognitive capabilities by processing at different velocity levels. Furthermore, the agent has to transfer the learned knowledge to unknown situations, such as processing different materials or layers of multiple sheets.

The cutting control agent of the present invention applied throughout all the experiments has trained itself with a stainless steel workpiece of 1.0 mm material thickness at a processing speed of 3.0 m/min. As is demonstrated in FIG. 8, the learned features change for variations in the applied laser power ramp, which enables reliable classification for future workpieces. The most significant feature amplitude change is the event when the cut breaks, as occurs at 4 s of processing time. The in-process camera picture at 4.2 s in the upper picture row in FIG. 8 shows an intensity increase in the center of the picture when compared to the earlier picture at 3 s. This difference is also incorporated into camera features 3 and 4. The kerf width difference is incorporated as the intensity variation in several of the displayed camera features. With this knowledge, the cutting agent attempts to control the following workpieces, to maintain the cutting quality, and to prevent a loss of cut robustly.

Figure 9:
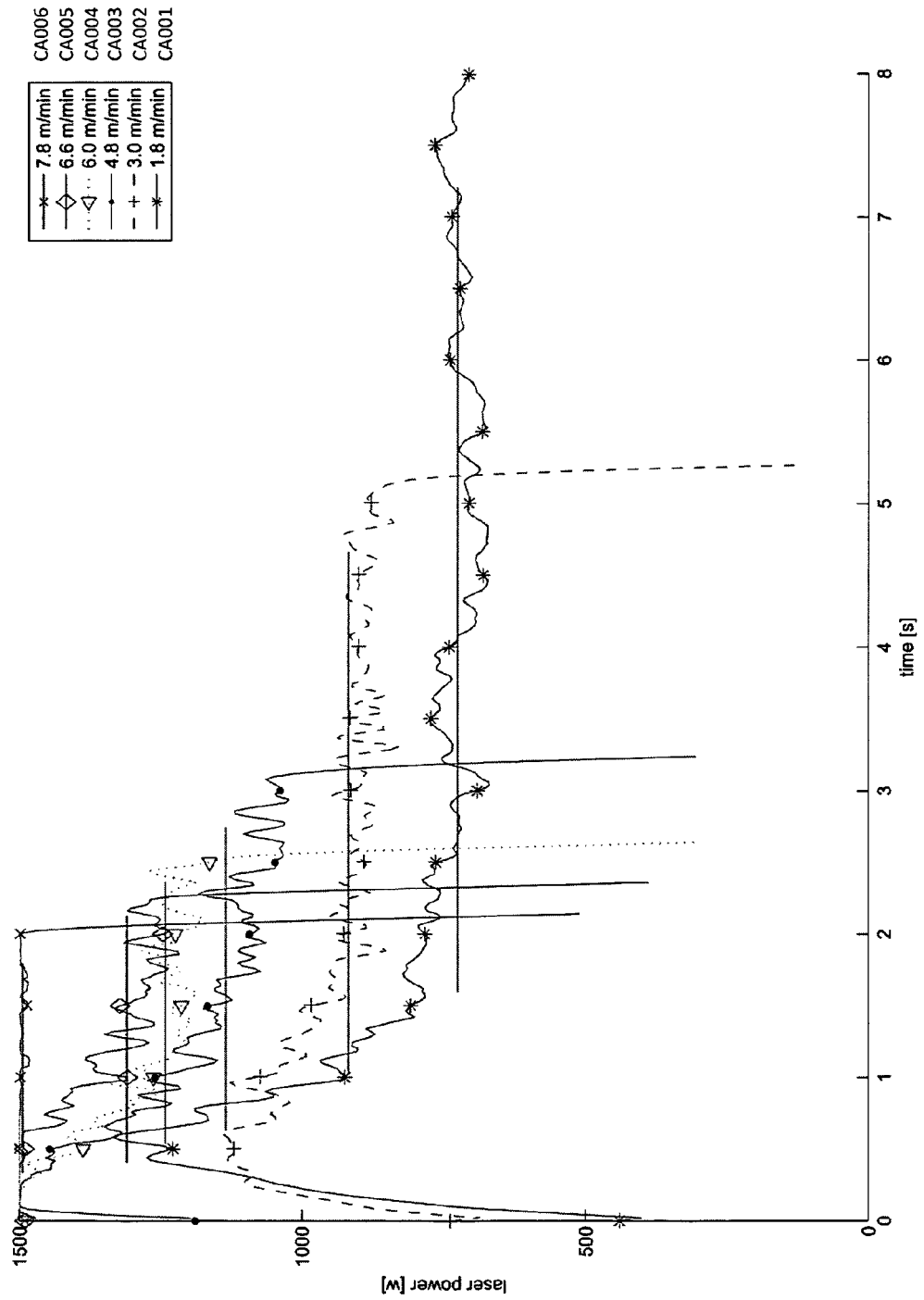
FIG. 9 shows CA001-CA006 workpieces being processed by control of a cutting agent according to the present invention: stainless steel, closed-loop, 1.0 mm material thickness, laser power controlled at different velocities from 1.8 m/min (CA001) to 7.8 m/min (CA006) vs. processing time displayed averaged laser power values.
Figure 10:
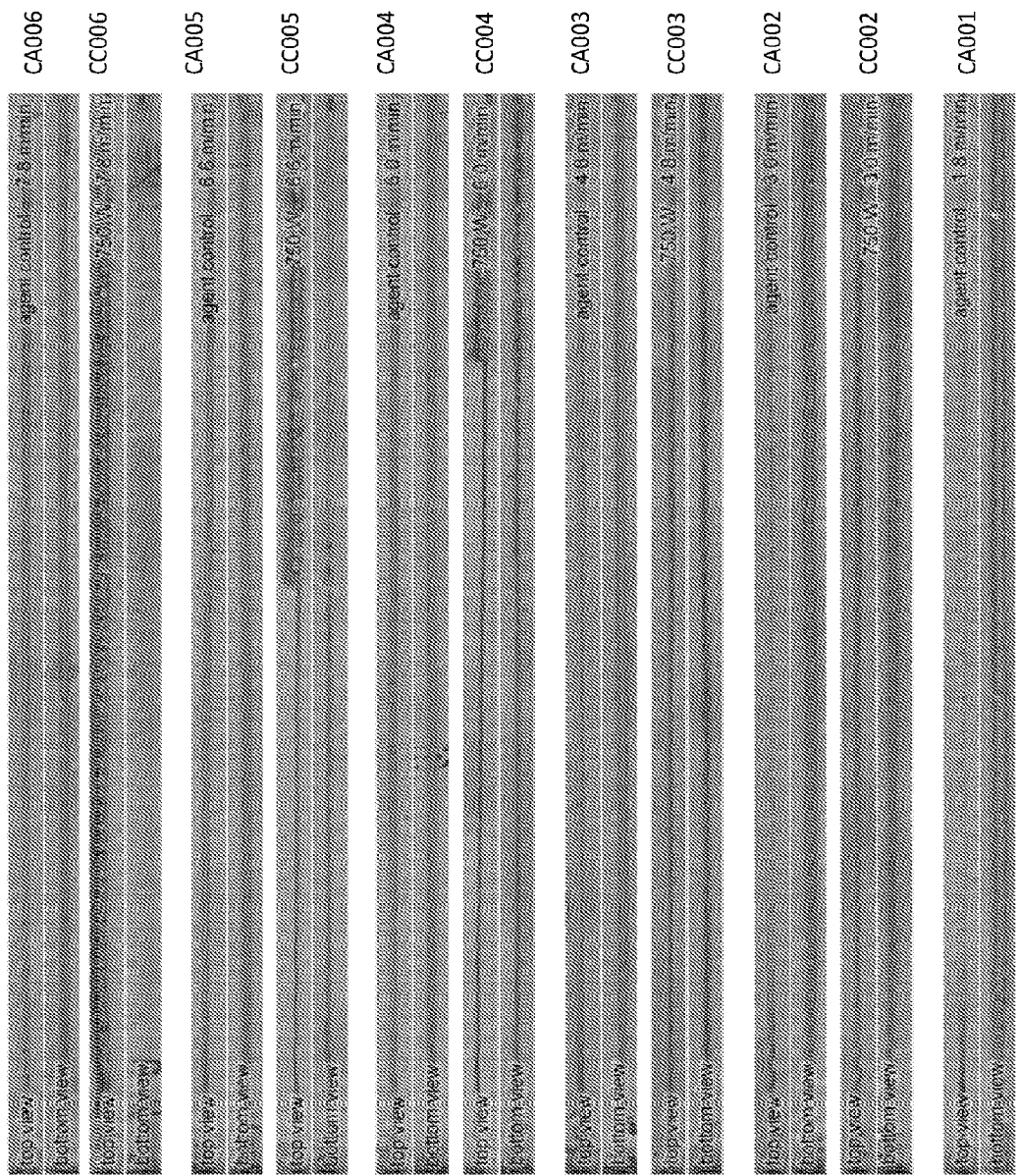
FIG. 10 shows kerf scans of CA001-CA006 workpieces being processed by control of the cutting agent according to the present invention and CC002-CC006 workpieces being processed with constant laser power: stainless steel, 1.0 mm material thickness, laser power controlled at different velocities from 1.8 m/min (CA001) to 7.8 m/min (CA006) vs. CC002-CC006 with 750 W laser power at corresponding velocities.

The trained cutting control agent processes several workpieces at different velocities, as is demonstrated in FIG. 9. Workpiece CA001 is processed at a velocity of 1.8 m/min, which is just 60% of the processing speed that the agent has been trained for. The agent converges at an averaged laser power level of 729 W. The stretched kerf scans are shown in FIG. 10, highlighting reliable cutting quality with maintained kerf width and no loss of cut. For the following workpieces, the processing speed is increased to 3.0 m/min for workpiece CA002, 4.8 m/min for workpiece CA003, 6.0 m/min for workpiece CA004, 6.6 m/min for workpiece CA005, and 7.8 m/min for workpiece CA006. The graph in FIG. 9 shows that the applied laser power has been raised with increasing velocity. This would be expected if the same energy per unit length level approximately produces a similar cutting quality. The scanned kerfs in FIG. 10 also show a maintained kerf width, as desired. Another set of scanned workpieces from CC002 to CC006, with the same cutting speed levels as the controlled ones but a constant laser power of 750 W, similar to the laser power that the agent had applied at CA001, is shown in FIG. 10. The kerf width is increasingly thin as the processing speed gets faster. For workpieces CC004, CC005, and CC006, the scans show that there is a loss of cut. Workpiece CC002, with a processing speed of 3.0 m/min and constant laser power, shows a slight variation in kerf width over the time of processing. This indicates that the tested cutting process has nonlinear characteristics. This may be the reason why the agent first increases the laser power significantly, and later converges at a lower power level during the processing. Next to effects at the start of cutting, the early rise in laser power may result from a mounting robot imprecision when the robot starts accelerating. This imprecision may also be observed in curve-shaped cutting lines at the start of some of the processes shown in FIG. 10. However, for the tested workpieces, an improvement in cutting quality can be observed during the constant laser power trials when compared to those controlled by the trained cutting agent.

Figure 11:
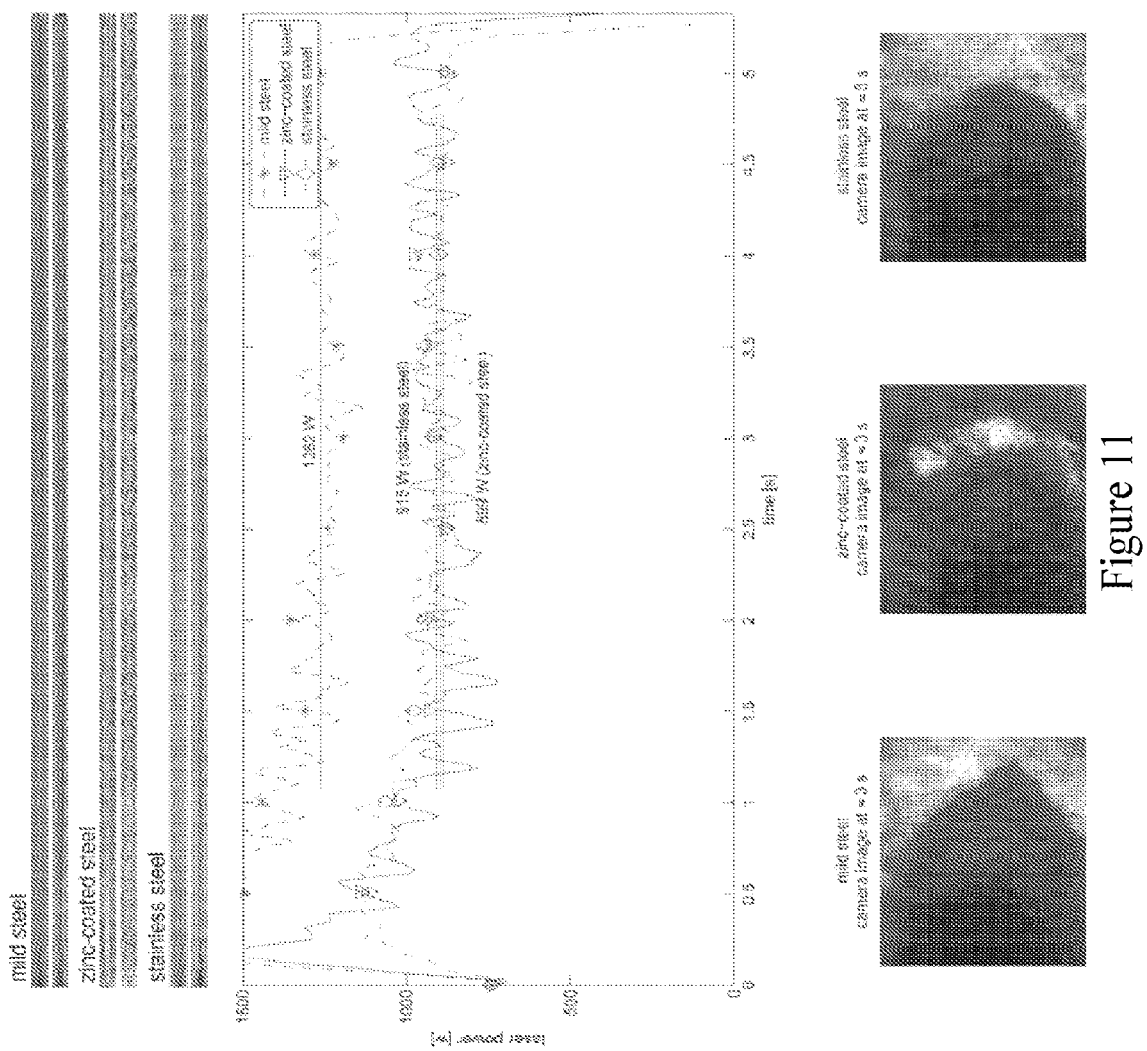
FIG. 11 shows a material variation of CA007, CA008, and CA002 workpieces controlled by a cutting agent according to the present invention trained with stainless steel: CA007 mild steel, 1.0 mm material thickness—CA007 zinc-coated steel, 1.0 mm material thickness—CA002 stainless steel, 1.0 mm material thickness—laser power controlled with features of stainless steel at 3 m/min velocity vs. processing time.

It is not a common practice to switch materials in industrial production and yet continue processing with the same system parameters because the cutting quality would differ significantly. It has been found that the trained cutting agent of the present invention manages to show comprehensible behavior in such a situation. In order to challenge the cognitive capabilities of the cutting agent further, the experiment demonstrated in FIG. 11 shows its reactions for materials for which it has not been trained. As the agent had not been trained for different velocities, but demonstrated reasonable behavior, it is now being tested for different kinds of materials. The processing gas and all other experimental setup properties remain constant, therefore only the material is altered. The change of material results in the input of very different sensor data. However, the perception of the cutting agent relies on features that may help it to identify similarities better than simple raw sensor data. The in-process camera pictures in FIG. 11 demonstrate that raw sensor data differs greatly for different materials.

Irrespective of the differences in the raw sensor data, the cutting agent that has been trained for stainless steel shows robust convergence when processing zinc-coated steel or mild steel. None of the three workpieces have a loss of cut. However, the applied laser power for mild steel seems to be higher than necessary. The cutting agent achieved the desired goal of maintaining a minimum kerf width, yet its behavior may be optimized for a change in material in terms of power consumption for the tested workpieces.

Figure 12:
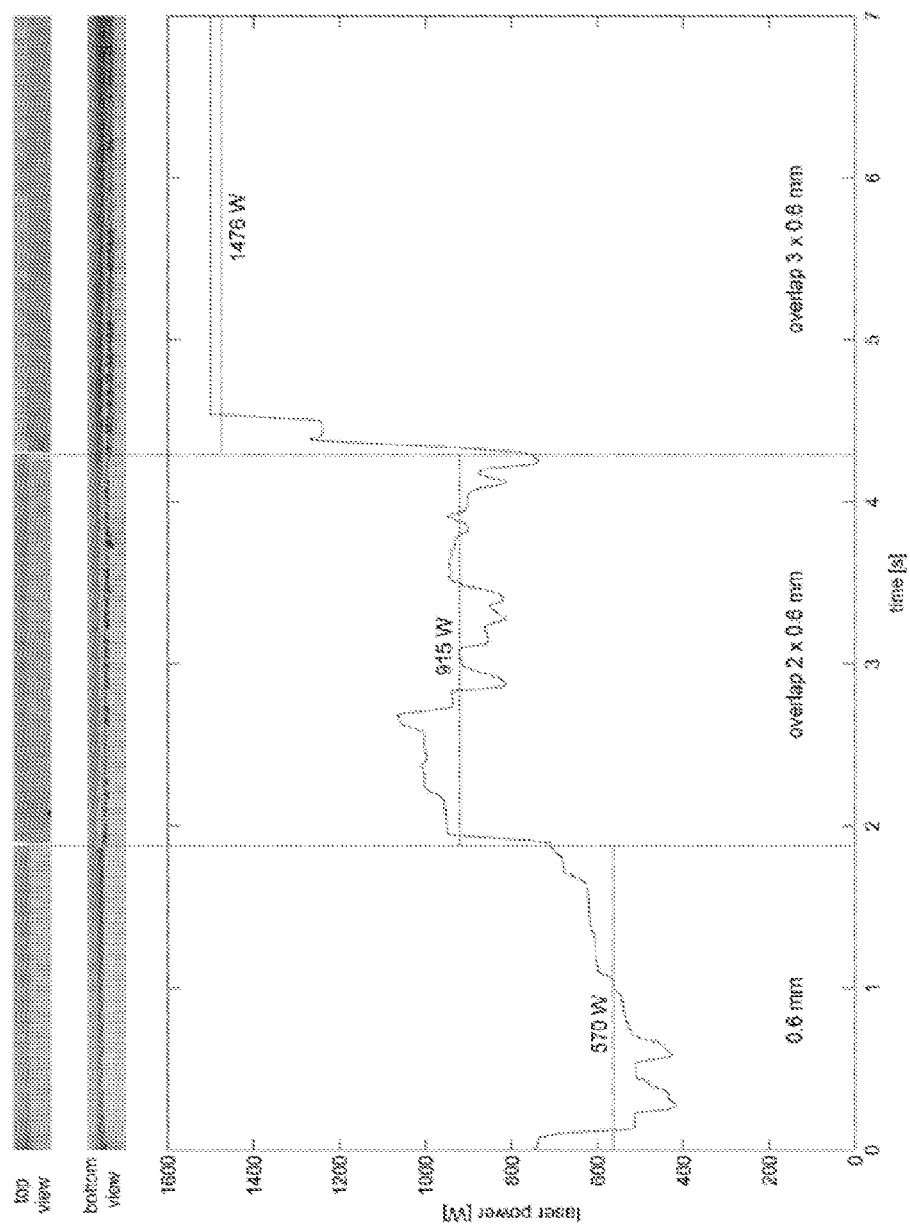
FIG. 12 shows a J001 workpiece with layered one, two, and three sheets controlled by cutting agent according to the present invention: stainless steel workpieces with stepwise 1, 2, or 3 sheet(s) with 0.6 mm material thickness—laser power controlled at 3 m/min velocity vs. processing time.

Another possible alteration is to increase material thickness in order to test the capability of the agent to process workpieces based on learned features. Although again this is not a common practice in industrial production, the material thickness may be increased by overlapping several workpieces. This would provide another test to ascertain whether the agent can comprehend the need to increase laser power given the number of workpieces that it has underneath the processing head. Workpiece J001, shown in FIG. 12, consists of three sheets of stainless steel, each with a material thickness of 0.6 mm. The capacitive distance sensor maintains a constant space between the processing head and the workpiece surface of 0.7 mm. Furthermore, the PID values have been set to P=6.7, I=0.5, D=0 in order to improve performance with large steps within the reference signal. The workpiece thus varies in thickness in two steps through approximately 0.6 mm, 1.2 mm, to 1.8 mm. The applied power varies accordingly from an averaged 570 W, 915 W, to 1,476 W. These values seem to be comprehensible, since the agent increases the applied laser power by approximately 500 W for each additional 0.6 mm sheet. However, when processing three sheets of stainless steel at the same time, there is an increase in dross development at the bottom sheet. This may be caused by the fixed focal spot position and processing gas pressure, which are not optimized to cut three sheets at the same time.

Thus, an advantage with respect to adaptability will be apparent: the agents adapt to various situations, two different production processes such as cutting and welding at different speeds; 50% less material thickness in the bottom sheet in welding after additional training; three different materials with laser cutting such as zinc-coated steel, mild steel, and stainless steel.

For the tested workpieces, the task of preventing a loss of cut has been achieved by the cutting agent irrespective of velocity, material, or thickness variations. Furthermore, the agent has maintained a certain cut quality in terms of a minimum kerf width in the experiments carried out. In these experiments, the agent seems to decide intelligibly in unknown situations based more on process characteristics than on noisy raw sensor data.

It may be that some experts in laser material processing believe that it is more demanding to join something than to cut it. The question may arise whether the cognitive capability could also be applied to laser welding processes.

In the following, a third embodiment related to agent control of laser welding will be described.

It is a common aim in industrial welding to join two parts with maximal connection, yet to avoid excessive penetration without any weld root convexity or concavity on the obscured side of the workpiece surface. A root convexity or concavity occurs when the laser beam actually exits the workpiece on the bottom side, also known as full penetration weld. This leaves a noticeable convex or concave trace, which restricts a following paint job because the weld seam root would still be evident. As another manufacturing example, with pipe welding this type of imperfection may cause undesired behavior in the fluid flow that can cause erosion or corrosion issues. If the laser power could be controlled in terms of the penetration depth, it may be maintained at the desired level, thus creating maximal connection without the beam leaving the workpiece. Due to the nonlinearity of the welding process, this goal is hard to achieve, and great efforts are spent on setting up welding systems within this frame of operation. The following will show how this task may be learned and handled by a cognitive agent.

Figure 13:
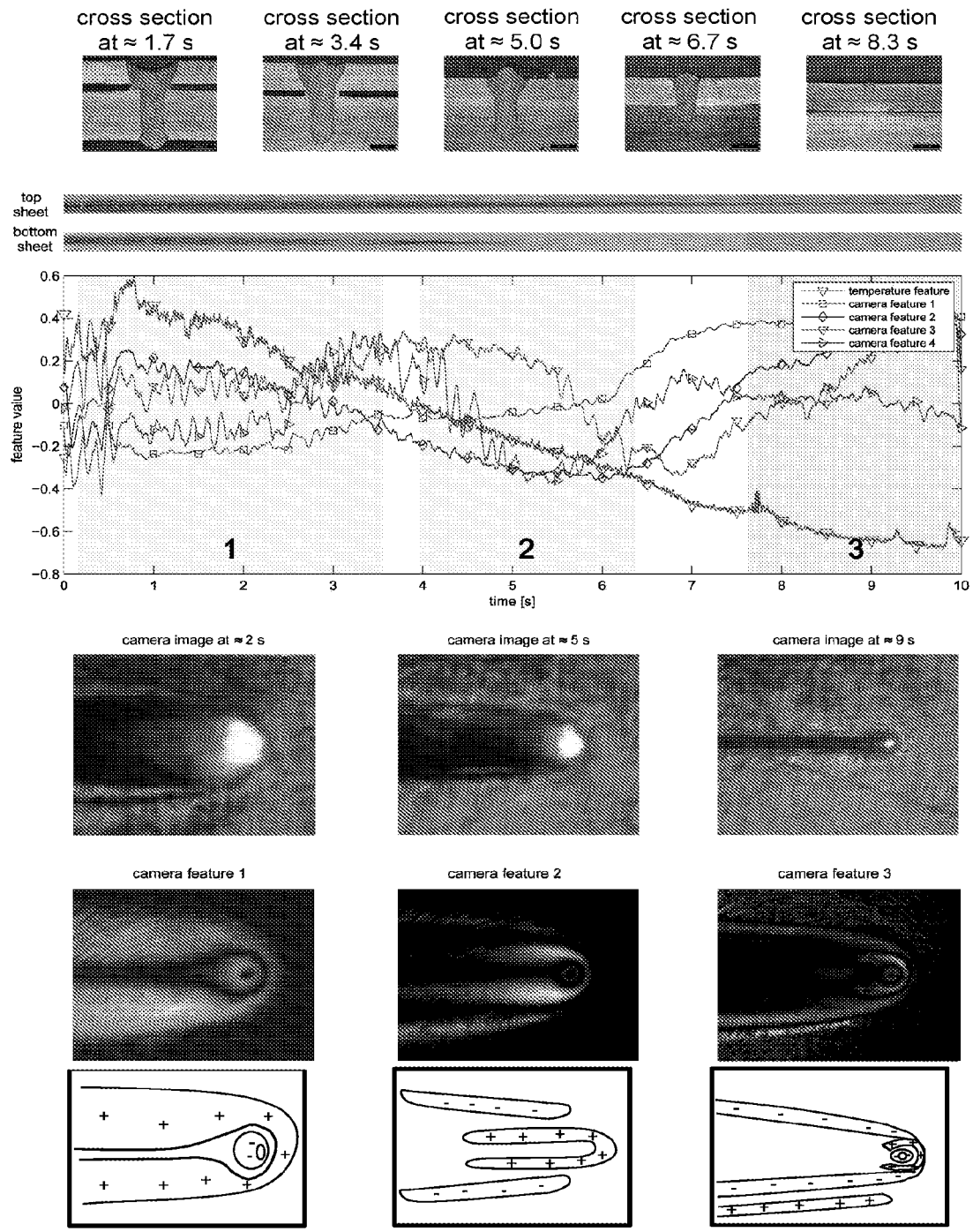
FIG. 13 shows a training workpiece for a welding control agent according to the present invention: two overlapping stainless steel sheets with 0.6 mm material thickness at the top sheet and 1.2 mm at the bottom sheet—cross-sections every 50 mm—laser power ramp from 1,000 W to 50 W, robot velocity at 1.8 m/min vs. processing time—upper picture row shows coaxially taken in-process camera pictures—middle picture row displays the eigenvectors with a map with bright areas for positive or negative values and black areas for values around zero—lower row, feature maps of middle row being illustrated schematically.
Figure 14:
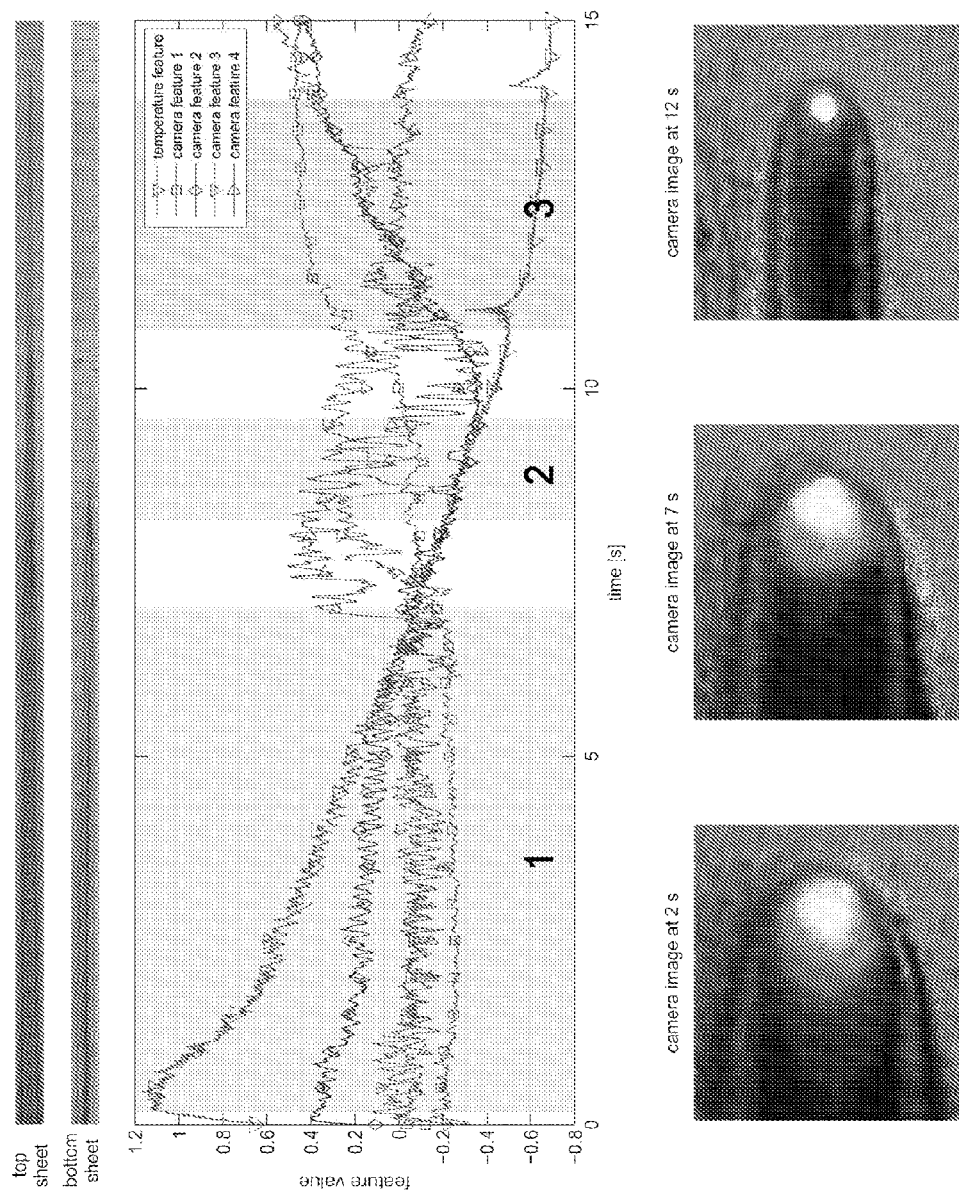
FIG. 14 shows a second stainless steel training workpiece for welding with laser power ramp from 1,500 W to 50 W and a velocity of 1.2 m/min vs. processing time.

Firstly, the agent requires a training workpiece, which it processes with a laser power ramp from 1,000 W to 50 W. The recorded feature values are shown in FIG. 13. The human expert feedback is indicated in the colored areas, corresponding to class 1 with too high laser power, class 2 with correct laser power, and class 3 with not enough laser power. Please note that the bottom surface of the training workpiece shows a seam root convexity or in this case excessive penetration between approximately 0 to 2.8 s of processing time. The feature value sets differ greatly from each other between the selected classes, which presumably allows for reliable classification. The in-process pictures taken at different processing times show that the variance within the video pictures mainly relies on weld seam width, melt pool size and form, and the front of the heat affected zone. Furthermore, information about the keyhole seems to be present in slight intensity variations within this spot size, and yet this is not visible from the pictures shown. The agent abstracts these process characteristics by extracting the learned camera features displayed in FIG. 13. These features are sensitive to variations in keyhole size, melt pool form or size, seam width, and other characteristics. Of course, the features from the photodiodes are collected as well. The most prominent feature is the temperature feature, which is also shown in FIG. 13. The system has selected 10 features in total and has trained itself using this workpiece. For improved agent behavior, and because of the great number of dimensions used in the feature space, a second training workpiece is introduced to the agent to allow it access to more training samples, as is demonstrated in FIG. 13. This time, a slower processing speed is applied in order to gain increased sensitivity by the agent to velocity alterations. Finally, with this knowledge, the agent should be well-prepared to pursue the goal of maximum connection without root convexity in the following welding experiments.

Figure 15:
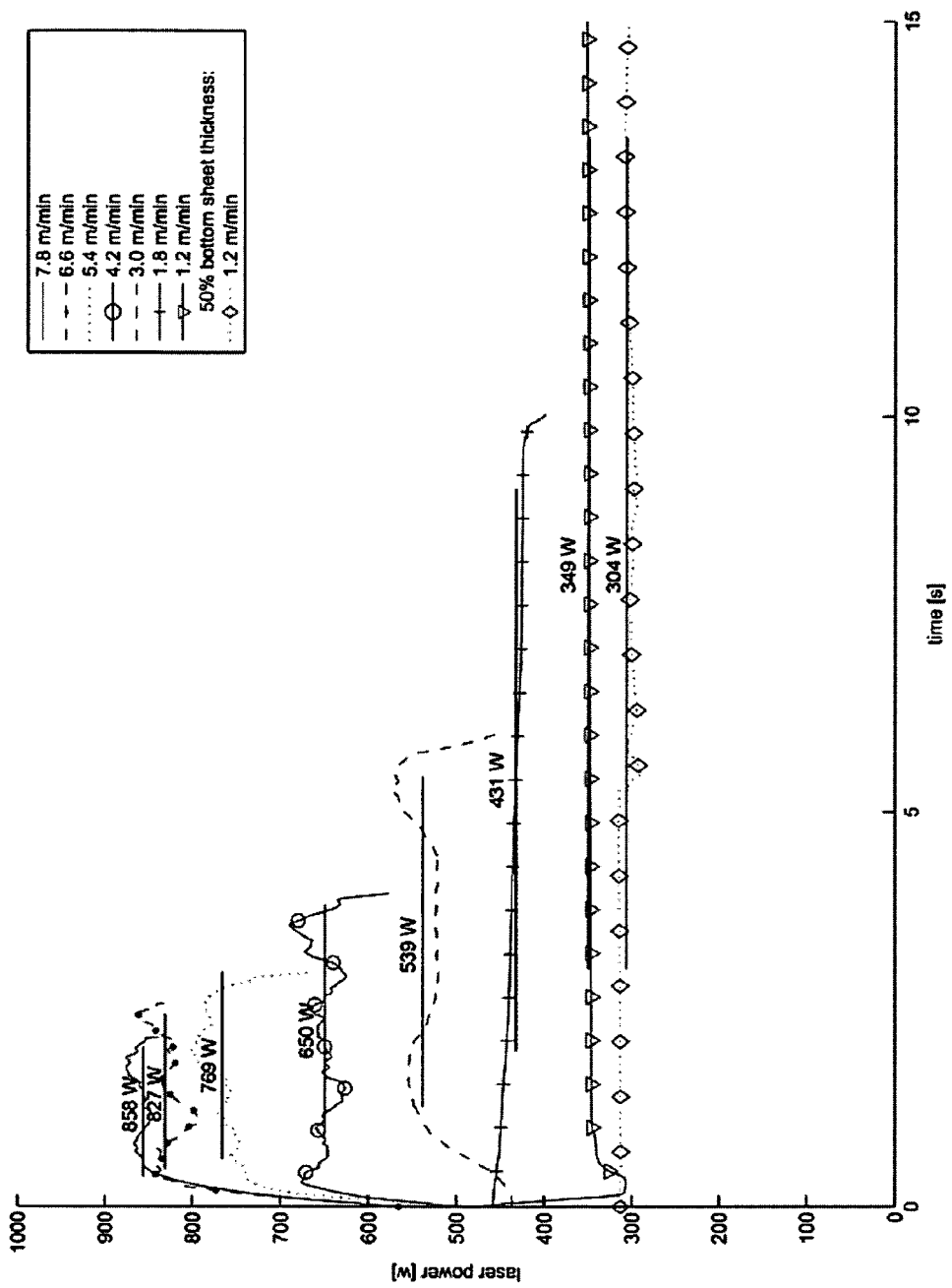
FIG. 15 shows WA001-WA007, WA010 workpieces controlled by a welding agent according to the present invention at different velocities: two overlapping stainless steel sheets with 0.6 mm material thickness at the top sheet and 1.2 mm at the bottom sheet—WA010 two overlapping stainless steel sheets with 0.6 mm material thickness at the top sheet and 0.6 mm at the bottom sheet at velocity of 1.2 m/min—laser power controlled vs. processing time.
Figure 16:
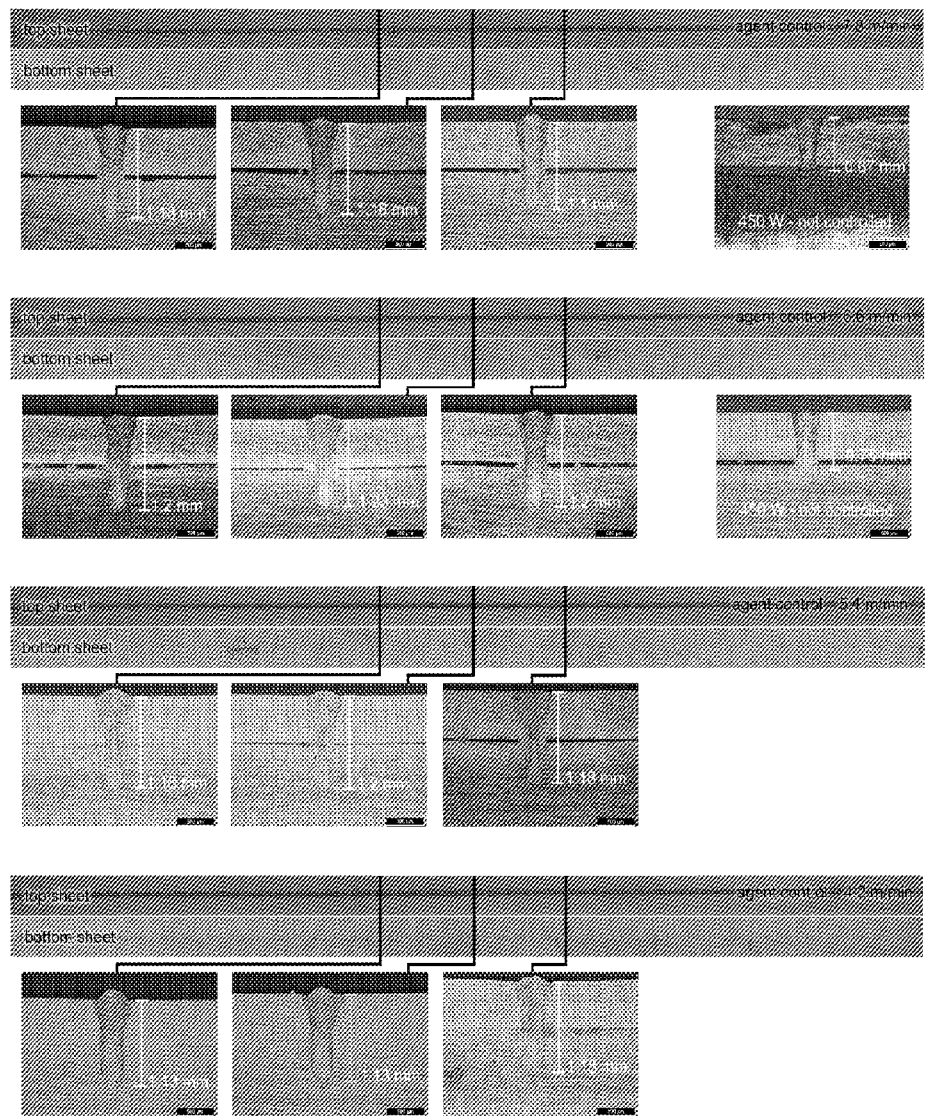
FIG. 16 shows scans and cross-sections of WA001-WA004 workpieces controlled by a welding agent according to the present invention at different velocities: two overlapping stainless steel sheets with 0.6 mm material thickness at the top sheet and 1.2 mm at the bottom sheet.
Figure 17:
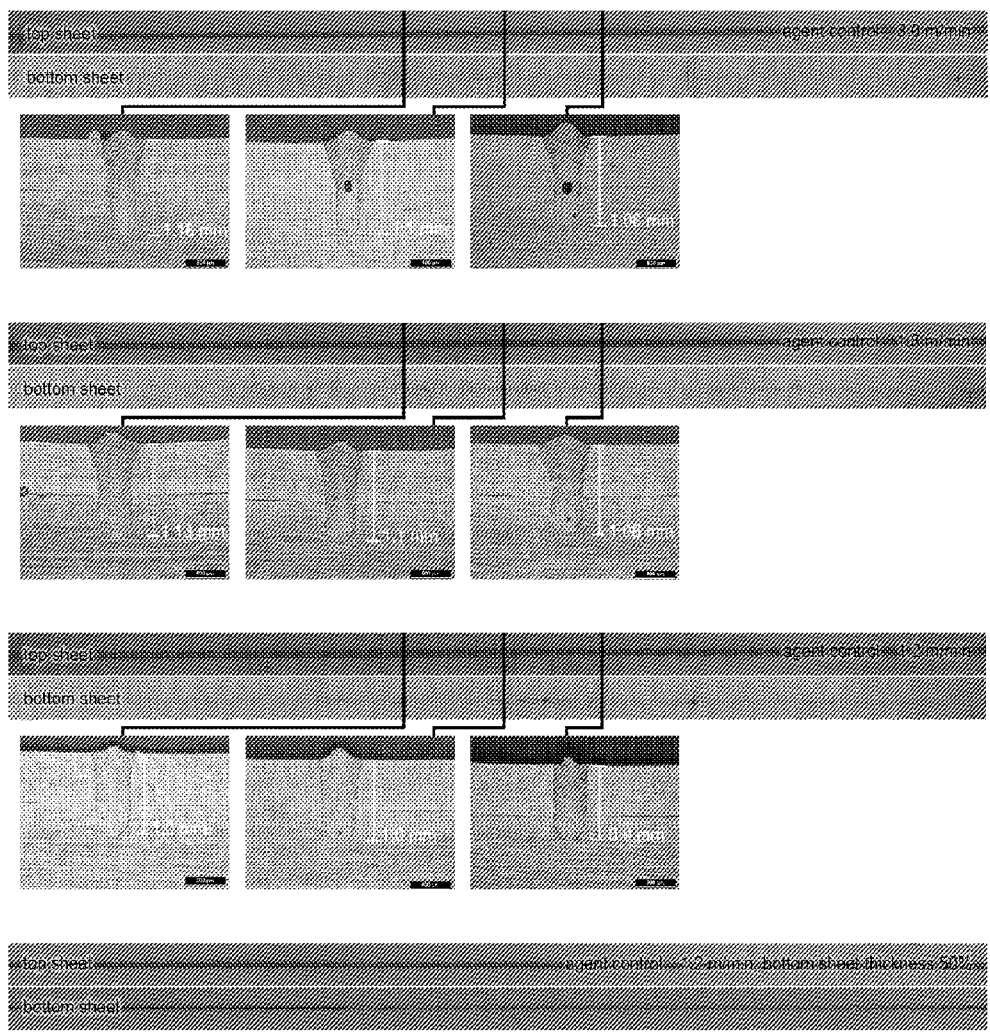
FIG. 17 shows scans and cross-sections of welding agent controlled workpieces WA005-WA007, WA010 at different velocities: two overlapping stainless steel sheets with 0.6 mm material thickness at the top sheet and 1.2 mm at the bottom sheet—WA010 two overlapping stainless steel sheets with 0.6 mm material thickness at the top sheet and 0.6 mm at the bottom sheet at velocity of 1.2 m/min.
Figure 18:
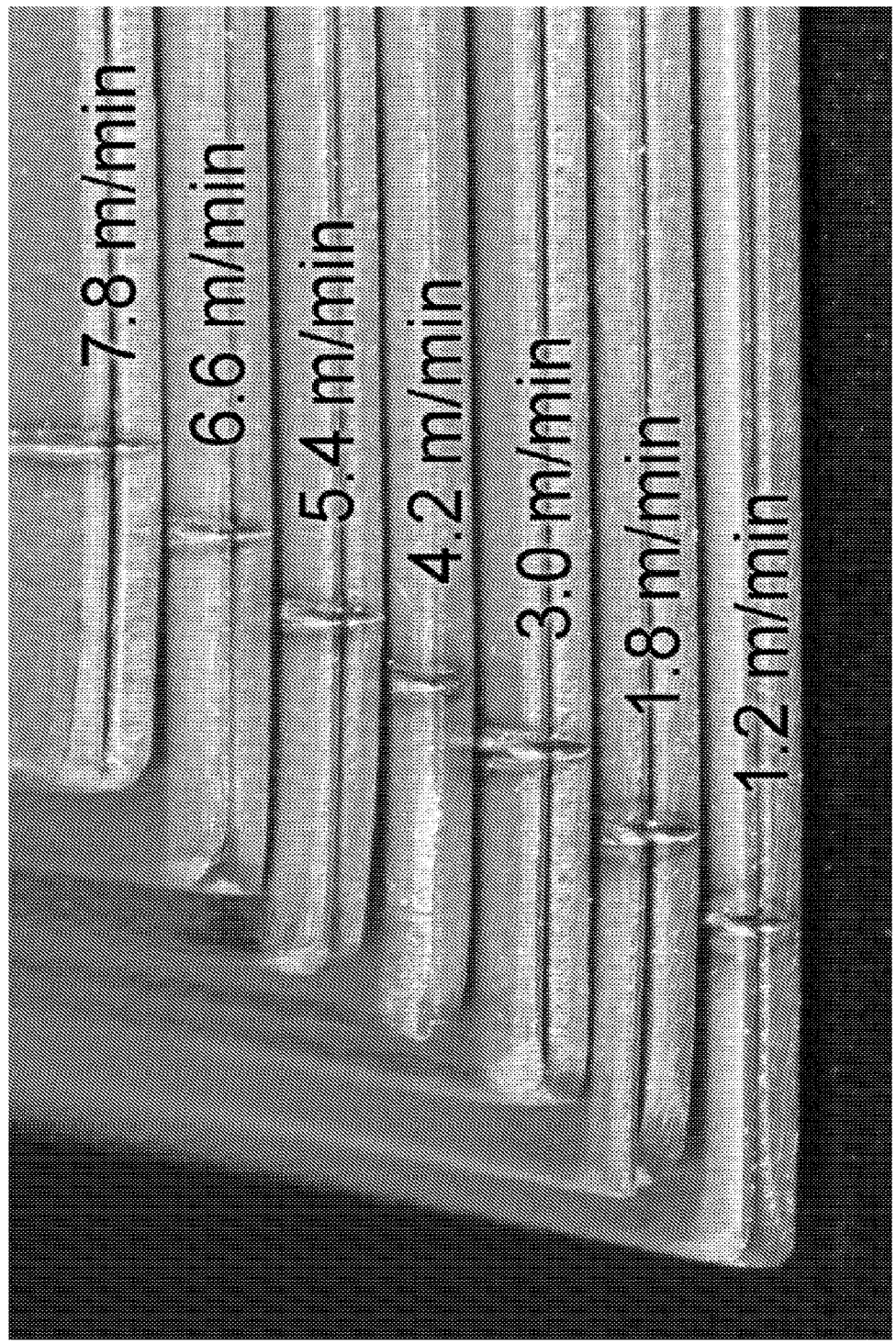
FIG. 18 shows a picture of penetration depth controlled WA001-WA007 workpieces at different velocities.

The agent welds workpieces WA001-WA007 at different velocities, from 1.2 m/min, 1.8 m/min, 3.0 m/min, 4.2 m/min, 5.4 m/min, 6.6 m/min, to 7.8 m/min, as shown in FIGS. 15, 16, and 17. The agent decides to increase the applied laser power accordingly with every additional velocity step. This seems to be the correct countermeasure, since the energy per unit length level should stay approximately the same in order to achieve similar welding results. FIG. 18 shows that the welds seem to have a similar penetration depth at the different velocities. This is also indicated by the cross-sections that were analyzed at three points of each workpiece. The penetration depth is approximately 1.1 mm at different locations and different velocities. This indicates that the agent seems to take reasonable decisions and to maintain a constant penetration depth by controlling the laser power.

Another possible process variation in laser welding is a change in material thickness. The agent should decrease the laser power when the workpiece gets thinner. Therefore, the described welding agent will now weld workpieces with 50% less material thickness in the bottom sheet.

Figure 19:
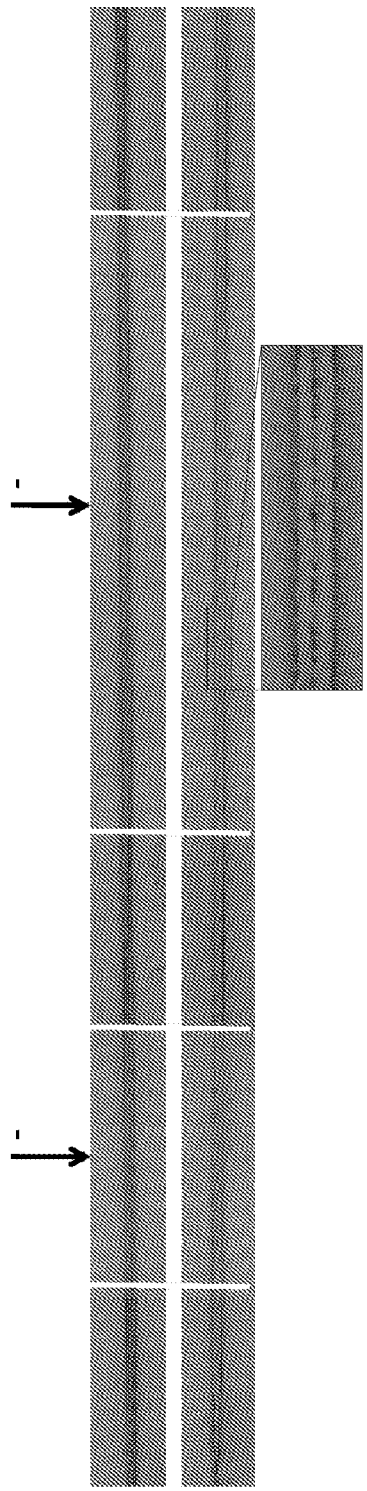
FIG. 19 shows an additional training workpiece WA008 for learning how to weld with 50% less material thicknesses in the bottom sheet: stainless steel with 0.6 mm at top sheet and 0.6 mm at bottom sheet—the areas marked with an arrow indicate human expert feedback, indicated by (−) for too much laser power—processing speed is 1.2 m/min.

FIG. 19 shows the first trial of welding a workpiece with 50% less material thicknesses in the bottom sheet than the welding agent has been trained for. The training workpiece was stainless steel, with 0.6 mm at the top sheet and 1.2 mm at the bottom sheet, while the current workpiece has 0.6 mm at the top sheet and 0.6 mm at the bottom sheet. Maintaining the same penetration depth as before is not possible for this workpiece because the beam would exit the workpiece on the bottom side.

Figure 20:
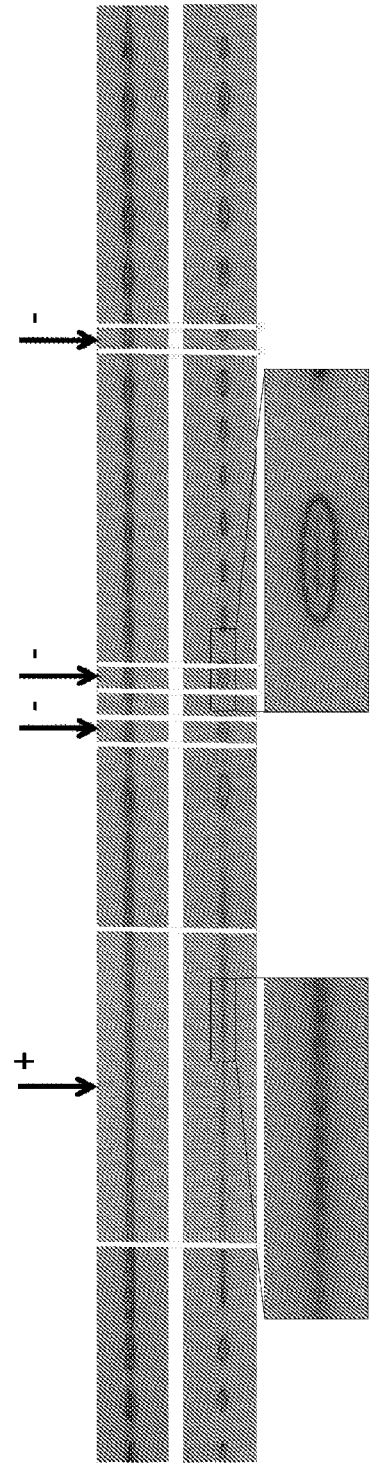
FIG. 20 shows an additional training workpiece WA009 for learning how to weld with 50% less material thicknesses in the bottom sheet: stainless steel with 0.6 mm at top sheet and 0.6 mm at bottom sheet—the areas marked with an arrow indicate human expert feedback, (−) for too much laser power—processing speed is 1.2 m/min.

The scans of the workpiece surfaces in FIG. 19 indicate a root convexity at the bottom sheet. This means that the goal to weld the workpiece in such a way that it can be painted later on has not been achieved because the agent picked too high a laser power for this workpiece. This agent now needs human expert feedback in order to learn from its mistakes; an agent without further human expert feedback is investigated later. Here, the human expert has to teach the system again, providing feedback that the features for the marked areas in FIG. 19 had too high a laser power applied. With this feedback, the agent retrains its classification and performs another weld, as shown in FIG. 20. The WA009 workpiece still shows a region where the agent has not performed well. Therefore, the human expert provides another iteration of feedback to the agent, marking some regions with a minus sign (as indicated by the arrows accompanied by −) indicating too high a laser power and one region with a plus sign (as indicated by the arrow accompanied by +) for the correct laser power. The next weld reaches the desired goal of achieving high connection without root convexity, as can be seen in the scans for WA010 in FIG. 17. Furthermore, the applied laser power on average is lower than for another workpiece processed with the same velocity but a thicker bottom sheet. Therefore, the agent seems to demonstrate reasonable behavior once again, now being able to weld workpieces with 50% less material thicknesses in the bottom sheet.

Figure 21:
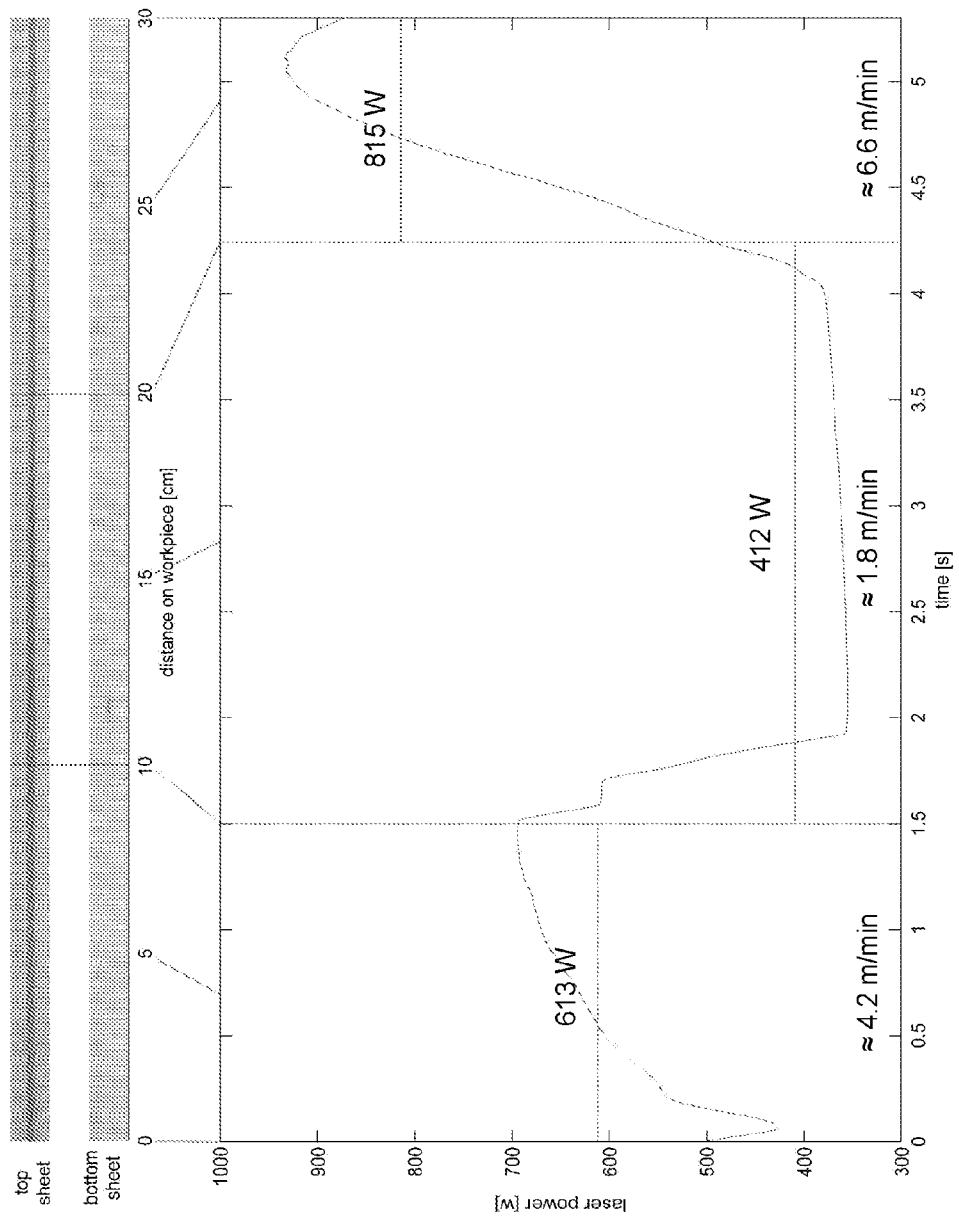
FIG. 21 shows an online nonlinear velocity variation from 4.2 m/min to 1.8 m/min to 6.6 m/min welding agent laser power controlled: stainless steel with 0.6 mm at top sheet and 1.2 mm at bottom sheet.

The previous welds had fixed velocities during processing. The welding agent of the present invention can take decisions with a clock rate of 1,000 Hz, and it should therefore be able to adapt in real-time to velocity variations while the processing takes place, as is demonstrated in FIG. 21. The moving device in this case is a robotic arm that accelerates and slows down while the agent controls the ongoing weld. Because the imprecision of the robot creates a nonlinear velocity alteration when performing three different velocity levels within a 30 cm workpiece, the final applied velocity has not been recorded. However, within the first 1.5 s of the process, the robot arm attempted to reach an approximate speed of 4.2 m/min, from 1.5 s to 4 s the robot attempted to reach an approximate speed of 1.8 m/min, and for the remaining time it attempted to reach an approximate speed of 6.6 m/min. For the first speed step, the welding agent applied an average 613 W, in the second 412 W, and in the third 815 W. The workpiece scans show that no root convexity has been created, while the weld seam surface seemed to be maintained over time. Therefore, the control agent shows comprehensible behavior.

Figure 22:
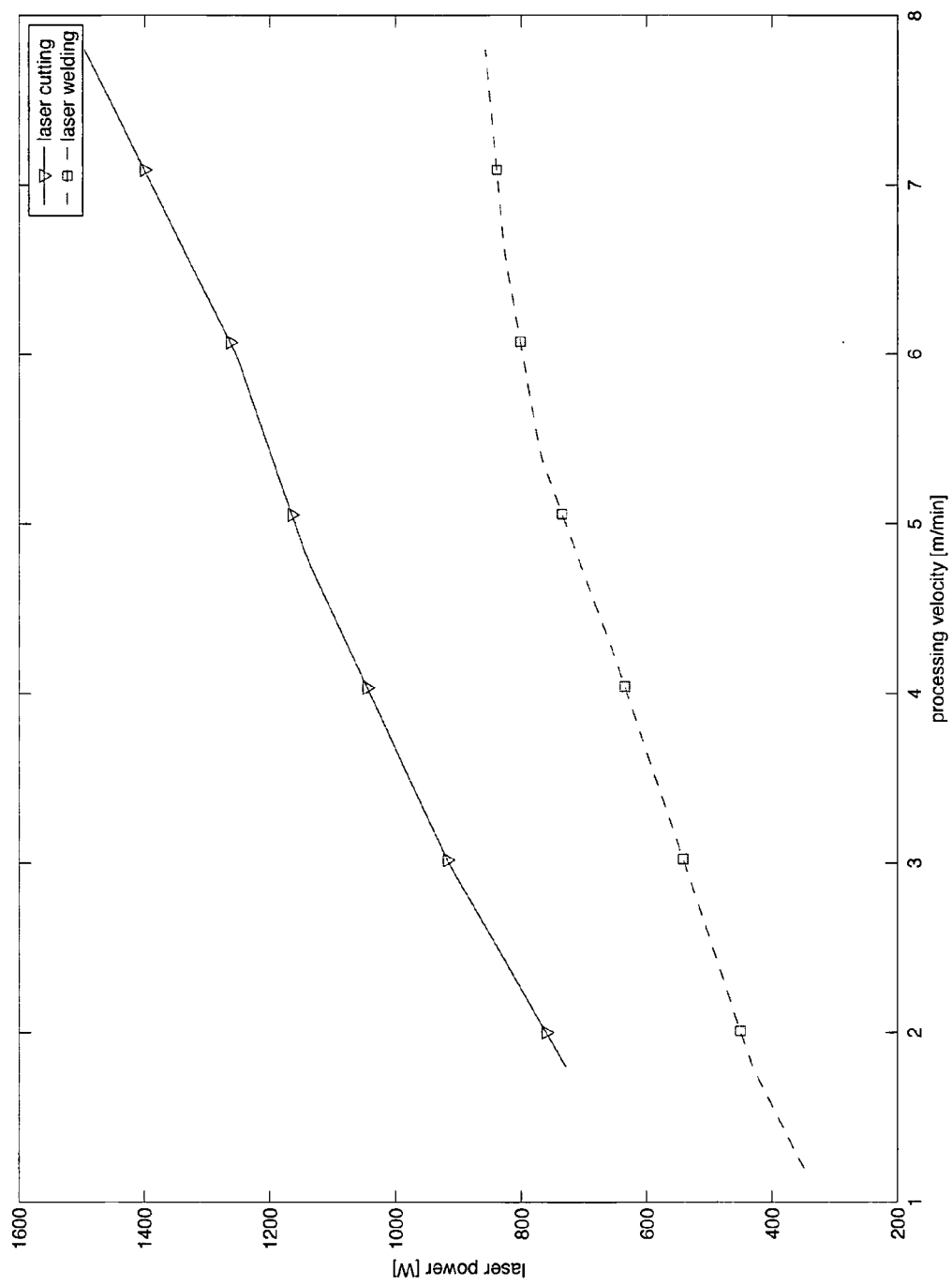
FIG. 22 shows an overview of laser power vs. processing speed for cutting and welding according to the present invention.

As was mentioned before, although many process parameters influence laser welding and cutting, as a rule of thumb the ratio of laser power and processing velocity should develop in respect to an equal energy per unit length level, which should result in similar welding or cutting result. The simple models given in equations 2.1 and 2.2 state that this ratio should be approximately linear. In FIG. 22 the smoothed laser power values are drawn vs. the processing speed. With this graph it becomes obvious that the relation is almost linear within the experiments carried out. In addition, the cross-sections shown in FIGS. 16 and 17 show that the penetration depth is maintained approximately at 1.1 mm±15%, while the velocity is altered by 650%. Therefore, it appears as if closed-loop control laser power works successfully for the embodiments adaptively carried out in welding and cutting.

Thus, an advantage of the present invention concerning the process control will be apparent: closed-loop control of laser power maintained a penetration depth of approximately 1.1 mm±15%, while the welding speed altered by 650%. This may significantly increase production output and decrease system downtime.

Within the welding experiments that were carried out, the applied agent of the present invention managed to cope with six times the initial velocity while maintaining a stable process. The agent fulfilled the requirement to preserve high connection without root convexity for the tested workpieces, except for varying thicknesses of material. When the bottom sheet was 50% thinner, the agent learned from additional feedback provided by a human expert to weld the new process kind within the stated requirements. Therefore, the welding agent displayed similar behavior compared to the cutting agent discussed before. Both agents were able to learn how to weld or cut from a human expert. They are robust for the processes that they have been trained for, which may be advantageous for industrial manufacturing. However, even when the agents had to face new situations, they continued to show intelligible actions. When they have failed, they then responded positively to further human expert feedback. From the cognitive point of view, it is remarkable that the same agent design was able to learn how to cope with completely different tasks, such as laser cutting on the one hand and laser welding on the other. The next logical step toward greater cognitive capability is to reduce the necessity for human expert feedback and to create an agent that can act unsupervised.

In the following, a fourth embodiment of the present invention concerning unsupervised learning of welding processes will be described.

The previous description outlined how the cognitive agents learned from human expert feedback. Thus the learning in the previous description was supervised: human experts teach the agent positions within a training workpiece where it should have increase or decrease laser power. If something undesirable happens, then the expert may provide feedback on how to adjust laser power. However, it may be the case that no human expert is available to maintain the laser processing machine. It should be possible for the cognitive system to learn from its own actions, or to give itself feedback. This kind of cognitive capability may be attained with reinforcement learning (RL). A classifier may take over the role of giving feedback and provide a RL agent with rewards for its own actions. The agent then learns a policy on how to act or how to weld based on the feedback or on rewards received for its previous performance. In order to test this, the learning task is therefore for the agent to learn how to weld workpieces on the basis of gained knowledge at different velocities without further human expert supervision. Again, the desired weld seam should be well-fused, but it should not be a full penetration weld. In this case it may still be painted without a noticeable seam root trace afterwards.

Figure 23:
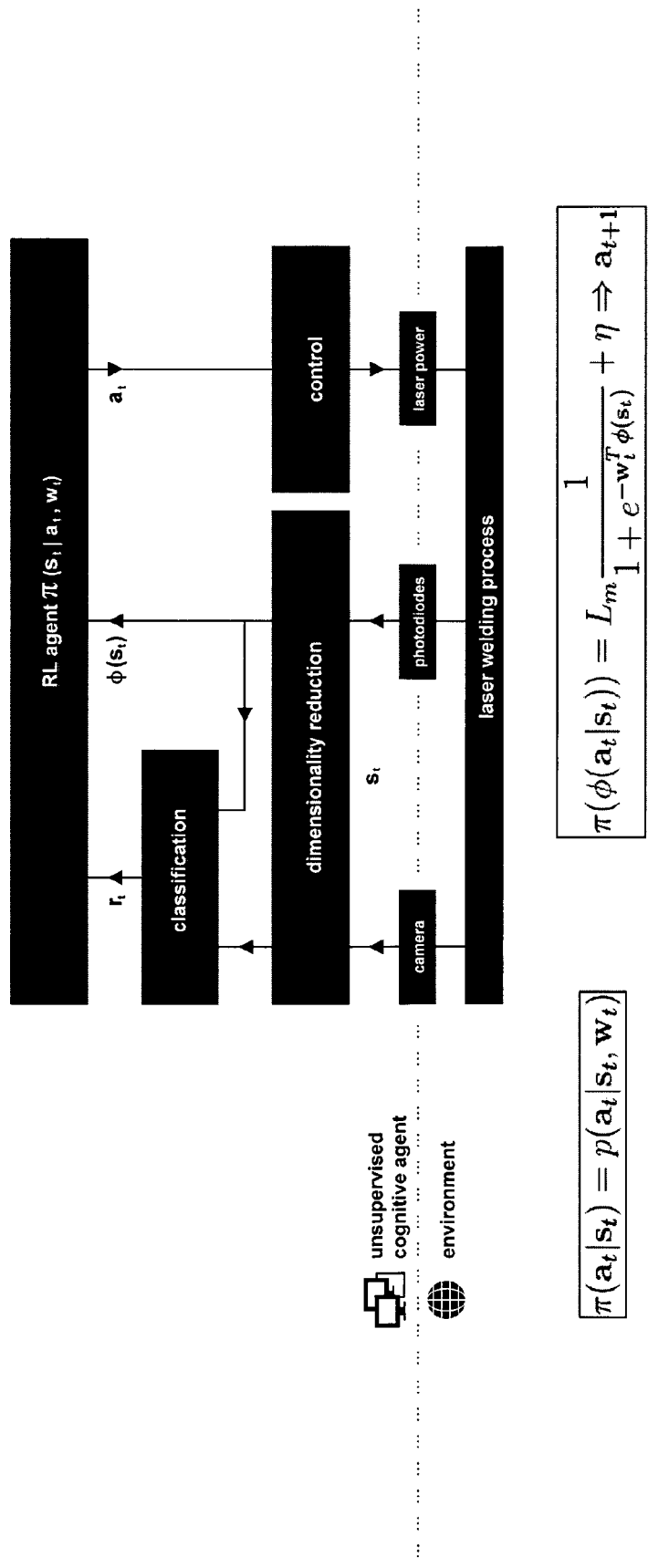
FIG. 23 shows a cognitive laser welding system design according to the present invention with reinforcement learning agent.

In order to achieve the given learning task using reinforcement learning, a reliable reward function is needed. As the system has multiple sensor data inputs, a classifier identifying features of a good weld, such as a Support Vector Machine, may serve as reward function $r_t$, as is shown in FIG. 23. These rewards may fulfill the role of a critic in the Natural Actor-Critic method, which is described before. As also discussed before, the alteration of laser power equips the agent with a tool or action both to influence the process outcome significantly and to allow for fast reactions during processing. Therefore, the next action that the agent chooses is absolute laser power, $a_t$. The chosen action depends on the learned policy, as is shown in $$\pi(a_t|s_t) = p(a_t|s_t, w_t). \quad \text{(Formula 4.1)}$$

The policy parameters $w_t$ relies on the gradient $\hat{g}$ and $w_{t-1}$, as in equation 2.25. However, for a full review of the applied algorithm please consult the Natural Actor-Critic Algorithm with least-squares temporal difference learning, LSTD-Q($\lambda$). The policy should enable the agent to map from states, $s_t$, to actions, $a_t$, by learning from rewards, $r_t$. The rewards naturally influence the policy parameters. The best policy of the laser welding RL agent of the present invention under investigation has been found with a sigma function, $$\pi(\phi(a_t|s_t)) = L_m \frac{1}{1 + e^{-w_t^T \phi(s_t)}} + \eta \Rightarrow a_{t+1}, \quad \text{(Formula 4.2)}$$

where $L_m$ is the maximum allowed laser power and $\eta$ is the exploration noise determined by the product of a random number from $-1$ to $1$ and the exploration parameter $\epsilon$.

Put in simple words, the RL agent receives feature values and selects the next action in terms of laser power adjustment. The adjustment is calculated using the policy parameters learned from a Support Vector Machine reward function, $r_t$, giving the probability of good results. The policy parameters basically serve as weights for the feature values in order to compute the next action. Other parameters have to be preconfigured in order to apply the Natural Actor-Critic LSTD-Q(X) algorithm. In the remainder of this section, the RL parameter is chosen as $\lambda=0.4$, which is required to calculate the statistics $z_{t+1} = \lambda z_t + \hat{\phi}(s_t)$. In order to compute equation 2.25, we need to choose the gradient ascent with a learning rate $\alpha$ in such a way that the gradient alteration shows an impact, but the algorithm still has robust convergence, here for $\alpha=0.4$. One of the three policy parameters corresponds to the temperature diode feature, and the other two to camera feature values. The policy parameters behave similar to weights for the incoming feature set. For the initial state of the policy parameters, we defined $w_0=(5, 0, 0)$. Another starting vectors would have resulted in a different initial laser power, because the laser power is a linear combination of the incoming feature values and the policy parameters. In equation 4.2, the maximum laser power $L_m$ is set at 1,000 W. Furthermore, in order to calculate $\eta$, the exploration parameters $\epsilon$ is set to 0.5 W. Finally, the discount factor in equation 2.21 for future rewards has been chosen as $\gamma=0.9$.

Figure 24:
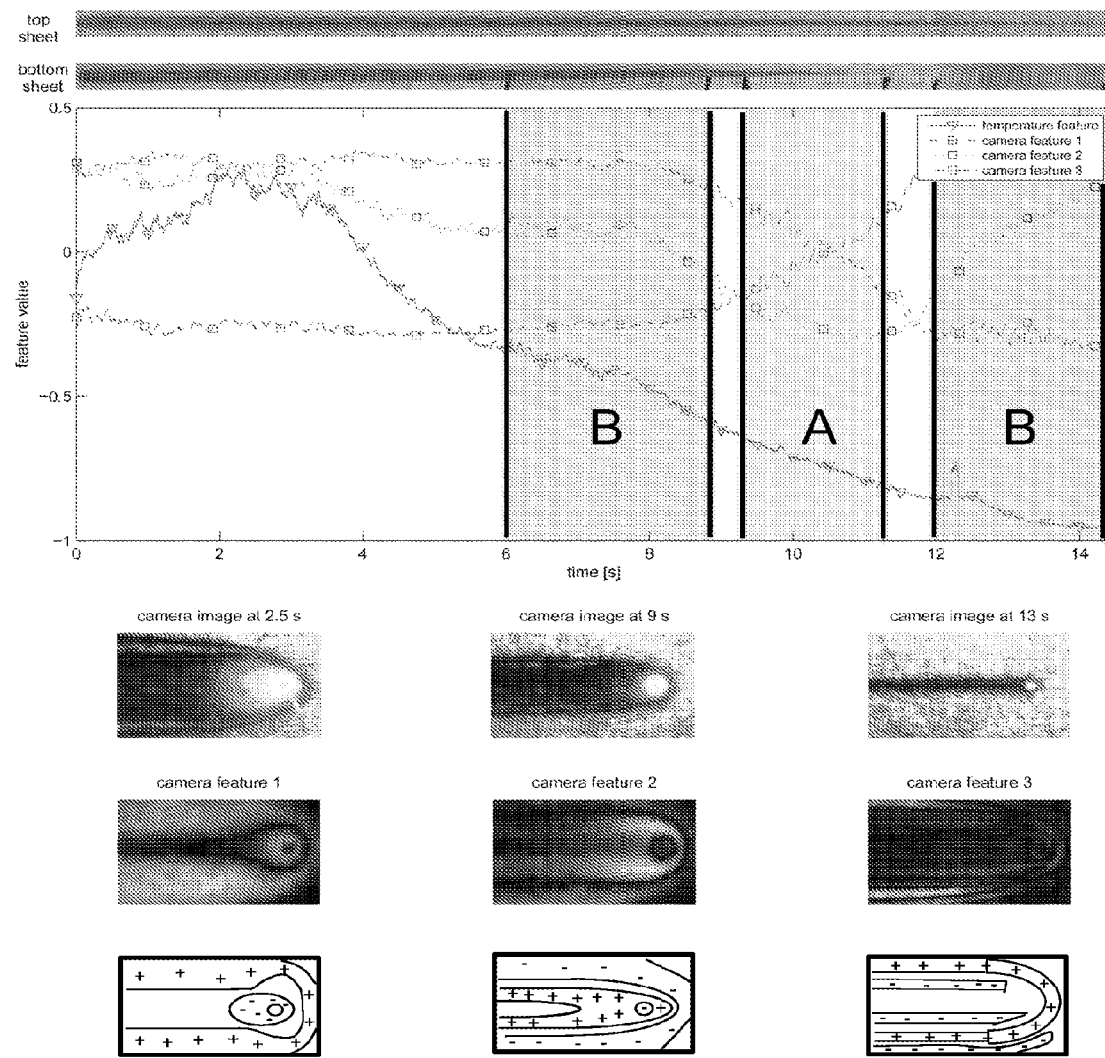
FIG. 24 shows a training workpiece for a classifier according to the present invention, lap weld two stainless steel sheets with a 0.6 mm thick top sheet and 1.0 mm thick bottom sheet at 1.2 m/min classes A and B represent the initial human expert provided knowledge about good and poor welds—upper picture row shows coaxially taken in-process camera pictures—middle picture row displays the eigenvectors with a map with bright areas for positive or negative values and black areas for values around zero—lower row, feature maps of middle row being illustrated schematically.

In order to provide a reward function to the RL agent, a human expert gives initial feedback to the classifier from a training workpiece, as is demonstrated in FIG. 24. This training is different when compared to the training workpieces mentioned above. The human expert feedback in the previous description also contained information about laser power that was too high or too low for classes I, II, and III; within this training, the human expert simply provides the most basic information about good or bad feature values, which is stored as system knowledge in classes A and B. The "good" class A is the area with maximal connection, but with no root convexity at the bottom sheet. Having a reward function, the RL agent may learn a policy how it should map from states to actions.

In the following, the RL agent learns from a set of experiments how to lap weld at three different velocities, 0.6 m/min, 1.2 m/min, and 1.8 m/min. It was intended that all of the other process parameters were kept the same. Therefore, the RL agent should learn how to maintain a similar energy per unit length level to achieve stable welds, but without root convexity at the bottom sheet. Every trial was initiated with the same RL parameter set that was described above.

Figure 25:
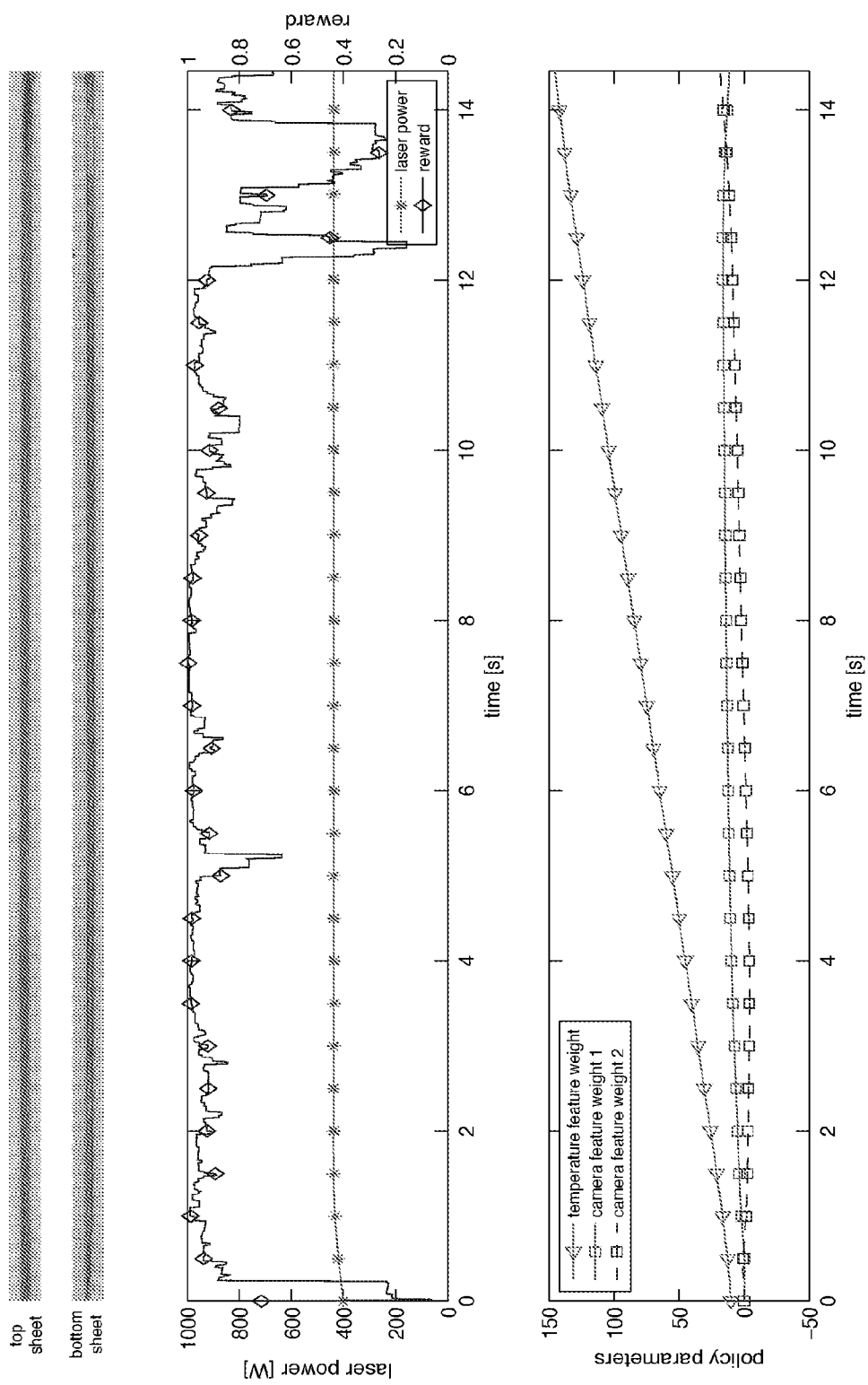
FIG. 25 shows a workpiece RIL004a: a reinforcement learning agent according to the present invention learns how to lap weld two stainless steel sheets with a 0.6 mm thick sheet on top and 1.0 mm thick sheet underneath at 1.2 m/min.
Figure 26:
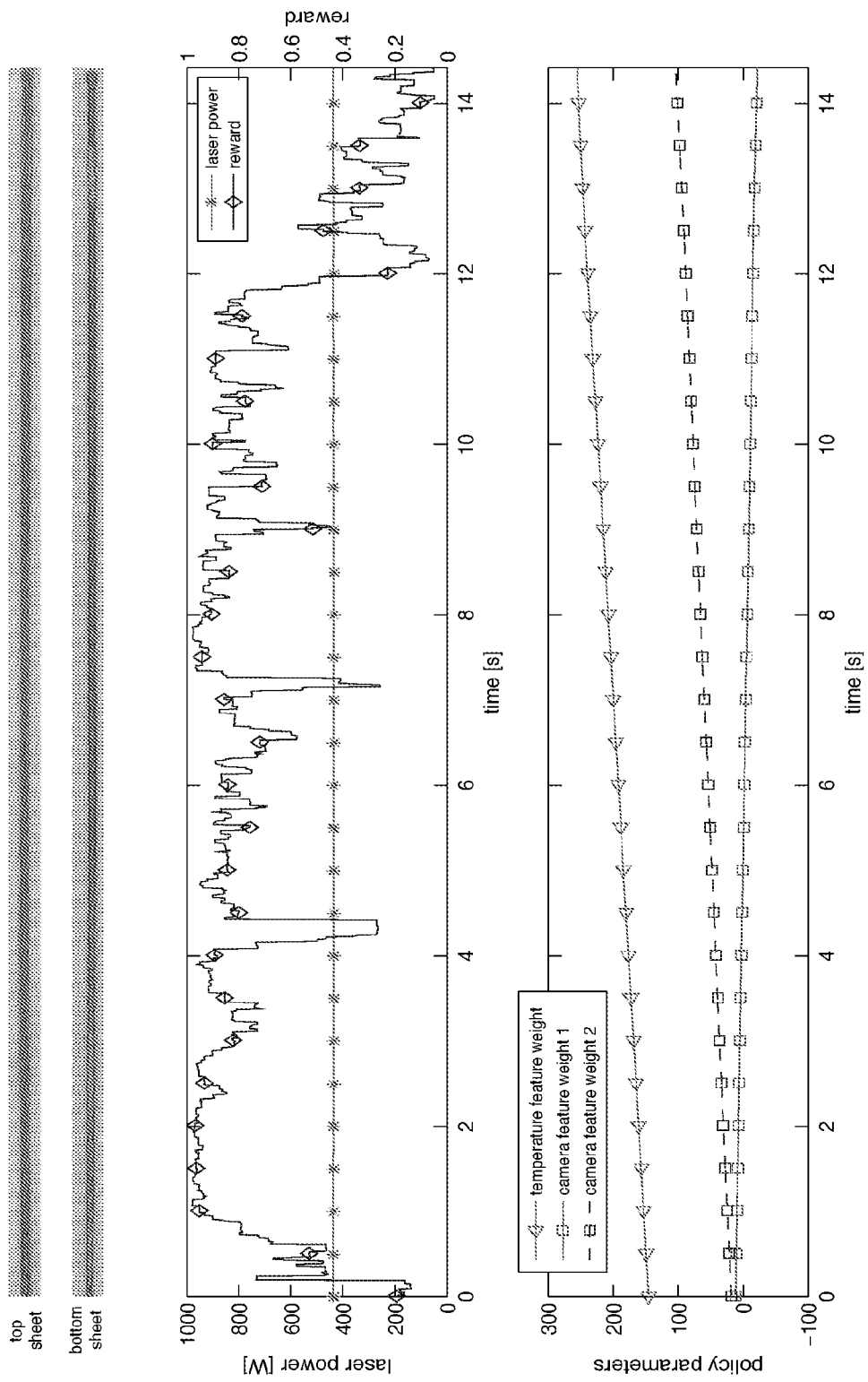

In the first experiment with workpiece RIL004$a$, the weld takes place at a velocity of 1.2 m/min, as is shown in FIG. 25. The RL agent of the present invention starts with approximately 400 W laser power and decides to raise this. Initially, the rewards are raising and the laser power engages at a good level. Towards the end of trial RIL004$a$, although the laser power is the same due to common process irregularities, the power is too high and the laser beam is about to fully penetrate the workpiece, as can be seen in the light area of the scanned bottom sheet in FIG. 25. The RL agent continues the weld on the same workpiece at a different starting point as a second trial RIL004$b$, shown in FIG. 26. This time, the policy parameters are initiated as they were learned from the previous trial. It is noteworthy that the RL agent receives sometimes good and sometimes medium rewards. The agent decides to optimize its parameters slowly as it decreases the policy parameter named "camera feature weight 1" compared to the other weights. However, the agent keeps the laser power at more or less same level because it continues to receive positive feedback. From the laser material processing point of view, this weld was good and reliable although the laser power was above optimum at the end of the processing time. The RL agent of the present invention reached a good power level and achieved the goal of nearly maximum connection without excessive penetration or in other words an exiting beam at the bottom of the workpiece. However, looking at the rewards from a reinforcement learning point of view, this outcome may be acceptable but can be improved. In the following trials continuing the policy parameter development, the RL agent would presumably have found a more suitable laser power; however, in this configuration it may have taken several workpieces before the agent left an area once it had received positive feedback.

Figure 27:
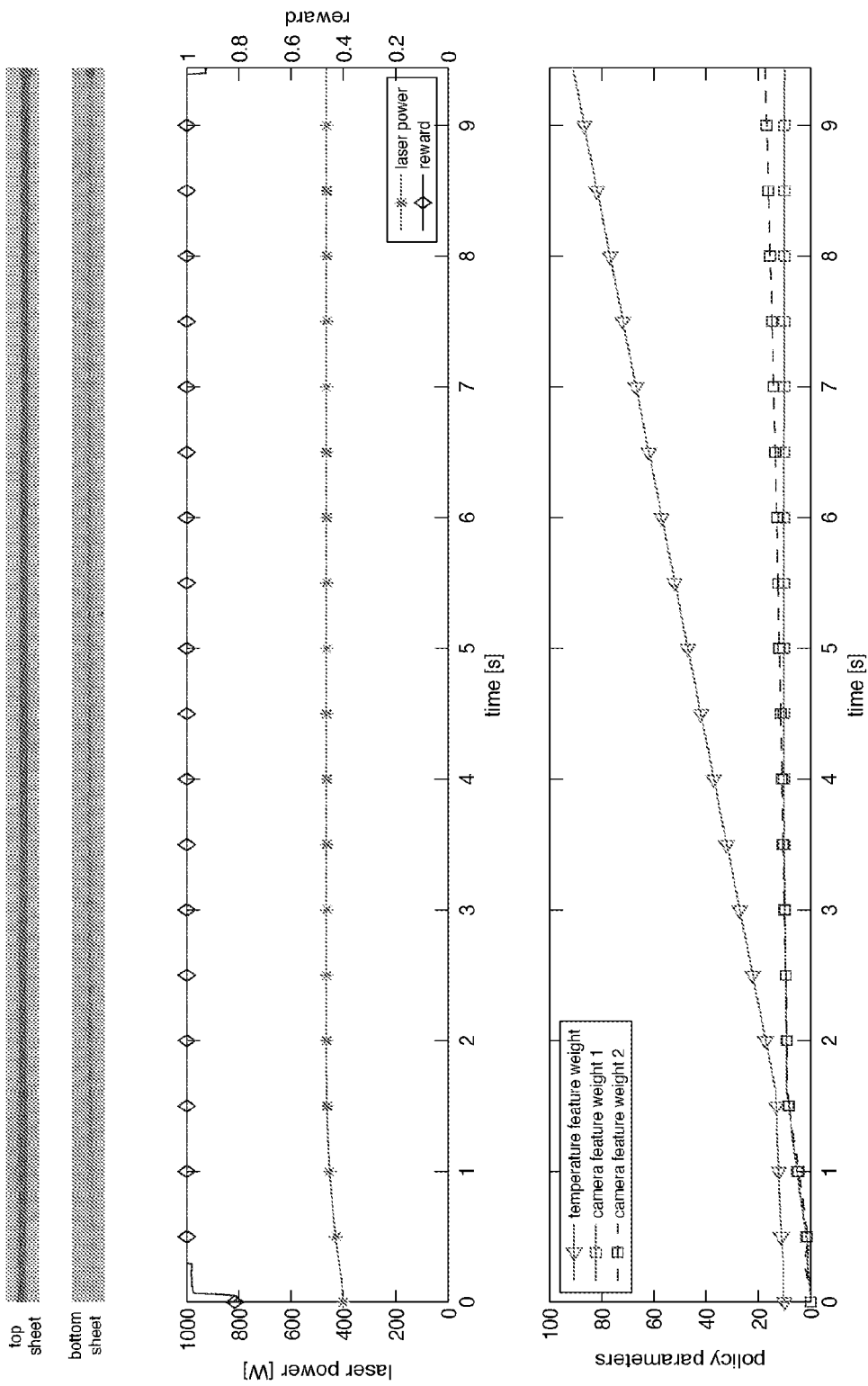
FIG. 27 shows a workpiece RIL005: a reinforcement learning agent according to the present invention learns how to lap weld two stainless steel sheets with a 0.6 mm thick sheet on top and 1.0 mm thick sheet underneath at welding speed of 1.8 m/min.

The second workpiece RIL005 is welded at a velocity of 1.8 m/min, as is demonstrated in FIG. 27. The RL agent again starts with 400 W laser power, and finds itself in an area with appropriate laser power that is yet slightly below the optimum. The agent decides to raise the laser power and then receives an optimal reward. The agent remains at this power level and achieves an optimal welding result. The scans in FIG. 27 show a brown line at the bottom sheet, (which could not be seen from the grey-shaded FIG. 27, but has been observed in the experiments) which indicates sufficient beam penetration but without root convexity. The laser power is just slightly higher than in the previous process with workpiece RIL004. Obviously, the RL agent has chosen a laser power for the RIL004 workpiece that is at the upper limit of the recommended laser power area. However, the RL agent successfully learned the optimal policy parameters to weld this type of workpiece at this speed.

Figure 28:
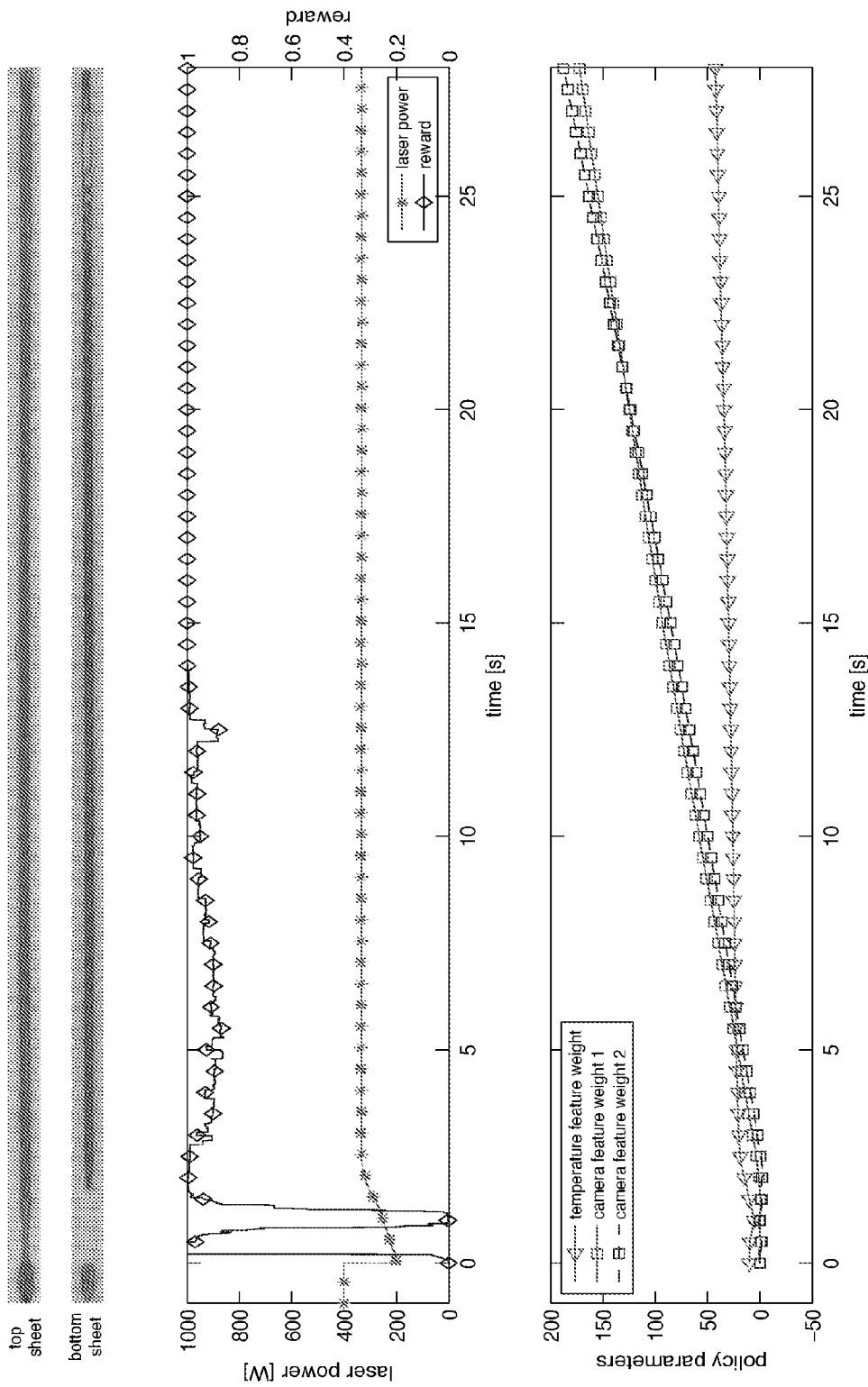
FIG. 28 shows a workpiece RIL006: reinforcement learning agent according to the present invention learns how to lap weld two stainless steel sheets with a 0.6 mm thick sheet on top and 1.0 mm thick sheet underneath at welding speed of 0.6 m/min; RL agent activated with delay.

Finally, the RL agent has to learn how to weld a workpiece at a significantly slower velocity of 0.8 m/min. Since the energy per unit length should be approximately equivalent for similar welding results, we would hope that the RL agent chooses a lower laser power this time. As is shown in FIG. 28, starting with the defined initial policy parameter set, the agent begins with the laser power too high and then moves to a laser power that is too low. The reward varies over this time and the RL agent alters the policy parameters until it finds a configuration with raising rewards. Later, the rewards tend towards an optimal result and the RL agent converges at this energy level. After convergence, the weld seam is as desired and the RL agent has learned a good laser power for this welding velocity by processing just one workpiece.

Thus, an advantage of the present invention with respect to cognitive capabilities will be apparent: a RL agent learns how to weld at different speeds in situations it has not been trained for.

The parameters for optimal laser welding results in industrial manufacturing are mainly established through several manual trials. If the process or task varies from workload to workload, costly manual trials have to be repeated. The RL agent shows the capacity to learn suitable welding process parameters, potentially during the first trial of each new process. It is remarkable that the RL agent has no prior knowledge of which action or laser power would be appropriate, and yet finds comprehensible solutions. Within workpiece RIL004, the RL agent has managed to find an adequate laser power despite a noisy reward signal. Because the RL agent has learned in the demonstrated trials how to weld this kind of workpiece at different velocities, or how to choose a specific action such as "apply 360 W!" out of a large group of possible choices, the investigated machine seems to have something like a cognitive capability.

In summary, it has been described how cognitive capabilities can be realized within a processing procedure approach for production machines. A procedure for creating agents using different modules of a cognitive architecture has been outlined. The cognitive capabilities of the agents according to the present invention are as follows: the agents can abstract process relevant information using dimensionality reduction; they can extract features autonomously; and they can learn from human expert feedback how to connect the feature values in order to fulfill monitoring or processing tasks. Using dimensionality reduction rather than raw sensor data decreases the sensor data volume significantly, from approximately 30 MBytes to just 10 kBytes per second, and enables the agent to act quickly. This is possible due to different agent designs incorporating techniques such as Isomap and Fuzzy KNN. Furthermore, the system's adaptability is increased through detecting similarities within the feature space. This leads to a self-learning concept, meaning that the agent can successfully map features from a known training workpiece onto a previously unknown workpiece. In this way, the agent is able to learn unsupervised.

The first object concerning cognitive capabilities has been achieved. The system abstracts relevant information by reducing the incoming raw sensor data to a thousandth, still capable of monitoring. Different agent designs enable two learning modes: supervised and unsupervised. Demonstrations show that the agents can learn from a human expert and transfer knowledge, for instance, how to cut a new workpiece almost just half as thick. A RL agent learns how to weld at different speeds in situations it has not been trained for.

The experimental results validated the cognitive capabilities of the system, showing that it can accomplish previously challenging monitoring and process control tasks. In a laser welding experiment, a monitoring agent successfully detects a lack of fusion within lap joints of zinc-coated steel sheets.

The second object concerning monitoring has been achieved by a successful detection of false friends that occurred because of inserted gaps of 1.0 and 0.6 mm within zinc-coated steel lap welds. A reliable detection may increase quality in car body production.

In laser cutting experiments, a control agent uses the improved monitoring signal to close the loop to the laser power control. It changes the laser power using cutting speed alterations and maintains a minimum kerf width for materials such as mild steel and stainless steel, even though it was trained for stainless steel only. Furthermore, another agent shows its adaptive skills and learns how to weld without excessive penetration from a human expert.

The fourth object concerning adaptability has been achieved. The agents adapt to various situations, two different production processes such as cutting and welding at different speeds; 50% less material thickness in the bottom sheet in welding after additional training; three different materials with laser cutting such as zinc-coated steel, mild steel, and stainless steel.

Cross-sections of the agent controlled welds show that it maintained a penetration depth of approximately 1.1 mm±15%, despite the fact that the welding speed altered by 650%. Further analysis showed that the experimental closed-loop control results comply with theoretical models for laser cutting and welding from the literature.

The third object concerning process control has been achieved. Closed-loop control of laser power maintained a penetration depth of approximately 1.1 mm±15%, while the welding speed altered by 650%. This may significantly increase production output and decrease system downtime.

A reinforcement learning agent also showed in experiments that it could learn unsupervised from its own feedback about how to weld at different velocities.

Summary and Conclusions

In order to increase the flexibility, quality, and output of production machines, the present invention has investigated an architecture that creates software agents with cognitive capabilities. These agents can learn from human experts how to weld to a penetration depth of 1.1 mm, or how to maintain a minimum kerf width during cutting. Using dimensionality reduction, classification, and reinforcement learning, they are able to provide themselves with feedback. Within an industrial environment they can monitor lack of fusion in zinc-coated steel lap weld experiments. Furthermore, in the closed-loop real-time control of laser power, they maintained the processing goal to within ±15% while the speed altered at 650%.

The present invention has investigated modules that are suitable for a cognitive architecture for production machines within a cognitive perception-action loop connecting sensors and actuators. As an industrial scenario, it develops a procedure for laser material processing that can create artificial agents for laser welding or cutting with cognitive capabilities. These capabilities are: to abstract relevant information; to learn from a human expert; to use the gained knowledge to make decisions; and to learn how to handle situations that the agent has not previously been trained in. The cognitive agents achieve improved processing results within the chosen scenarios with these capabilities.

It is possible to use laser beams when processing materials for efficient joining and cutting in a wide range of applications. From a manufacturing point of view, laser material processing is often the best choice for high production volumes. In terms of mass customization, current trends demand greater flexibility for the production techniques of the future. This is a special challenge for laser material processing because great efforts and high costs are necessary before quality welds and cuts can take place. A system that is capable of learning how to weld or cut has the potential to increase flexibility and thus the range of laser applications. Furthermore, the superior data analysis capabilities of artificial agents may enable them to comprehend incoming sensor data and establish improved monitoring or even process control abilities.

Many sophisticated approaches to monitoring and process control systems have been described in the literature. However, many of these could not be transferred to real manufacturing situations for different reasons; for example, they provide solutions to individual processes that cannot be converted to a high number of different applications, or they suffer from noisy sensor data.

The cognitive architecture according to the present invention integrates several sensors, such as photodiodes, acoustic sensors, and cameras. The data is reduced in dimension, enabling the agent to handle large amounts of raw sensor data represented in significantly fewer features through almost the same information content, in this case from approximately 30 MBytes to just 10 kBytes per second. Furthermore, the agent can identify similarities within the features and cluster them within a given classification, which satisfies the first object. This creates an improved monitoring signal that is suitable for detecting a lack of fusion or false friends within the zinc-coated steel welds, as tested and fulfilling the second object. For the tested data, the Isomap algorithm outperformed LDA and PCA, enabling us to use comparatively simple classifiers such as Fuzzy KNN. A control agent can close the loop and connect the monitoring signal using laser power control. This enables the investigated system to maintain the desired welding or cutting results within a broad range of different processing speeds, material types, and thicknesses. As the welding speed alters by about 650%, the agent maintains a penetration depth of 1.1 mm±15%, which reaches the third object. A comparison of the cutting and welding results with simple analytical models also shows that the system exhibits reasonable behavior in closed-loop control because the ratio of laser power and process velocity is almost linear. The design of the cognitive architecture enables agents to process the high volume of sensor data quickly enough to handle fast processing speed alterations or jumps in material thickness toward the fourth object. Moreover, using reinforcement learning, the agent managed to learn new parameter sets for situations that it had not been trained for.

It appears that the present invention is one of the first to discuss some of the techniques mentioned above in relation to laser welding or cutting. Furthermore, the present invention delivers real-world comparisons of these techniques, which have often tested only with artificial data sets. Within the experiments, the defined cognitive capabilities have been shown to enable production systems to improve their processing tasks in flexibility, quality, and efficiency. It is noteworthy that machines use an ability such as learning to entitle them to do this.

The present invention has demonstrated steps towards automating production machines, using laser material processing with cognitive agents. The embodiments showed improved processing in some monitoring and closed-loop control tasks.

As described in the above embodiments, the agents mainly controlled laser power; however, it is also preferred by the present invention to control gas pressure, focal position, processing speed, or a combination of these. Furthermore, the agents have only been described for one directional welding or cutting. The concept may work well for movements of processing optics relative to a workpiece in a two or three-dimensional space. Optical flow detection, when applied to the illuminated in-process pictures, should be able to deliver a two-dimensional vector describing this movement.

An agent may be trained to detect many different processing defects, such as a mismatch between the keyhole and the desired weld position. Another promising approach of the present invention would be to combine remote laser welding or cutting with the cognitive architecture proposed.

From a data processing point of view, the architecture of the present invention allows switching between dimensionality reduction techniques, classification methods, and self-learning mechanisms, as well as evaluating the combined performance. Other data reduction or sensing methods could improve feature extraction, and the next steps would be compressive sensing or random projections. Further work towards efficient out-of-sample extension and increased Isomap feature transparency would strengthen the underlying concept. Since this cognitive architecture has demonstrated reliable learning and decision-making capabilities for individual processing, it may be desirable to extend the architecture to multi-agent learning concepts. Currently, the sensor units used in laser welding may be categorized into pre-processing, in-processing, and post-processing, all monitoring the same process. Further process improvements may be accomplished by integrating team learning and processing goal achieving strategies using multiple agents. A multiple agent strategy could also allow information sharing and learning within different workstations distributed at different locations. If a system learns how to handle a task, a much larger group can gain simultaneously from it.

As described above, it is possible to detect the movement of a processing head or optical system relative to the workpiece with optical flow detection. An example for illustrating the principle of this technique of optical flow detection is described in Horn and Schunk "Determining optical flow".

The video data of a camera or suitable optical sensor data may be analyzed with the method of optical flow detection resulting in one or several vectors pointing toward the direction of the relative movement. By comparison of successive image frames, a translation and/or rotation within the 2D-image plane could be detected. Thus, taking additionally time delay between the successive frames into account, a velocity/matrix vector could also be calculated. In summary, the relative attitude of the laser processing head relative to the workpiece at each time could be detected by means of optical flow detection.

The method of optical flow detection could be employed by the processing head of the present invention, since the workpiece is illuminated by LEDs or laser sources having a different wavelength than the processing laser. Further, optical filter systems could be employed to prevent disturbances generated by the light of the processing laser beam or generated by the emission of the molten material of the workpiece (process light).

The method of optical flow detection could be applied to a digital image processing of the complete image frame or of a part or section of the successive image frames. In addition, a separate sensor could be employed, which has an illumination source at its own or uses the light illuminating the workpiece generated by the laser processing head.

The method of optical flow detection could be applied to two different functionalities.

The first feature is to compensate a mismatch of a keyhole and a desired weld position, when the geometry of the keyhole is detected for a further classification by the cognitive laser processing head. By using the optical flow detection method, a rotation or translation of the processing head could be detected, in that the movement vector is calculated by the optical flow detection method, and this movement vector may be used to determine a degree a with regard to the feature direction vector, which is the normalized vector of the feature calculation method. Any face recognition methods could improve the feature extraction.

The second feature of the optical flow detection method employed in a laser processing head of the present invention is to compensate a movement of a laser processing head actuated by an actuator to generate a welding or cutting line having an exact predetermined geometry as set in advance of the laser machining process. Such compensation could be done by an actuator of the focusing lens or a mirror within the laser machining head, for example already known by the wobble-tracker-technique. Thus, a displacement or shift of the predetermined track of the laser machining head is recognized by the optical flow detection and compensated by an actuator actuating the mirror reflecting the laser in a direction laterally to a movement direction, or in particular in a perpendicular direction, to generate a perfect welding line or cutting line.

In the following, a preferred fast and very effective method for normalizing the orientation of a multitude of images recorded by a camera observing the processing area of a laser processing operation will be described.

In a first step, an extraction of a threshold image is performed. The threshold for each pixel of the video is extracted by capturing a video of the workpiece's surface illuminated by a light source as described above with regard to the optical flow detection. The video can either be acquired before the laser is turned on, or alternatively over the whole workpiece without the processing laser. The mean image of this video is used as the threshold on a per pixel basis. Alternatively a fixed threshold for all pixels can be used. The images of the process are captured using a high speed camera that is mounted coaxially to the processing head. Multiple exposure times can be used to improve the performance of the detection of the seam/kerf and the laser spot.

In a second step, the laser position within the captured images is extracted. The laser spot can be observed as the brightest values on the image, especially on low exposures times. In the trials could results were achieved with using the upper 30% of the maximum value range of the image sensor as a threshold for binarization. The binary image is then further reduced by calculating the centroid of the image $P_{LP}(x_{LP}, y_{LP})$.

Further, extraction of the weld seam in case of a laser welding process or a cutting kerf in case of a laser cutting process is performed. The acquired video is binarized using the threshold image created in the first step. Pixels above 60% of the threshold are white, pixels below are black. The weld seam or the cutting kerf can be observed as a black line in the images. Noise and holes in the images are removed by binary erosion, followed by a binary dilation. The structuring elements of these operation can be chosen independent of each other in order to improve the denoising performance. The images are than inverted, meaning the workpiece's surface will become dark and the seam/kerf white. This white line in the image is then reduced by calculating the centroid of the image. Alternatively, only the centroid of this Blob can be computed in order to improve the detection performance. This results in a single point $P_S(x_S, y_S)$.

After the preceding steps, laser spot position normalization and the extraction of the rotation angle could be performed, which gives a complete information of attitude of each image with respect to the position of the laser spot in comparison to the generated weld seam/cutting kerf. The position of the laser spot in the image is normalized by a shift of the image by a vector $P_C$-$P_{LP}$. $P_C$ is the center of the picture and $P_{LP}$ is the position of the laser spot. Therefore the laser spot is centered in the middle of the picture after this step. The rotation angle $\alpha$ can be extracted by transforming the coordinates of $P_S$ into a polar coordinate system with its center at $P_C$. The angle $\alpha$ is calculated by a tan $2(y_S-y_C, x_S-x_C)$. After the rotation of $-\alpha$ around the image centered the weld seam/cutting kerf is pointing to the right image border, independent of the process direction and the position of the laser spot.

The thus normalized images, taken for example in a training trial for generating a training data set or during a processing operation to be classified or closed-loop controlled, could then be used for calculating a feature vector with reduced dimensionality by means of a PCA or LDA operation to be used for a classification of the feature vector.

In the following, procedures for interacting entities of manufacturing processes according to the present invention should be described. The highest share of world wide active robots and automated systems serve in manufacturing. However, state of the art industrial systems may still be improved in skills such as fast learning or reliable adaptation to new situations. We have thoroughly investigated and developed "perception", "cognition", and "action" (P-C-A) loops, cognitive agents, and machine learning techniques suitable for industrial processes with actuators and intelligent sensors. Transferring cognitive capabilities, knowledge, and skills, as well as creating many interacting P-C-A loops is our next aim towards the cognitive factory.

Only very few industrial production processes are unique. The majority of production processes run at different facilities or at different times performing identical tasks in similar environments. Still, often no or limited information exchange exists between these processes. The same workstations often require an individual configuration of every entity managing similar process tasks. Typical examples of such ensembles are spatiotemporally separated machines of car body production lines or treatments in the chemical industry. In order to increase the capability of machines to help each other we will combine in space or time distributed P-C-A loops. Certain topics arise to approach this aim: In order to enable skill transfer between different entities we need to establish a reliable and adaptable Multi-P-C-A-loop topology. This meta-system should be able to identify similar processes, translate sensor data, acquire features, and analyze results of the different entities. Dimensionality reduction, clustering, and classification techniques may enable the machines to communicate on higher levels. Machine-machine trust models, collective learning, and knowledge representation are essential for this purpose. Furthermore some industrial processes may be redefined to optimize the overall performance in cognitive terms. Both data processing and hardware configuration should result in a secure, reliable, and powerful procedure to share information and transfer skills between different units of one production cell or assembly line of distributed factory locations.

Using self-optimizing algorithms for control or parameterization of industrial applications offers the possibility to continuously improve the individual knowledge base. Reinforcement learning, for instance, gives a set of methods that provide this possibility. These algorithms rely on exploration in the processes state-space in order to learn the optimal state-action combinations. A reinforcement learning agent can also be described by a simple P-C-A-Loop, where the process of evaluating the state information of the environment is the "perception" element of the loop, the alteration of current control laws represents the "action" part and the process of mapping estimated state information to new control laws gives the "cognition" section of the single P-C-A loop. In industrial applications exploring a large state-space is not always feasible for various reasons like safety, speed, or costs. Using the Multi-P-C-A-Loop approach for distributing the learning task over multiple agents, can reduce the amount of exploration for the individual agent, while the amount of learning experience still remains high. It furthermore enables the teaching among different P-C-A loops. A possible assignment for the Multi-P-C-A approach is the combination of multiple agents in one system or assembly line, for instance a monitoring and a closed-loop control unit. Two different agents could be trained for optimization of different process parameters. The combination of both on a Multi-P-C-A level could be used to find an optimal path for all parameters.

Both outlined Multi-P-C-A-Loops may improve manufacturing performance in setup and configuration times, process flexibility as well as quality. One approach combines and jointly improves similar workstations with joint knowledge and skill transfer. The other enables different units to self-improve with each others feedback.

In the following, a networking system for cognitive laser processing devices according to the present invention should be described. There is a growing demand for autonomous industrial production systems with increased flexibility, especially in countries with high labor costs. Because laser welding processes are individually different in optical setup, materials, or joint geometry, the current laser welding systems have to be configured with many manual trials by human experts. Once configured industrial laser welding systems require costly manual reconfiguration for every process change. To expedite the setup and reconfiguration times human experts often use tables and knowledge from previous work to take a good guess of initial process parameters. Even when fully configured small undesired laser welding process variations may have a large impact on the seam quality.

In order to improve laser welding quality, increase automation and flexibility as well as reduce costs of configuration and down times we want to apply modern machine learning methods. Our recent research results indicate that cognitive laser welding systems equipped with machine learning can learn laser welding parameters from human expert feedback. The systems improve with every feedback iteration but need enough training data to improve processing.

It is an object of the present invention to provide a Networking system for cognitive laser processing devices and a cognitive laser processing device being adapted to communicate with the Networking system, by which the productivity of each laser processing device in the Networking system is enhanced.

This object is solved by a Networking system for cognitive laser processing devices and by a cognitive laser processing device being adapted to communicate with the Networking system.

In particular, the present invention is directed to a Networking system, in which training data of a plurality of cognitive laser processing devices connected to the Network System is jointly collected and analyzed on a large scale how to laser process, in particular laser weld, individually different workpieces under different process environments.

It is an advantage of the present invention, that, once the collaborative systems gain enough machine knowledge, they avoid repetitive configuration steps and may significantly reduce down times as well as increase product flexibility.

According to one embodiment of the present invention, in order to facilitate the integration of several cognitive control systems, all distributed systems are connected to each other via internet. The knowledge gained by these systems is shared, thus allowing a global database of process configurations, sensor setups and quality benchmarks.

In order to share information between machines, all of them have to use a similar method of feature acquisition. Different laser welding scenarios are constantly being investigated within labs located on different places on the world. Within this consortia of labs, we can acquire the necessary training data and processing knowledge for a locally distributed network of cognitive laser welding systems of the future. Further participants within this network to come can contribute and benefit from the automatically growing machine knowledge.

As a first scenario to achieve these goals using cognitive data processing approaches for combining the input data from multiple sensors in order to receive a good estimation of the state the process is currently in. The systems will be composed of a coaxially mounted camera, photodiodes, and an optical interferometric sensor. The camera will provide information about the melt pool and keyhole geometries, while the photodiodes are giving a very high spectral resolution of optical emissions. The interferometric sensor can provide pre- and post-process data.

Using cognitive dimensionality reduction techniques, unnecessary and redundant data from these sensors can be removed. The reduced sensor data is used to classify the state of the process. Clustering allows for identification of specific process states, even between different set-ups. If a significant difference from the references, and therefore an unknown process condition, is detected, the supervisor will be alerted. The expert can then teach the new state and countermeasures (if possible) to the system in order to improve its performance.

The cognitive system to be developed should be able to learn to separate acceptable and unacceptable results and furthermore be able to avoid unacceptable results where possible. The usage of technical cognition eliminates the need for a complete physical model of the welding or cutting process.

The system is able to stabilize the process by improving at least one steering variable. Distributed cognition allows for a central database between different manufacturing locations. The information gathered from one process can be transferred to a similar process at a different location.

The learning abilities of the system together with the ability to share and cluster the knowledge between manufacturing locations significantly reduces the expert time needed for calibration, leading to an improved throughput, higher agility and lower production costs.

According to the present invention, the efficiency in environments, where laser material processing is already successfully used, is improved, while increasing the potential market of laser applications to areas where it has not been used due to quality and reliability concerns. The cognitive laser welding network will offer two significant advantages to industrial laser welding: it can autonomously process a broad set of different laser welding scenarios and the joint knowledge will exponentially improve over time for all future participants in this network. It should be emphasized that the above described system and processes could also employed to a wide field of laser machining processes like laser cutting, laser ablation, laser converting, laser drilling, laser engraving, or laser soldering.

According to the present invention, a method is provided, which is used for monitoring a laser welding process for detecting a lack of fusion of workpieces to be joined, comprising the steps of: (a) recording a pixel image at an initial time point displaying the interaction zone between a laser beam and the workpieces by means of a camera; (b) converting the pixel image into a pixel vector; (c) representing the pixel vector by a sum of predetermined pixel mappings each multiplied by a corresponding feature value; (d) classifying the set of feature values on the basis of learned feature values for determining a lack of fusion between the workpieces to be joined at the initial time point; and (e) repeating the steps (a) to (d) for further time points to perform a monitored laser welding process. In this method the predetermined pixel mappings are preferably obtained by the steps of: recording a training set of pixel images at a predetermined first number of time points displaying the interaction zone having no lack of fusion between training workpieces to be joined, and at a predetermined second number of time points displaying the interaction zone having a lack of fusion between the training workpieces to be joined; converting the pixel images into pixel vectors and generating a covariance matrix from the pixel vectors; calculating the eigenvectors of the covariance matrix to determine the predetermined pixel mappings. In this method the learned feature values are preferably obtained by the following steps: representing each pixel vector of the training set by a sum of predetermined pixel mappings multiplied by corresponding feature values; and training a classifier with the obtained feature values by discriminating feature values at the first number and the second number of time points. In this method the classifier is selected from a group comprising Support Vector Machines (SVM), Artificial Neural Networks (ANN), or a Fuzzy-KNN. In this method a further feature value is preferably obtained by measuring the temperature of the interaction zone by means of an optical temperature sensor. In this method the recorded pixel image of the camera is a grey-scale pixel image. In this method the recorded pixel image is alternatively a color image of the camera, wherein each color sub-pixel image is converted to a separate pixel vector used for classification. In this method the predetermined pixel mappings are calculated by means of isometric feature mapping (ISOMAP), linear discriminant analysis (LDA) and principal component analysis (PCA). This method preferably further comprises the step of outputting an alert signal, if a lack of fusion between the workpieces to be joined is determined. This method preferably further comprises the step of controlling an actuator on the basis of the classification result. In this method preferably the actuator is a laser power control or a processing speed control. In this method the workpieces to be joined are preferably two zinc-coated workpieces having a gap in between. There is preferably provided a Laser material processing head having a control unit being adapted to perform the above method. The Laser material processing head preferably comprises a high-speed camera, sensors for solid-borne and air-borne acoustics, a temperature sensor and three photodiodes recording process emissions on different wavelengths for generating sensor data to be used as feature values. The Laser material processing head preferably further comprises a PID-unit for controlling laser power on the basis of the classification result.

According to the present invention, a Method for closed-loop controlling a processing operation of a workpiece is provided, comprising the steps of: (a) recording a pixel image at an initial time point of an interaction zone by means of a camera, wherein the workpiece is processed using an actuator having an initial actuator value; (b) converting the pixel image into a pixel vector; (c) representing the pixel vector by a sum of predetermined pixel mappings each multiplied by a corresponding feature value; (d) classifying the set of feature values on the basis of learned feature values into at least two classes of a group of classes comprising a first class of a too high actuator value, a second class of a sufficient actuator value and a third class of a too low actuator value at the initial time point; (e) performing a control step for adapting the actuator value by minimizing the error e, between a quality indicator $y_e$ and a desired value; and (f) repeating the steps (a) to (e) for further time points to perform a closed-loop controlled processing operation. 2. Method according to embodiment 1, wherein the quality indicator $y_e$ is represented by the difference of the class probability of a current set of feature values being part of the third class and the class probability of a current set of feature values being part of the first class. 3. Method according to embodiment 1 or 2, further comprising the step of varying the desired value by a user during the processing operation to optimize a desired process result. 4. Method according to embodiment 1, 2 or 3, wherein the control step comprises adapting the actuator value at a respective time point t by means of a PID control output $c_t$, which is represented by $$c_t = Pe_t + I\sum_{i=t-n}^{t-1} e_i + D(e_t - e_{t-1})$$

with P for proportional, I for integral, and D for derivative behaviour. 5. Method according to one of the preceding embodiments, wherein the actuator value is the laser power of a processing laser beam interacting with the workpiece in the interaction zone or the processing velocity. 6. Method according to one of the preceding embodiments, wherein the laser processing operation is a laser welding process, a laser cutting process, a laser soldering process, a laser hybrid welding process, or a laser cladding process. 7. Method according to one of the preceding embodiments, wherein the predetermined pixel mappings are obtained by the steps of: —recording a training set of pixel images at a predetermined first number of time points displaying the interaction zone having a too high actuator value, at a predetermined second number of time points displaying the interaction zone having a sufficient actuator value, and at a predetermined third number of time points displaying the interaction zone having a too low actuator value; —converting the pixel images into pixel vectors and generating a covariance matrix from the pixel vectors; calculating the eigenvectors of the covariance matrix to determine the predetermined pixel mappings. 8. Method according to embodiments 7, wherein the learned feature values are obtained by the following steps: —representing each pixel vector of the training set by a sum of predetermined pixel mappings multiplied by corresponding feature values; and —training a classifier with the obtained feature values by discriminating feature values at the first number, the second number, and the third number of time points. 9. Method according to embodiment 8, wherein the classifier is selected from a group comprising Support Vector Machines (SVM), Artificial Neural Networks (ANN), or a Fuzzy-KNN. 10. Method according to one of the preceding embodiments, wherein a further feature value is obtained by measuring the temperature of the interaction zone by means of an optical temperature sensor and/or by sensor data of three photodiodes recording process emissions on different wavelengths 11. Method according to one of the preceding embodiments, wherein the recorded pixel image of the camera is a pixel image of the processed workpiece illuminated by LEDs or laser sources having a different wavelength than the processing laser, wherein further optical filter systems are employed to prevent disturbances generated by the light of a processing laser beam or generated by the emission of a molten material of the workpiece. 12. Method according to one of the preceding embodiments, wherein the predetermined pixel mappings are calculated by means of isometric feature mapping (ISOMAP), linear discriminant analysis (LDA) or principal component analysis (PCA). 13. Laser material processing head having a control unit being adapted to perform a method according to one of the preceding embodiments, wherein the actuator value is the laser power of a processing laser beam interacting with the workpiece in the interaction zone or the processing velocity. 14. Laser material processing head according to embodiment 13, comprising a high-speed camera, sensors for solid-borne and air-borne acoustics, a temperature sensor and three photodiodes recording process emissions on different wavelengths for generating sensor data to be used as feature data. 15. Laser material processing head according to embodiment 13 or 14, further comprising a PID-unit for controlling laser power on the basis of the classification result.

The invention claimed is:

1. Method for controlling a processing operation of a workpiece by means of a Reinforcement Learning (RL) agent unit, comprising the steps of:
 (a) observing an interaction zone in the workpiece by means of at least one radiation sensor to generate at least one sensor signal $s_t$; wherein the workpiece is processed using an actuator having an initial actuator value $a_t$;
 (b) determining a basis function $\phi(s_t)$ from the set of sensor signals $s_t$;
 (c) determining a reward function $r_t$ giving the probability of good results of the processing operation;
 (d) choosing a next actuator value $a_{t+1}$ on the basis of a policy $\pi$ depending on the reward function $r_t$ and the basis function $\phi(s_t)$; and
 (e) repeating the steps (a) to (d) for further time points to perform an R L controlled processing operation, and wherein steps (a) and (b) comprise the steps of:
 recording a pixel image at an initial time point of an interaction zone in the workpiece by means of a camera, wherein the workpiece is processed using an actuator having an initial actuator value $a_t$;
 converting the pixel image into a pixel vector $s_t$; and
 representing the pixel vector $s_t$ by a sum of predetermined pixel mappings each multiplied by a corresponding feature value, wherein the set of feature values $\phi(s_t)$ represents the basis function $\phi(s_t)$.

2. The method according to claim 1, wherein step (c) comprises the step of classifying the set of feature values $\phi(s_t)$ on the basis of learned feature values to determine the reward function $r_t$.

3. The method according to claim 1, wherein the step (c) comprises the step of classifying a set of sensor data measured by a post-process sensor and/or a pre-process sensor.

4. The method according to claim 1, wherein the actuator value $a_t$ is the laser power of a processing laser beam interacting with the workpiece in the interaction zone, the processing velocity, an x/y/z position/movement of a processing head relative to the workpiece, processing gas type and pressure, feed-rate of added materials in case of other cladding, cutting, welding, soldering, or material processing techniques.

5. The method according to claim 1, wherein the processing operation is a laser processing operation comprising a laser welding process or a laser cutting process.

6. The method according to claim 1, wherein the predetermined pixel mappings are obtained by the steps of:
 recording a training set of pixel images at a predetermined first number of time points displaying the interaction zone having a good processing result, and at a predetermined second number of time points displaying the interaction zone having a had processing result;
 converting the pixel images into pixel vectors and generating a covariance matrix from the pixel vectors; and
 calculating the eigenvectors of the covariance matrix to determine the predetermined pixel mappings.

7. The method according to claim 6, wherein learned feature values are obtained by the following steps:
 representing each pixel vector of the training set by a sum of predetermined pixel mappings multiplied by corresponding feature values; and
 training a classifier with obtained feature values by discriminating feature values at the first number and the second number of time points into a good class and a bad class.

8. The method according to claim 7, wherein the classifier is selected from a group comprising Support Vector Machines (SVM), Artificial Neural Networks (ANN), or a Fuzzy-K Nearest Neighbor (KNN).

9. The method according to claim 6, wherein the predetermined pixel mappings are calculated by means of isometric feature mapping (ISOMAP), linear discriminant analysis (LDA) or principal component analysis (PCA).

10. The method according to claim 1, wherein a further feature value $\phi(s_t)$ is obtained by measuring the temperature of the interaction zone by means of an optical temperature sensor.

11. The method according to claim 1, wherein further feature values $\phi(s_t)$ are obtained by sensor data of three photodiodes recording process emissions on different wavelengths.

12. The method according to claim 1, wherein the recorded pixel image of the camera is a pixel image of the processed workpiece illuminated by LEDs or laser sources having a different wavelength than a processing laser, wherein further optical filter systems are employed to prevent disturbances generated by the light of the processing laser beam or generated by emission of the molten material of the workpiece.

13. A laser material processing head having a laser and a Reinforcement Learning agent unit being adapted to perform a method according to claim 1.

14. A laser material processing head according to claim 13, comprising a high-speed camera, sensors for solid-borne and air-borne acoustics, laser-triangulation, a temperature sensor and three photodiodes recording process emissions on different wavelengths for generating sensor data to be used as feature values.

* * * * *